United States Patent [19]
Utsunomiya et al.

[11] Patent Number: 6,122,185
[45] Date of Patent: Sep. 19, 2000

[54] ELECTRONIC APPARATUS

[75] Inventors: Fumiyasu Utsunomiya; Yoshifumi Yoshida; Miwa Moriuchi, all of Chiba, Japan

[73] Assignee: Seiko Instruments R&D Center Inc., Japan

[21] Appl. No.: 09/121,061

[22] Filed: Jul. 21, 1998

[30] Foreign Application Priority Data

| Jul. 22, 1997 | [JP] | Japan | 9-196109 |
| Oct. 14, 1997 | [JP] | Japan | 9-280925 |

[51] Int. Cl.[7] .................................................. H02M 3/18
[52] U.S. Cl. ........................................................ 363/60
[58] Field of Search ........................ 363/59, 60; 327/530, 327/534, 536; 307/110

[56] References Cited

U.S. PATENT DOCUMENTS

| 4,127,782 | 11/1978 | Omura et al. | 307/10.1 |
| 4,163,278 | 7/1979 | Onoue et al. | 363/101 |
| 4,634,953 | 1/1987 | Shoji et al. | 320/1 |
| 4,831,322 | 5/1989 | Mashino et al. | 322/28 |
| 4,971,451 | 11/1990 | Suomalainen | 323/222 |
| 5,179,508 | 1/1993 | Lange et al. | 363/16 |

FOREIGN PATENT DOCUMENTS

| 241219 | 10/1987 | European Pat. Off. . |
| WO 89/07836 | 8/1989 | WIPO . |

OTHER PUBLICATIONS

PATENT ABSTRACTS OF JAPAN, vol. 97, no. 10, Oct. 31, 1997.
PATENT ABSTRACTS OF JAPAN, vol. 96, no. 6, Jun. 28, 1996.

*Primary Examiner*—Adolf Deneke Berhane
*Attorney, Agent, or Firm*—Adams & Wilks

[57] ABSTRACT

An electronic apparatus is comprised of a generator 11 in which a voltage is changed as time elapses, a booster circuit 12 for boosting an output voltage of the generator 11, and an oscillator circuit 13 that drives the booster circuit 12. When the voltage of the generator 11 changes as time elapses so that the voltage exceeds the minimum driving voltage of the oscillator circuit 13, the oscillator circuit 13 obtains power for starting oscillation from the generator 11. The oscillator circuit 13 that has started oscillation drives the booster circuit 12 to thereby boost the output voltage generated by the generator 11. Since the oscillator circuit 13 after starting oscillation continuously performs oscillation using the power boosted by the booster circuit 12, even if the voltage of the generator 11 changes as time elapses so that the voltage becomes lower than the minimum driving voltage of the oscillator circuit 13, the voltage can be boosted to the minimum driving voltage of the oscillator circuit 13 or higher.

28 Claims, 27 Drawing Sheets

ELECTRONIC APPARATUS

BACKGROUND OF THE INVENTION

1. Field of the Invention

The present invention relates to an electronic apparatus that is driven by electric power of a generator in which a voltage of generated power changes as time elapses or a power supply in which the voltage thereof changes as time elapses, particularly to a portable electronic apparatus.

2. Description of the Related Art

Conventional electric apparatuses include a generator in which the voltage of generated power changes as time elapses or a power supply in which the voltage thereof changes as time elapses. In such electronic apparatuses, in order to continuously operate a driving circuit of the electronic apparatuses, a power supply capacity of the generator or the power supply is set so that the voltage of the generator or the power supply does not fall below the minimum driving voltage of the driving circuit of the electronic apparatuses even if the voltage changes as time elapses.

Also, as shown in FIG. 9, conventional electronic apparatuses include a generator in which the voltage of the generated power changes as time elapses or a power supply 90 in which the voltage changes as time elapses, a booster circuit 92 for boosting such generated power or the power of the power supply, and an oscillator circuit 91 that drives the booster circuit 92. In the electronic apparatus, the oscillator circuit 91 is driven by the generator in which the voltage of the generated power changes as time elapses or the power supply 90 in which the voltage changes as time elapses. Further, the booster circuit 92 is driven by an output clock of the oscillator circuit 91, and the power of the generator or the power supply 90 in which the voltage of the supplied power changes as time elapses is boosted by the booster circuit 92, to thereby drive a driving circuit of the electronic apparatus. Accordingly, in order to continuously operate the driving circuit of the electronic apparatus, a power supply capacity of the generator or the power supply 90 is set so that the voltage of the generator or the power supply 90 does not fall below the minimum driving voltage of the oscillator circuit 91 even if the voltage changes as time elapses.

Also, conventional electronic apparatuses include a generator in which the voltage of the generated power changes as time elapses or a power supply in which the voltage changes as time elapses, a booster circuit for boosting such generated power or the power of the power supply, an oscillator circuit that drives the booster circuit, and a capacitor for accumulating the boosted power and supplying power to a driving circuit of the electronic apparatus. In this electronic apparatus, the oscillator circuit is driven using the power accumulated in the capacitor, the booster circuit is driven by an output clock of the oscillator circuit, and the power of the generator or the power supply in which the voltage of supplied power changes as time elapses is boosted by the booster circuit. Then, the booster power is accumulated in the capacitor so that the driving circuit of the electronic apparatus is driven by the power of the capacitor. Accordingly, in order to continuously operate the driving circuit of the electronic apparatus, the capacitor is always charged so that the power accumulated in the capacitor does not become empty and that the voltage of the capacitor does not fall below the minimum driving voltage of the oscillator circuit.

Now, an example of an electronic apparatus using a thermoelectric conversion device as a generator is shown as a prior art. In the thermoelectric conversion device, a P-type thermoelectric material element and an N-type thermoelectric material element are sandwiched between two substrates, an a plurality of P-type thermoelectric material elements and N-type thermoelectric material elements form a p-n junction on the substrates through an electrically conductive material such as metal to be connected in series with one another. The thermoelectric conversion device produces electromotive power by a temperature difference between the two substrates, to thereby generate power. The power generated per thermoelectric material element is about 200 $\mu$V/°C. When, for example, a circuit that drives at 1.5 V is directly driven by the thermoelectric conversion device, assuming that the temperature difference between the substrates is 2°C., at least 1,875 pairs of p-n junctions are required. Furthermore, since the thermoelectric conversion device is influenced by the atmospheric temperature, a large margin for generating power is allowed to thereby increase pairs of p-n junctions. Accordingly, the electronic apparatus using the thermoelectric conversion device requires a large heat radiating plate, because the size of the thermoelectric conversion device is increased and the number of heat-propagating paths is also increased.

FIG. 30 shows a conventional booster circuit. In FIG. 30, reference numeral 470 denotes an electromotive voltage input terminal for inputting the electromotive voltage Vp of the power supply 90, 471 denotes a first clock signal input terminal for inputting a first clock signal P11 which is one of clock signals P1 outputted from the oscillator circuit 91, 472 denotes a second clock signal input terminal for inputting a second clock signal P12 which is one of the clock signals P1, 473 denotes a boosted voltage output terminal for outputting a boosted voltage Vdd, 474 denotes a booster unit, and 483 denotes a diode.

The more the number of booster units 474 connected in series with one another is, the more the boosting factor is. In the booster unit 474, reference numeral 479 denotes an input terminal, 480 denotes a boosted voltage output terminal, 481 denotes a first clock signal input terminal for inputting a first clock signal P11, 482 denotes a second clock signal input terminal for inputting a second clock signal P12, 475 and 476 denote diodes, and 477 and 478 denote capacitors.

A signal obtained by inverting the first clock signal P1 is a second clock signal P2. Since operation of the circuit is already well known, it is omitted.

In the conventional electronic apparatuses, in order to continuously operate a driving circuit of the electronic apparatus, a power supply capacity of a generator or a power supply is set so that the voltage of the generator or the power supply does not fall below the minimum driving voltage of the driving circuit of the electronic apparatus even if the voltage changes as time elapses. For this reason, when the voltage of the generator or the power supply exceeds the minimum driving voltage of the driving circuit of the electronic apparatus, the electric power is wastefully used, whereby the efficiency of the whole system is deteriorated. Furthermore, since the power supply capacity is set so that the voltage of the generator or the power supply does not fall below the minimum driving voltage of the driving circuit of the electronic apparatus, the generator or the power supply is unpreferably enlarged. Particularly, in the case where the above-described electronic apparatus is used in a portable apparatus, there is such a problem that the size of the generator or the power supply is increased.

Furthermore, in the conventional electronic apparatus, an oscillator circuit is driven by the power of the generator or the power supply, and a booster circuit is driven by a clock signal from the oscillator circuit. For this reason, even if the voltage of the generator or the power supply falls slightly below the minimum driving voltage of the oscillator circuit, the oscillator circuit, the booster circuit, and then the whole system stop their operations. At this time, the generator or the power supply supplies, to the booster circuit, electric power whose voltage is only slightly below the voltage of the minimum driving voltage of the oscillator circuit. Since the system is, however, in a non-operation state, the efficiency of the whole system is considerably deteriorated. Therefore, in order to continuously supply power to the driving circuit of the electronic apparatus, it is required that the voltage of the generator or the power supply does not fall below the minimum driving voltage of the oscillator circuit even if the voltage changes as time elapses. On the other hand, in the case where the voltage of the generator or the power supply greatly exceeds the minimum driving voltage of the oscillator circuit, the voltage after boosting operation greatly exceeds a voltage necessary for the driving circuit of the electronic apparatus. The thus generated excess power is changed into useless energy such as heat. Furthermore, since the power supply capacity is set so that the voltage of the generator or the power supply does not fall below the minimum driving voltage of the oscillator circuit, there is such a problem that the size of generator or the power supply is unpreferably increased.

Also, in the conventional electronic apparatus, power accumulated in the capacitor is used to drive the oscillator circuit and boost the output power of the generator or the power supply. The thus boosted power is accumulated in the capacitor to drive the driving circuit of the electronic apparatus by the power of the capacitor. Accordingly, in order to continuously operate the driving circuit of the electronic apparatus, the capacitor is always charges so that the power of the capacitor does not become empty and the voltage of the capacitor does not fall below the minimum driving voltage of the oscillator circuit. Therefore, since the power of the capacitor becomes empty if the charged power of the capacitor is less than the power that is consumed by the driving circuit of the electronic apparatus, the generator or the power supply requires large power supply capacity. Also, there is such a problem that when the voltage of the capacitor falls below the minimum driving voltage of the oscillator circuit, the operation of the whole system is stopped.

In the case where the thermoelectric conversion device is used as the generator of the above-described electronic apparatus, thermoelectric material elements must be connected in series with one another so that the output voltage of the thermoelectric conversion device always exceeds the minimum diving voltage of the driving circuit or oscillator circuit of the electronic apparatus. Further, since the thermoelectric conversion device generates power by a temperature difference and is influenced by the atmospheric temperature, a larger number of the thermoelectric material element are required to be connected in series with one another. For this reason, the thermoelectric conversion device is enlarged, and the number of heat-propagating paths is increased, so that a larger heat radiating plate is required. Accordingly, it is difficult to employ the above-described electronic apparatus for a portable apparatus.

The conventional voltage booster system has first a disadvantage that its booster circuit needs to have a plurality of diodes and has a loss caused by the diodes. A Schottky diode is often used as the diode in order to reduce a forward voltage drop. However, even using the Schottky diode cannot avoid a voltage loss and power loss caused by a forward voltage loss, and there is a problem that a voltage of 0.2 V or so is lost in each of the Schottky diodes.

Next, since the conventional booster circuit does not have a means for detecting the voltage of a power supply, it cannot set the boosting factor of the booster circuit at an appropriate value according to the voltage of the power supply. Namely, there are problems that a charging efficiency is dropped by a fact that when a secondary battery is charged by a certain boosted voltage of the booster system, the trouble of charging a secondary battery through a booster circuit having a high boosting factor which is great in loss is taken even in case that the secondary battery can be charged by a booster circuit having a low boosting factor thanks to a sufficiently high voltage of the power supply, and that a boosted voltage exceeds the upper limit of a driving voltage for driving an IC or the like since the voltage of a power supply becomes higher in case that the IC or the like is driven by the boosted voltage.

SUMMARY OF THE INVENTION

The present invention has been made in view of the above-described problems, and therefore has an object to provide an electronic apparatus having a high power efficiency of the whole system, and to provide a system capable of boosting a lower voltage to thereby improve the boosting efficiency.

An electronic apparatus according to the present invention is comprised of: a generator in which the voltage of power generated by thermoelectric devices, etc. changes as time elapses or a power supply in which the voltage changes as time elapses; a booster circuit for boosting an output voltage of the generator or the power supply; and an oscillator circuit which drives the booster circuit. The oscillator circuit is operated and the booster circuit is driven by an output clock of the oscillator circuit, whereby the voltage generated from the generator or the power supply is boosted.

In the electronic apparatus, once the voltage for driving the oscillator circuit is inputted, the booster circuit is operated, and the oscillator circuit can continuously be operated by the output of the oscillator circuit. Accordingly, even if the voltage of the generator or the power supply changes as time elapses, and the voltage falls below the minimum driving voltage of the oscillator circuit, the voltage can be boosted to the minimum driving voltage of the oscillator circuit or higher.

Also, in the electronic apparatus according to the present invention, by providing a voltage detecting circuit for the power supply, the stages of the operation of the booster circuit are switched, or an oscillating frequency of the oscillator for generating a clock pulse for driving the booster circuit is varied, whereby the boosting rate can be varied. As a result, a constant output voltage can be efficiently obtained to the power supply in which the voltage is greatly varied.

Further, in the electronic apparatus of the present invention, the operation of the voltage detecting circuit is made intermittent, and a storage circuit for storing an output of the voltage detecting circuit is provided until a pulse for starting a subsequent operation is, whereby the current consumption of the voltage detecting circuit can be reduced.

Also, in at least one of MOS transistor used in the booster circuit, a gate and a channel are of the same conductive type, whereby an absolute value of the threshold voltage of MOS transistor can also be reduce.

By the above-described structure, a small-sized portable apparatus such as a wristwatch using as a power supply a thermoelectric conversion device or solar cell in which the voltage is greatly varied can be realized.

DESCRIPTION OF THE PREFERRED EMBODIMENT

Figure 1:
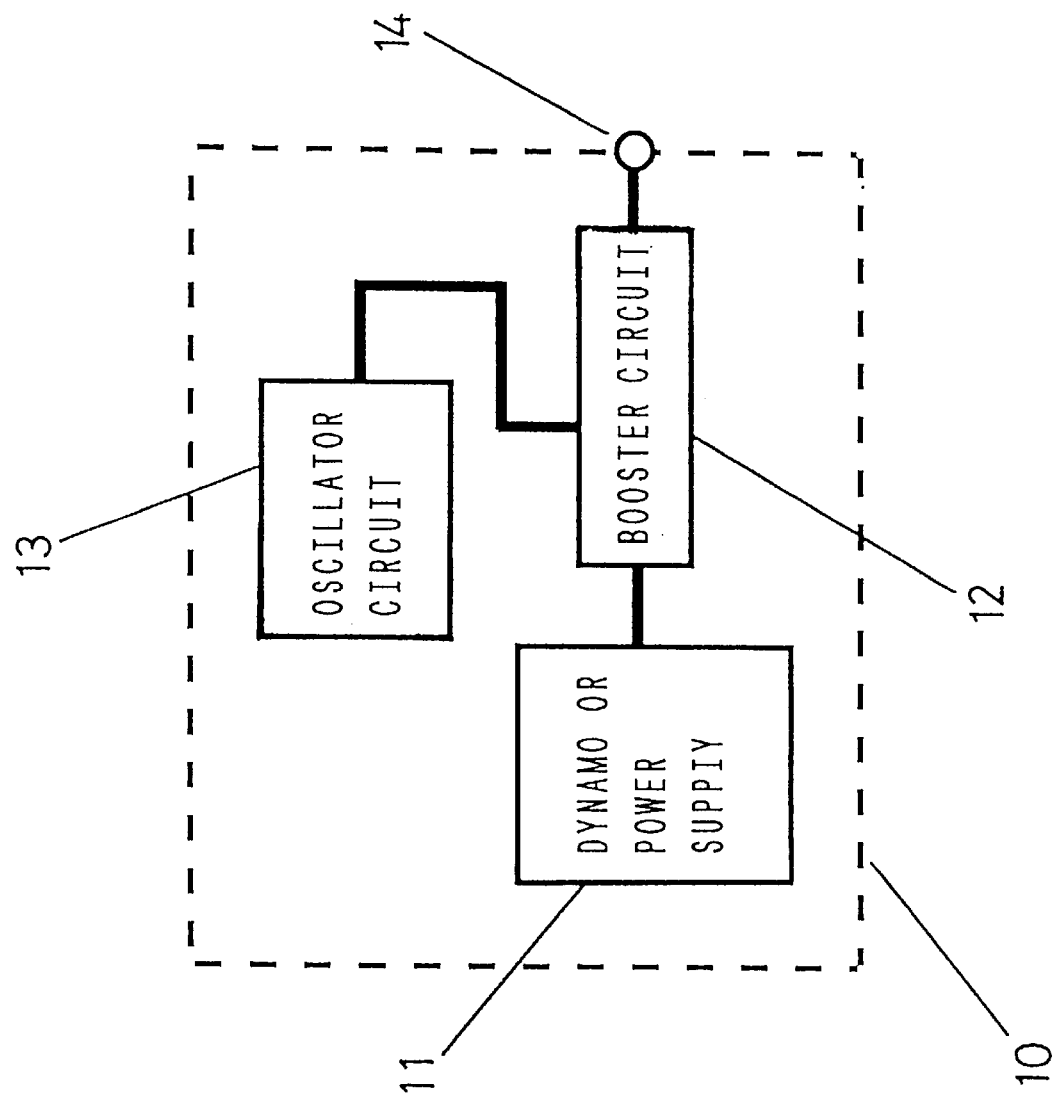
FIG. 1 is a system block diagram showing an electronic apparatus according a first embodiment of the present invention.

According to one aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; and an oscillator circuit 13 which drives the booster circuit 12. The oscillator circuit 13 is operated and the booster circuit 12 is driven by an output clock of the oscillator circuit 13, whereby the output voltage generated from the generator or the power supply 11 is boosted. At this time, the electronic apparatus 10 according to the present invention, even if the voltage of the generator or the power supply 11 changes as times elapses to be lower than the minimum driving voltage of the oscillator circuit, boosts the voltage to not lower than the minimum driving voltage of the oscillator circuit or the driving voltage of the driving circuit 42 of the electronic apparatus. Thus, the output voltage of the generator or the power supply 11 is not required to be always kept at the minimum driving voltage of the oscillator circuit or higher, so that the generator or the power supply 11 can be downsized. Downsizing of the generator or the power supply 11 leads to a broader application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

Also, according to another aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; and an oscillator circuit 13 which drives the booster circuit 12. When the voltage of the generator or the power supply 11 changes as time elapses so that the voltage exceeds the minimum driving voltage of the oscillator circuit 13, the oscillator circuit 13 obtains power for starting oscillation from the generator or the power supply 11. The oscillator circuit 13 that has started oscillation drives the booster circuit 12 to thereby boost the output voltage generated by the generator or the power supply 11. At this time, the electronic apparatus 10 according to the present invention, even if the voltage of the generator or the power supply 11 changes as time elapses to be lower than the minimum driving voltage of the oscillator circuit, boosts the voltage to not lower than the minimum driving voltage of the oscillator circuit or the driving voltage of the driving circuit 42 of the electronic apparatus. Thus, the output voltage of the generator or the power supply 11 is not required to be always kept at the minimum driving voltage of the oscillator circuit or higher. Once the voltage exceeds the minimum driving voltage of the oscillator circuit, the booster circuit 12 can be driven, and therefore, the generator or the power supply 11 can be downsized. Downsizing of the generator or the power supply 11 leads to a broader application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

Also, according to still another aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; and an oscillator circuit 13 which drives the booster circuit 12. When the voltage of the generator or the power supply 11 changes as time elapses so that the voltage exceeds the minimum driving voltage of the oscillator circuit 13, the oscillator circuit 13 obtains power for starting oscillation from the generator or the power supply 11. The oscillator circuit 13 that has started oscillation drives the booster circuit 12 to thereby boost the output voltage generated by the generator or the power supply 11. The oscillator circuit 13 after starting oscillation continuously performs oscillation using the power boosted by the booster circuit 12. At this time, the electronic apparatus 10 according to the present invention, even if the voltage of the generator or the power supply 11 changes as time elapses to be lower than the minimum driving voltage of the oscillator circuit, boosts the voltage to not lower than the minimum driving voltage of the oscillator circuit or the driving voltage of the driving circuit 42 of the electronic apparatus. Thus, the output voltage of the generator or the power supply 11 is not required to be always kept at the minimum driving voltage of the oscillator circuit or higher, so that the generator or the power supply 11 can be downsized. Downsizing of the generator or the power supply 11 leads to a broader application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without any other power sources. Also, since the voltage not higher than the minimum driving voltage of the oscillator circuit, which cannot be boosted in the conventional electronic apparatus, can be boosted, there is obtained an effect that the power efficiency of the whole system can be improved.

Also, according to still another aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; an oscillator circuit 13 which drives the booster circuit 12; and a power source 30 provided independently of the generator or the power supply 11. The oscillator circuit 13 obtains power necessary for starting oscillation from the power source 30 provided independently of the generator or the power supply 11. The oscillator circuit 13 that has started oscillation drives the booster circuit 12 to thereby boost the output voltage generated by the generator or the power supply 11. At this time, the electronic apparatus 10 according to the present invention, even if the voltage of the generator or the power supply 11 changes as time elapses to be lower than the minimum driving voltage of the oscillator circuit, boosts the voltage to not lower than the minimum driving voltage of the oscillator circuit or the driving voltage of the driving circuit 42 of the electronic apparatus. Thus, the output voltage of the generator or the power supply 11 is not required to be always kept at the minimum driving voltage of the oscillator circuit or higher. Further, since the electronic apparatus 10 according to the present invention can continue operating even if the voltage of the generator or the power supply 11 cannot exceed the minimum driving voltage of the oscillator circuit as time elapses, the generator or the power supply 11 can be downsized. Downsizing of the generator or the power supply 11 leads to a broader application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

Also, according to still another aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; an oscillator circuit 13 which drives the booster circuit 12; and a power source 30 provided independently of the generator or the power supply 11. The oscillator circuit 13 obtains power necessary for starting oscillation from the power source 30 provided independently of the generator or the power supply 11. The oscillator circuit 13 that has started oscillation drives the booster circuit 12 to thereby boost the output voltage generated by the generator or the power supply 11. The oscillator circuit 13 after starting oscillation continuously performs oscillation using the power boosted by the booster circuit 12. At this time, the electronic apparatus 10 according to the present invention, even if the voltage of the generator or the power supply 11 changes as time elapses to be lower than the minimum driving voltage of the oscillator circuit, boosts the voltage to not lower than the minimum driving voltage of the oscillator circuit or the driving voltage of the driving circuit 42 of the electronic apparatus. Thus, the output voltage of the generator or the power supply 11 is not required to be always kept at the minimum driving voltage of the oscillator circuit or higher. Further, since the electronic apparatus 10 according to the present invention can continue operating even if the voltage of the generator or the power supply 11 cannot exceed the minimum driving voltage of the oscillator circuit as time elapses, the generator or the power supply 11 can be downsized. Downsizing of the generator or the power supply 11 leads to a broader application to a portable apparatus. Also, once the output voltage of the power source 30 provided independently of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without any other power sources. Further, since it is not necessary for the power source 30 provided independently of the generator or the power supply 11 to always supply power to the oscillator circuit 13, the power source 30 can be downsized. Also, since the voltage not higher than the minimum driving voltage of the oscillator circuit, which cannot be boosted in the conventional electronic apparatus, can be boosted, there is obtained an effect that the power efficiency of the whole system can be improved.

Also, according to still another aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; an oscillator circuit 13 which drives the booster circuit 12; a Schottky diode 20 for rectifying the power generated by the generator or the power supply and the power boosted by the booster circuit 12; a control circuit 40 for dividing the power into a driving circuit 42 of the electronic apparatus and a capacitor 41 or form the capacitor 41 to the driving circuit 42 of the electronic apparatus according to a value of the voltage boosted by the booster circuit 12; the capacitor 41 for accumulating the boosted power to supply the power to the driving circuit 42 of the electronic apparatus; and the driving circuit 42 of the electronic apparatus which operates using the power boosted by the booster circuit 12 or the power accumulated in the capacitor 41. The oscillator circuit 13 obtained power for starting when the voltage of the generator or the power supply 11 changes as time elapses so that the voltage exceeds the minimum driving voltage of the oscillator circuit 13, or the oscillator circuit 13 obtains power form the capacitor 41. The oscillator circuit 13 that has started oscillation drives the booster circuit 12 to thereby boost the output voltage generated by the generator or the power supply 11. The oscillator circuit 13 after starting oscillation continuously performs oscillation using the power boosted by the booster circuit 12. At this time, the electronic apparatus 10 according to the present invention, even if the voltage of the generator or the power supply 11 changes as time elapses to be lower than the minimum driving voltage of the oscillator circuit, boosts the voltage to not lower than the minimum driving voltage of the oscillator circuit or the driving voltage of the driving circuit 42 of the electronic apparatus. Thus, since the output voltage of the generator or the power supply 11 is not required to be always kept at the minimum driving voltage of the oscillator circuit or higher, the generator or the power supply 11 can be downsized. Downsizing of the generator or the power supply 11 leads to a broader application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without any other power sources. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is divided into the capacitor 41 or the driving circuit 42 of the electronic apparatus according to a value of the voltage boosted by the booster circuit 12. Therefore, there is obtained such an effect that the power supplied by the generator or the power supply 11 can efficiently be consumed.

Also, according to still another aspect of the present invention, an electronic apparatus 10 is comprised of: a thermoelectric conversion device 71 in which P-type thermoelectric material elements 52 and N-type thermoelectric material elements 53 are sandwiched between two substrates and form a p-n junction through an electrically conductive material such as metal to be connected in series with one another; a booster circuit 12 for boosting an output voltage of the thermoelectric conversion device 71; an oscillator circuit 13 which drives the booster circuit 12; a Schottky diode 20 for rectifying the power generated by the generator or the power supply and the power boosted by the booster circuit 12; a control circuit 40 for dividing the power into a driving circuit 42 of the electronic apparatus and a capacitor 41 or from the capacitor 41 to the driving circuit 42 of the electronic apparatus according to a value of the voltage boosted by the booster circuit 12; the capacitor 41 for accumulating the boosted power to supply the power to the driving circuit 42 of the electronic apparatus; and the driving circuit 42 of the electronic apparatus which operates using the power boosted by the booster circuit 12 or the power accumulated in the capacitor 41. The oscillator circuit 13 obtains power for starting when the voltage of the thermoelectric conversion device 71 changes as time elapses so that the voltage exceeds the minimum driving voltage of the oscillator circuit 13, or the oscillator circuit 13 obtains power from the capacitor 41. The oscillator circuit 13 that has started oscillation drives the booster circuit 12 to thereby boost the output voltage generated by the generator or the power supply 11. The oscillator circuit 13 after starting oscillation continuously performs oscillation using the power boosted by the booster circuit 12. At this time, the electronic apparatus 10 according to the present invention, even if the voltage of the thermoelectric conversion device 71 changes as time elapses to be lower than the minimum driving voltage of the oscillator circuit, boosts the voltage to not lower than the minimum driving voltage of the oscillator circuit or the driving voltage of the driving circuit 42 of the electronic apparatus. Thus, in the case where the electronic apparatus 10 is continuously driven, since the output voltage of the thermoelectric conversion device 71 is not required to be always kept at the minimum driving voltage of the oscillator circuit or higher, the thermoelectric conversion device 71 can be downsized. Downsizing of the generator or the power supply 11 leads to a broader application to a portable apparatus. Also, once the output voltage of the thermoelectric conversion device 71 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without any other power sources. Particularly, since the output voltage of the thermoelectric conversion device 71 at a time instant when a temperature difference generates is several times as large as the voltage in a constant state after time elapses, the thermoelectric conversion device 71 is suitable for the electronic apparatus 10 according to the present invention. Further, since the voltage not higher than the minimum driving voltage of the oscillator circuit, which cannot be boosted in the convention electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is distributed to the capacitor 41 or the driving circuit 42 of the electronic apparatus according to a value of the voltage boosted by the booster circuit 12. Therefore, there is obtained such an effect that the power supplied by the thermoelectric conversion device 71 can efficiently be consumed.

Also, according to still another aspect of the present invention, an electronic apparatus 10 is comprised of: a generator in which the voltage of power generated changes as time elapses or a power supply 11 in which the voltage changes as time elapses; a booster circuit 12 for boosting an output voltage of the generator or the power supply 11; and oscillator circuit 13 which drives the booster circuit 12; a Schottky diode 20 for rectifying the power generated by the generator or the power supply and the power boosted by the booster circuit 12; a control circuit 40 for dividing the power into a watch movement 75 and a capacitor 41 or from the capacitor 41 to the watch movement 75 according to a value of the voltage boosted by the booster circuit 12; the capacitor 41 for accumulating the boosted power to supply the power to the watch movement 75; and the watch movement 75 including a time display function, which operates using the power boosted by the booster circuit 12 or the power accumulated in the capacitor 41. The oscillator circuit 13 obtains power for starting when the voltage of the generator or the power supply 11 changes as time elapses to that the voltage exceeds the minimum driving voltage of the oscillator circuit 13, or the oscillator circuit 13 obtains power from the capacitor 41. The oscillator circuit 13 that has started oscillation drives the booster circuit 12 to thereby boost the output voltage generated by the generator or the power supply 11. The oscillator circuit 13 after starting oscillation continuously performs oscillation using the power boosted by the booster circuit 12. At this time, the electronic apparatus 10 according to the present invention, even if the voltage of the generator or the power supply 11 changes as time elapses to be lower than the minimum driving voltage of the oscillator circuit, boosts the voltage to not lower than the minimum driving voltage of the oscillator circuit or the driving voltage of the watch movement 75. Thus, since the output voltage of the generator or the power supply 11 is not required to be always kept at the minimum driving voltage of the oscillator circuit or higher, the generator or the power supply 11 can be downsized. Downsizing of the generator or the power supply 11 leads to a broader application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the watch movement 75 without any other power sources. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is distributed to the capacitor 41 or the watch movement 75 according to a value of the voltage boosted by the booster circuit 12. Therefore, there is obtained such an effect that the power supplied by the generator or the power supply 11 can efficiently be consumed.

Also, according to still another aspect of the present invention, the structure to be described below is adopted. That is, an input terminal 160 is connected to the drain of an N-channel type MOS transistor 164 and the source of an N-channel type MOS transistor 165, a first clock signal input terminal 162 is connected to the gates of the N-channel type MOS transistor 165 and an N-channel type MOS transistor 166, a second clock signal input terminal 163 is connected to the gates of the N-channel type MOS transistor 164 and an N-channel type MOS transistor 167, the source of the N-channel type MOS transistor 164 is connected to the drain of the N-channel type MOS transistor 166 and a second electrode of a capacitor 168, a first electrode of the capacitor 168 is connected to the drain of the N-channel type MOS transistor 165 and the source of the N-channel type MOS transistor 167, an output terminal 161 for outputting a boosted voltage is connected to the drain of the N-channel type MOS transistor 167, and a GND input terminal 169 is connected to the source of the N-channel type MOS transistor 166. A voltage is boosted by a factor of 2, be repeating the operation in which an input voltage is supplied to the second electrode of the capacitor 168 the first electrode of which is connected to the GND terminal and the input voltage is supplied to the first electrode to thereby output a boosted voltage two times higher than the input voltage generated at the second electrode. Thus, there is an effect that, in the case where a voltage to be boosted is low and each of these N-channel type MOS transistor has only to supply a voltage not higher than the maximum voltage of each N-channel type MOS transistor, it can efficiently boost the voltage and further can boost the voltage however low it is.

Also, according to still another aspect of the present invention, the structure to be described below is adopted. That is, an input terminal 170 is connected to the drain of an N-channel type MOS transistor 174 and the source of an N-channel type MOS transistor 175, a first clock signal input terminal 172 is connected to the gates of the N-channel type MOS transistor 175, 176, and 177, a second clock signal input terminal 173 is connected to the gate of the N-channel type MOS transistor 174, the source of the N-channel type MOS transistor 174 is connected to the drain of the N-channel type MOS transistor 176 and a second electrode of a capacitor 178, a first electrode of the capacitor 178 is connected to the drain of the N-channel type MOS transistor 175 and the drain of the P-channel type MOS transistor 177, an output terminal 171 for outputting a boosted voltage is connected to the source grounded on the substrate of the P-channel type MOS transistor 177, and a GND terminal 179 is connected to the source of the N-channel type MOS transistor 176. A voltage is boosted by a factor of 2, by repeating the operation in which an input voltage is supplied to the second electrode of the capacitor 178 the first electrode of which is connected to the GND terminal and the input voltage is then supplied to the first electrode to thereby outputs a boosted voltage two times higher than the input voltage generated at the second electrode. In the structure as described above, in the case where a voltage to be boosted is lower than the maximum voltage of the N-channel type MOS transistors 174 and 175 and a boosted voltage generated at the first electrode of the capacitor 178 is higher than the minimum voltage which the P-channel type MOS transistor 177 can supply, there is an effect that it can efficiently boost the voltage.

Also, according to still another aspect of the present invention, the structure to be described below is adopted. That is, an input terminal 180 is connected to the source grounded on the substrate of a P-channel type MOS transistor 184 and the drain of a P-channel type MOS transistor 185, a first clock signal input terminal 182 is connected to the gates of P-channel type MOS transistor 184 and 187, and the gate of an N-channel type MOS transistor 186, a second clock signal input terminal 183 is connected to the gate of the P-channel type MOS transistor 185, the drain of the P-channel type MOS transistor 184 is connected to the drain of the N-channel type MOS transistor 186 and a second electrode of a capacitor 188, a first electrode of a capacitor 188 is connected to the source grounded on the substrate of the P-channel type MOS transistor 185 and the drain of the P-channel type MOS transistor 187, an output terminal 181 for outputting a boosted voltage is connected to the source grounded on the substrate of the P-channel type MOS transistor 187, and a GND terminal 189 is connected to the source of the N-channel type MOS transistor 186. A voltage is boosted by a factor of 2, by repeating the operation in which an input voltage is supplied to the second electrode of the capacitor 188 and the input voltage is then supplied to the first electrode to thereby output a boosted voltage two times higher than the input voltage generated at the second electrode. In the structure as described above, the system has a feature that a high voltage can be also boosted if the voltage is not lower than the minimum voltage that each P-channel type MOS transistor can supply.

Also, according to still another aspect of the present invention, the structure to be described below is adopted. That is, a first input terminal 222 is connected to the drain of an N-channel type MOS transistor 227, an second input terminal 221 is connected to the source of an N-channel type MOS transistor 228, a first clock signal input terminal 224 is connected to the gate of the N-channel type MOS transistor 227, a second clock signal input terminal 225 is connected to the gates of the N-channel type MOS transistor 228 and 229, the source of the N-channel type MOS transistor 227 is connected to the drain of the N-channel type MOS transistor 229 and a second electrode of a capacitor 210, a first electrode of the capacitor 210 is connected to the drain of the N-channel type MOS transistor 228 and an output terminal 223 for outputting a boosted voltage, and a GND input terminal 226 is connected to the source of the N-channel type MOS transistor 229. Such a boosting operation is repeated that an input voltage is supplied to the first electrode of the capacitor 210 and then the input voltage is supplied to the second electrode, to thereby obtain a boosted voltage generated at the first electrode plus a voltage at the second electrode. In such a structure, there is an effect that, in the case where a voltage to be boosted is low and each of these N-channel type MOS transistors has only to supply a voltage not higher than the maximum voltage of each N-channel type MOS transistor, it can efficiently boost the voltage and further can boost the voltage however low it is.

Also, according to still another aspect of the present invention, the structure to be described below is adopted. That is, a first input terminal 242 is connected to the drain of a P-channel type MOS transistor 247, a second input terminal 241 is connected to the source of an N-channel type MOS transistor 248, a first clock signal input terminal 244 is connected to the gate of the P-channel type MOS transistors 247, a second clock signal input terminal 245 is connected to the gates of N-channel type MOS transistors 248 and 249, the source of the P-channel type MOS transistor 247 is connected to the drain of the N-channel type MOS transistor 249 and a second electrode of a capacitor 250, a first electrode of a capacitor 250 is connected to the drain of the N-channel type MOS transistor 248 and an output terminal 243 for outputting a boosted voltage, and a GND input terminal 246 is connected to the source of the N-channel type MOS transistor 249. Such a boosting operation is repeated that an input voltage is supplied to the first electrode of the capacitor 250 and then the input voltage is supplied to the second electrode, to thereby obtain the input voltage generated at the first electrode plus the voltage generated at the second electrode. In the structure as described above, there is an effect that, in the case where a voltage to be inputted into the second input terminal 241 is lower than the maximum voltage which the N-channel type MOS transistor 248 can supply and a voltage to be inputted into the first input terminal 242 is not lower than the minimum voltage of the P-channel type MOS transistor 247, it can efficiently boost the voltage.

Also, according to still another aspect of the present invention, the structure to be described below is adopted. That is, an input terminal 300 is connected to the drain of an N-channel type MOS transistor 306, the gate of the N-channel type MOS transistor 306 is connected to a first clock signal input terminal 302, the source of the N-channel type MOS transistor 306 is connected to a first electrode of a capacitor 308 and the drain of an N-channel type MOS transistor 307, a second electrode of the capacitor 308 is connected to a third clock signal input terminal 304, the gate of the N-channel type MOS transistor 307 is connected to a second clock signal input terminal 303, the source of the N-channel type MOS transistor 307 is connected to a first electrode of a capacitor 309 and an output terminal 301, a second electrode of the capacitor 309 is connected to a fourth clock signal input terminal 305. Power is fed sequentially from the input terminal 300 to the capacitor 308 and the capacitor 309 to output the boosted power from the output terminal 301. In such a structure, there is an effect that, in the case where a voltage to be boosted is low or Vdd is high and the maximum voltage which each of the N-channel type MOS transistors can supply is also high, and each N-channel type MOS transistor has only to supply a voltage not higher than the maximum voltage of each N-channel type MOS transistor, it can efficiently boost the voltage and further can boost the voltage however low it is.

Also, according to still another aspect of the present invention, the structure to be described below is adopted. That is, an input terminal 311 is connected to the drain of a P-channel type MOS transistor 317, the gate of the P-channel type MOS transistor 317 is connected to a second clock signal input terminal 314, the source of the P-channel type MOS transistor 317 is connected to a first electrode of a capacitor 319 and the drain of a P-channel type MOS transistor 318, a second electrode of the capacitor 319 is connected to a third clock signal input terminal 315, the gate of the P-channel type MOS transistor 318 is connected to a first clock signal input terminal 313, the source of the P-channel type MOS transistor 318 is connected to a first electrode of a capacitor 320 and an output terminal 312, a second electrode of the capacitor 320 is connected to a fourth clock signal input terminal 316. Power is fed sequentially from the input terminal 311 to the capacitor 319 and the capacitor 320 to output the boosted power from the output terminal 312. In such a structure, there is an effect that, in the case where a voltage to be boosted is high and each of these P-channel type MOS transistors supplies a voltage that is not lower than the minimum voltage which each P-channel type MOS transistor can supply, it can efficiently boost the voltage and further can boost the voltage however high it is.

A booster circuit of a booster system of the present invention boosts a voltage by charging and discharging a capacitor by means of the N-channel type MOS transistor or the P-channel type MOS transistor.

The booster circuit of a booster system of the present invention may have any circuit system basically having such an arrangement, but the following three circuit systems are recommended; a first circuit system which boosts a voltage by a factor of 2n by means of a plurality of booster circuits connected in series with one another each of which boosts a voltage by a factor of 2, by repeating the operation in which an input voltage is supplied to a second electrode of the capacitor the first electrode of which is connected to a GND terminal and the input voltage is then supplied to the first electrode to thereby output a boosted voltage two times higher than the input voltage generated at the second electrode; or a second circuit system that boosts a voltage by a factor of (1+n) by charging a plurality of capacitors in parallel and then connecting the capacitors in series with one another; and furthermore a third circuit system which replaces a diode of the conventional booster circuit with an MOS transistor and thereby boosts a voltage by a factor of (1+n).

In an oscillator circuit of a booster system of the present invention, it is recommended that its power source voltage is a boosted voltage in order to display to the utmost the ability of an MOS transistor receiving a clock signal from the oscillator circuit with its gate, namely in order to make the MOS transistor receive a clock signal having the highest voltage, namely, the wave height value of the boosted voltage. Moreover, in the case where the voltage of a power supply varies, in order to obtain the optimal voltage according to the voltage of the power source, it is preferable that a clock signal is made so as to vary according to the voltage of the power source. Namely, it is recommended that the oscillator circuit vary the frequency of its output clock signal according to the voltage of the power supply.

On the other hand, it is recommended that a booster system of the present invention is provided with a voltage detecting circuit for detecting the voltage of a power supply and changes the boosting factor of a booster circuit according to a detection signal outputted from the voltage detecting circuit according to the voltage of the power supply.

It is recommended that the voltage detecting circuit of the present invention operates intermittently in order to reduce its current consumption, and it is recommended that the booster system is provided additionally with an intermittent pulse generator circuit and a signal storage circuit in order to make the voltage detecting circuit operate intermittently, and the voltage detecting circuit is operated intermittently by intermittent pulses generated by the intermittent pulse generator circuit, and a detection signal outputted at the time of operation of the voltage detecting circuit is inputted into the booster circuit through the signal storage circuit, and a detection signal at the time of operation of the voltage detecting circuit continues to be outputted to the booster circuit until the next operation.

Moreover, it is recommended that each of the circuits in a booster system of the present invention keeps low the absolute value of a threshold voltage of each MOS transistor forming each circuit in the booster system by making respectively a P-channel type MOS transistor have a P-type gate or an N-channel type MOS transistor have an N-type gate so as to operate at a lower voltage, namely, by making it possible to suppress an off-leak current even in case of lowering the absolute value of the threshold voltage.

Although a power supply of this booster system may be any power supply which generates an electromotive voltage, this system is effective to boost a voltage of a thermoelectric conversion device, a solar cell, a charged capacitor which vary in electromotive voltage, and particularly this booster system has features of making it possible to operate at a low voltage and boost a voltage in a high efficiency, and therefore it can make a thermoelectric conversion device small in volume and realize such a small-sized portable apparatus as a wristwatch and the like having a thermoelectric conversion device as a power supply by being used in boosting a voltage of the thermoelectric conversion device giving an insufficient electromotive voltage for its volume.

Embodiment 1

Embodiments of the present invention are described with reference to the drawings.

FIG. 1 is a block diagram showing a structure of the embodiment 1 according to the present invention.

An electronic apparatus 10 of this embodiment is comprised of: a generator in which the voltage of power generated changes as time elapses or a power supply 11 in which the voltage changes as time elapses; a booster circuit 12 for boosting an output voltage of the generator or the power supply 11; and an oscillator circuit 13 which drives the booster circuit 12.

Connection of each circuit will now be described. An output terminal of the generator or the power supply 11 is connected to an electromotive force input terminal of the booster circuit 12. A clock signal input terminal of the booster circuit 12 is connected to a clock signal output terminal of the oscillator circuit 13. Then, a boosted power is taken out from a boosted voltage output terminal 14 of the booster circuit 12.

Next, the principle of operation of the electronic apparatus according to this embodiment will be described. First, a voltage is applied to a Vdd input terminal of the oscillator circuit 13 to operate the oscillator circuit 13 and output a clock signal having a desired frequency to the clock signal output terminal. This clock signal is inputted into the clock signal input terminal of the booster circuit 12 for boosting operation. The booster circuit 12 boosts the power of the generator or the power supply 11 inputted from the electromotive force input terminal according to a frequency and duty of the clock signal to output the boosted power to the boosted voltage output terminal 14.

Here, even if a voltage lower than the minimum driving voltage of the oscillator circuit 13 is inputted into the electromotive force input terminal of the booster circuit 12, the booster circuit 12 can boost the voltage up to a voltage by which all the circuits in the electronic apparatus can be operated. The electronic apparatus 10 operates using the boosted power.

By employing the above-described structure, the output voltage of the generator or the power supply 11 is not required to be always kept at the minimum driving voltage of the oscillator circuit or higher, so that the generator or the power supply 11 can be downsized. Downsizing of the generator or the power supply 11 leads to broad application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

Embodiment 2

Figure 2:
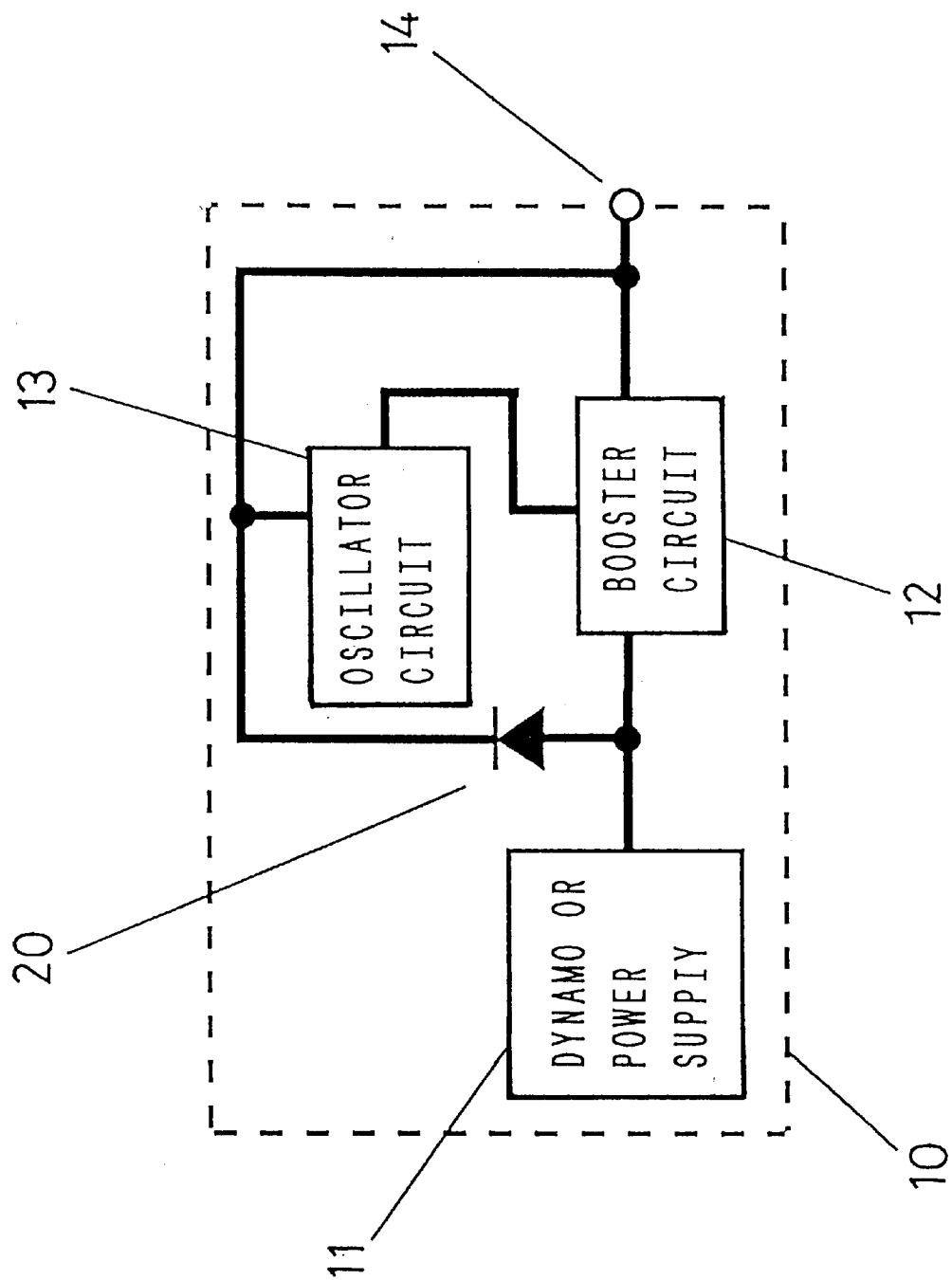
FIG. 2 is a system block diagram showing an electronic apparatus according a second embodiment of the present invention.

FIG. 2 is a block diagram showing a structure of the embodiment 2 according to the present invention.

An electronic apparatus 10 of this embodiment is comprised of: a generator in which the voltage of power generated changes as time elapses or a power supply 11 in which the voltage changes as time elapses; a booster circuit 12 for boosting an output of the generator or the power supply 11; an oscillator circuit 13 which drives the booster circuit 12; and a Schottky diode 20 for rectifying the power generated by the generator or the power supply 11 and the power outputted from the booster circuit 12.

Connection of each circuit will now be described. An output terminal of the generator or the power supply 11 is connected to the electromotive force input terminal of the booster circuit 12; a P-type electrode of the Schottky diode 20 is connected to an output terminal of the generator or the power supply 11; an N-type electrode of the Schottky diode 20 is connected to a Vdd input terminal of the oscillator circuit 13; a clock signal input terminal of the booster circuit 21 is connected to a clock signal output terminal of the oscillator circuit 13; a boosted voltage output terminal 14 of the booster circuit 12 is connected to the Vdd input terminal of the oscillator circuit 13. Then, a boosted power is taken from the boosted voltage output terminal 14 of the booster circuit 12.

Next, the principle of operation of the electronic apparatus according to this embodiment will be described. When the output voltage of the generator or the power supply 11 changes from a non-output state (namely, the output voltage=0 V) as time elapses so that the voltage exceeds the minimum driving voltage of the oscillator circuit 13, the voltage of the generator or the power supply 11 is inputted into the Vdd input terminal of the oscillator circuit 13 via the Schottky diode 20 to drive the oscillator circuit 13 and start oscillation. The oscillator circuit 13 that has started oscillation outputs the clock signal to the clock signal output terminal and inputs the signal in the clock signal input terminal of the booster circuit 12. The booster circuit 12 receives the clock signal to start boosting the output voltage of the generator or the power supply 11. At this time, since the boosted voltage output terminal 14 of the booster circuit 12 is connected to the Vdd input terminal of the oscillator circuit 13, the boosted voltage is used as the power supply of the oscillator circuit 13. The Schottky diode 20 is connected between the output terminal of the generator or the power supply 11 and the Vdd input terminal of the oscillator circuit 13. Accordingly, once the oscillator circuit 13 operates to start boosting, the oscillator circuit 13 utilizes the voltage boosted by the booster circuit 12 as the power supply. For this reason, once the voltage of generator or power supply 11 exceeds the minimum driving voltage of the oscillator circuit 13, even if the voltage falls below the minimum driving voltage of the oscillator circuit as time elapses, the boosting operation can be continued and the electric apparatus 10 continuously is driven.

Conventionally, in the case where the oscillator circuit 13 is driven by the output voltage of the generator or the power supply 11, a large margin is required for outputting the voltage so that the output voltage of the generator or the power supply 11 does not fall below the minimum driving voltage of the oscillator circuit at any time. For this reason, the size of the generator or the power supply 11 has been increased. In the present invention, however, since the above-described structure is employed, the output voltage of the generator or the power supply 11 is not required to be always kept at the minimum driving voltage of the oscillator circuit or higher, so that the generator or the power supply 11 can be downsized. Downsizing of the generator or the power supply 11 leads to broad application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without the other power sources. Also, since the voltage not higher than the minimum driving voltage of the oscillator circuit, which cannot be boosted in the conventional electronic apparatus, can be boosted, there is obtained an effect that the power efficiency of the whole system can be improved.

Embodiment 3

Figure 3:
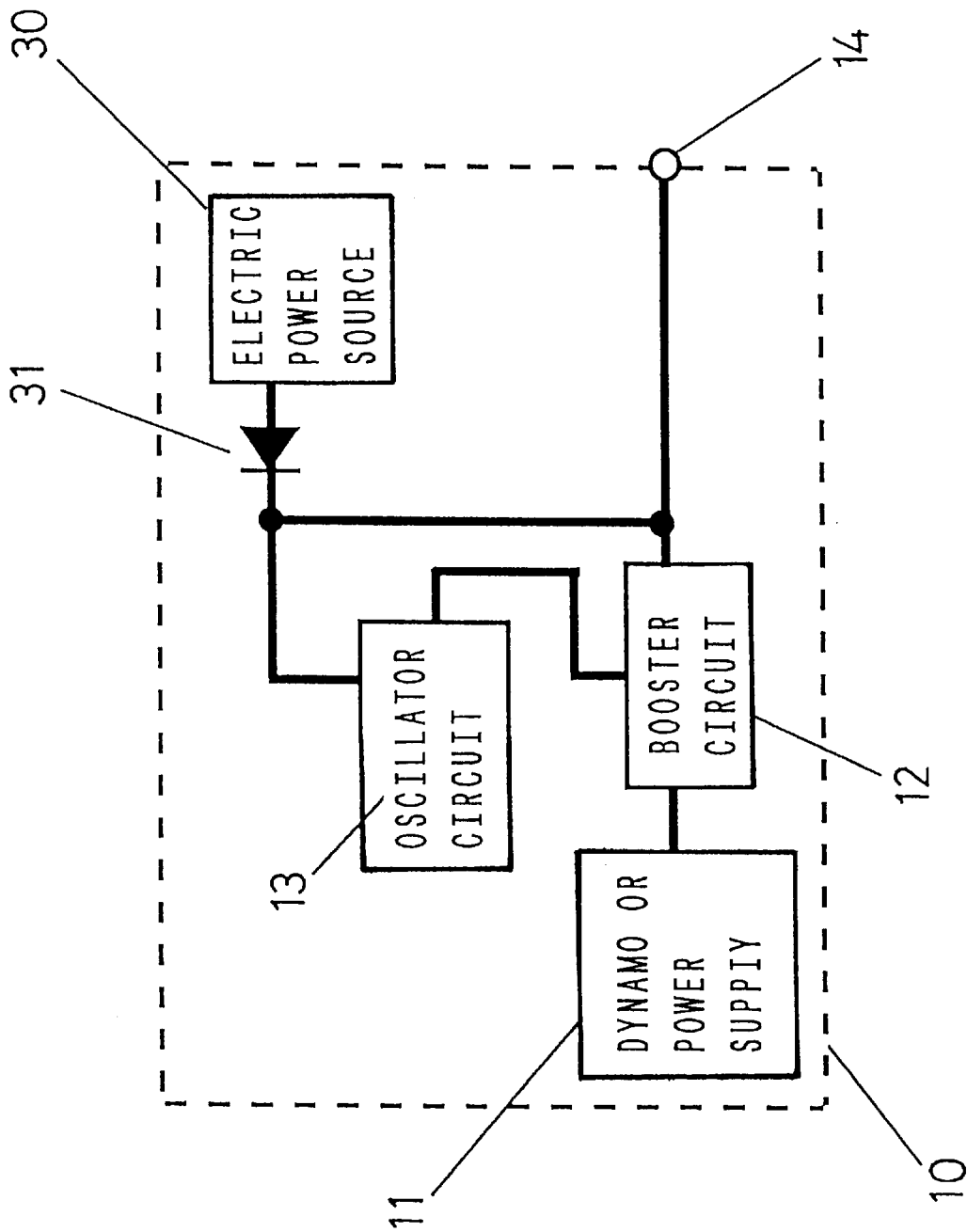
FIG. 3 is a system block diagram showing an electronic apparatus according a third embodiment of the present invention.

FIG. 3 is a block diagram showing a structure of the embodiment 3 of the present invention.

An electronic apparatus 10 according to the embodiment 3 is comprised of: a generator in which the voltage of power generated changes as time elapses or a power supply 11 in which the voltage changes as time elapses; a booster circuit 12 for boosting an output voltage of the generator or the power supply 11; an oscillator circuit 13 which drives the booster circuit 12; a Schottky diode 31 for rectifying the power generated by the generator or the power supply 11 and the power outputted by the booster circuit 12; and the power source 30 provided independently of the generator or the power supply 11.

Connection of each circuit will now be described. An output terminal of the generator or the power supply 11 is connected to an electromotive force input terminal of the booster circuit 12; a clock signal input terminal of the booster circuit 12 is connected to a clock signal output terminal of the oscillator circuit 13; a P-type electrode of the Schottky diode 31 is connected to an output terminal of the power source 30; an N-type electrode of the Schottky diode 31 is connected to a Vdd input terminal of the oscillator circuit 13; a boosted voltage output terminal 14 of the booster circuit 12 is connected to the Vdd input terminal of the oscillator circuit 13. Then, a boosted power is taken from the boosted voltage output terminal 14 of the booster circuit 12.

Next, the principle of operation of the electronic apparatus according to this embodiment will be described. First, the voltage exceeding the minimum driving voltage of the oscillator circuit 13 is inputted from the power source 30 provided independently of the generator or the power supply 11, via the Schottky diode 31, into the Vdd input terminal of the oscillator circuit 13 to drive the oscillator circuit 13 using the voltage from the power source 30 and start oscillation. The oscillator circuit 13 that has started oscillation outputs the clock signal to the clock signal output terminal and inputs the signal in the clock signal input terminal 36 of the booster circuit 12. The booster circuit 12 receives the clock signal to start boosting the output voltage of the generator or the power supply 11. At this time, since the boosted voltage output terminal 14 of the booster circuit 12 is connected to the Vdd input terminal of the oscillator circuit 13, the boosted voltage is used as the power supply of the oscillator circuit 13. Accordingly, once the oscillator circuit 13 operates to start boosting, the oscillator circuit 13 utilizes the voltage boosted by the booster circuit 12 as the power supply and it is not necessary to supply the power from the supply source 30. For this reason, even if the voltage of the generator or the power supply 11 falls below the minimum driving voltage of the oscillator circuit as time elapses, the boosting operation can be continued and the electric apparatus 10 continuously is driven. Thus, the output voltage of the generator or the power supply 11 is not required to be always kept at the minimum driving voltage of the oscillator circuit or higher. Further, since the electronic apparatus 10 according to the present invention can continue operating even if the voltage of the generator or the power supply 11 cannot exceed the minimum driving voltage of the oscillator circuit as time elapses, the generator or the power supply 11 can be downsized. Downsizing of the generator or the power supply 11 leads to broad application to a portable apparatus. Also, once the output voltage of the power source 30 provided independently of the generator or the power supply 11 exceeds the minimum driving voltage of the oscillator circuit 13, the above-mentioned oscillator circuit 13 starts operating, boosts the voltage, and drives the oscillator circuit 13 using the boosted power. Therefore, it is possible to continuously drive the driving circuit of the electronic apparatus without the other power sources. Further, since it is not necessary for the power source 30 provided independently of the generator or the power supply 11 to always supply power to the oscillator circuit 13, the power source 30 can be downsized. Also, since the voltage not higher than the minimum driving voltage of the oscillator circuit, which cannot be boosted in the conventional electronic apparatus, can be boosted, there is obtained an effect that the power efficiency of the whole system can be improved.

Embodiment 4

Figure 4:
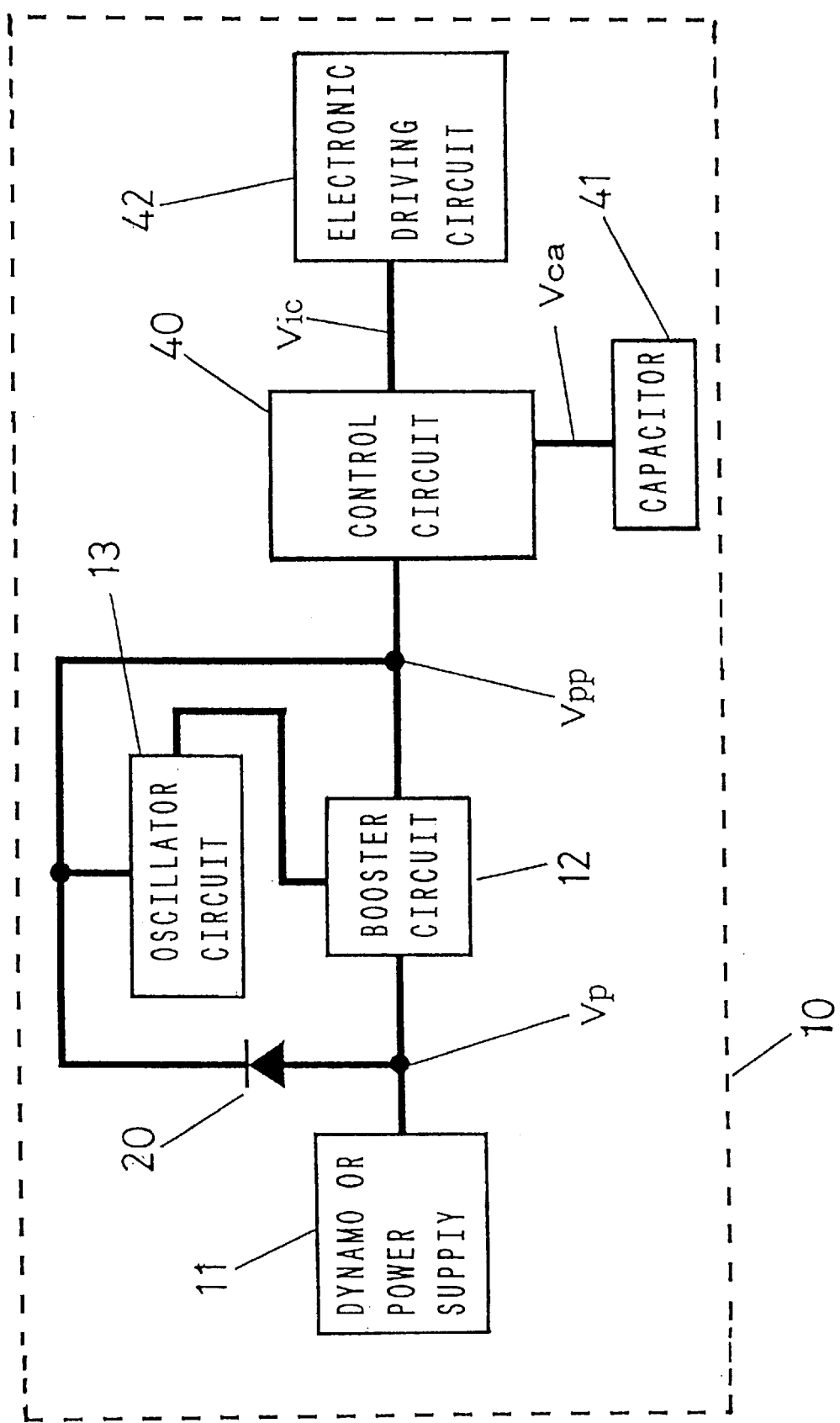
FIG. 4 is a system block diagram showing an electronic apparatus according a fourth embodiment of the present invention.

FIG. 4 is a block diagram showing a structure of the embodiment 4 according to the present invention.

An electronic apparatus 10 of this embodiment is comprises of: a generator in which the voltage of power generated changes as time elapses or a power supply 11 in which the voltage changes as time elapses; a booster circuit 12 for boosting an output voltage of the generator or the power supply 11; an oscillator circuit 13 which drives the booster circuit 12; a Schottky diode 20 for rectifying the power generated by the generator or the power supply and the power boosted by the booster circuit 12; a control circuit 40 for dividing the power into a driving circuit 42 of the electronic apparatus and a capacitor 41 or from the capacitor 41 to the driving circuit 42 of the electronic apparatus according to a value of the voltage boosted by the booster circuit 12; the capacitor 41 for accumulating the boosted power to supply the power to the driving circuit 42 of the electronic apparatus; and the driving circuit 42 of the electronic apparatus which operates using the power boosted by the booster circuit 12 or the power accumulated in the capacitor 41.

Connection of each circuit will now be described. An output terminal of the generator or the power supply 11 is connected to an electromotive force input terminal of the booster circuit 12; a P-type electrode of the Schottky diode 20 is connected to the output terminal of the generator or the power supply 11; an N-type electrode of the Schottky diode 20 is connected to a Vdd input terminal of the oscillator circuit 13; a clock signal input terminal of the booster circuit 12 is connected to a clock signal output terminal of the oscillator circuit 13; a boosted voltage output terminal 14 of the booster circuit 12 is connected to the Vdd input terminal of the oscillator circuit 13. The boosted voltage output terminal 14 of the booster circuit 12 is connected to an input terminal of a control circuit, a capacitor terminal of the control circuit is connected to an input terminal of the capacitor, and an output terminal of the control circuit is connected to a power terminal of the driving circuit 42 of the electronic apparatus. Herein, the voltage of the output terminal of the generator or power source 11 is represented as "Vp", the voltage of the boosted voltage output terminal 14 of the booster circuit 12 as "Vpp", the voltage of the power terminal of the driving circuit 42 of the electronic apparatus as "Vic", the voltage of the input terminal of the capacitor 41 as "Vca". Description will be made employing these symbols hereinunder.

Next, the principle of operation of the electronic apparatus according to this embodiment will be described. When the output voltage Vp of the generator or the power supply 11 changes from a non-output state (namely, the output voltage=0 V) as time elapses so that the output voltage Vp exceeds the minimum driving voltage of the oscillator circuit, the output voltage Vp of the generator or the power supply 11 is inputted into the Vdd input terminal of the oscillator circuit 13 via the Schottky diode 20 to drive the oscillator circuit 13 and start oscillation. The oscillator circuit 13 that has started oscillation outputs the clock signal to the clock signal output terminal and inputs the signal in the clock signal input terminal of the booster circuit 12. The booster circuit 12 receives the clock signal to start boosting the output voltage of the generator or the power supply 11. At this time, since the boosted voltage output terminal 14 of the booster circuit 12 is connected to the Vdd input terminal of the oscillator circuit 13, the boosted voltage is used as the power supply of the oscillator circuit 13. The Schottky diode 20 is connected between the output terminal of the generator or the power supply 11 and the Vdd input terminal of the oscillator circuit 13. Accordingly, once the oscillator circuit 13 operates to start boosting, the oscillator circuit 13 utilizes the voltage boosted by the booster circuit 12 as the power supply. For this reason, once the voltage of generator or power supply 11 exceeds the minimum driving voltage of the oscillator circuit 13, even if the voltage falls below the minimum driving voltage of the oscillator circuit as time elapses, the boosting operation can be continued. Also, in this system, the voltage of the capacitor 41 can be used as an oscillation starting voltage of the oscillator circuit 13. That is, the voltage is applied to the Vdd input terminal of the oscillator circuit 13 via the control circuit 40 to start oscillation. Once the oscillator circuit 13 operates to start boosting, the boosted voltage becomes the power supply for the oscillator circuit 13 similar to the above-described operation. The control circuit 40 that receives the boosted voltage Vpp distributes power into driving circuit 42 of the electronic apparatus and the capacitor 41 based upon a value of the boosted voltage Vpp. In the case where the boosted voltage Vpp is just equal to a voltage necessary for driving the driving circuit 42 of the electronic apparatus, the control circuit 40 supplies the power boosted by the booster circuit 12 to the driving circuit 42 of the electronic apparatus. If the boosted voltage Vpp is sufficient for driving the driving circuit 42 of the electronic apparatus, the control circuit 40 supplies the boosted power to both the driving circuit 42 of the electronic apparatus and the capacitor 41. In the case where the boosted voltage Vpp is such a voltage that cannot drive the driving circuit 42 of the electronic apparatus, the control circuit 40 supplies power from the capacitor 41 to the driving circuit 42 of the electronic apparatus. By this operation, even if the boosted voltage drops and cannot drive the driving circuit 42 of the electronic apparatus, operation can be performed by the power from the capacitor 41. Therefore, the driving circuit 42 of the electronic apparatus can continuously be driven.

By employing the structure as described above, since the output voltage of the generator or the power supply 11 is not required to be always kept at the minimum driving voltage of the oscillator circuit or higher, the generator or the power supply 11 can be downsized. Downsizing of the generator or the power supply 11 leads to broad application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without the other power sources. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is distributed to the capacitor 41 or the driving circuit 42 of the electronic apparatus according to a value of the voltage boosted by the booster circuit 12. Accordingly, it is possible for the driving circuit 42 of the electronic apparatus to operate immediately if the boosted voltage Vpp is equal to or higher than a voltage by which the driving circuit 42 can be driven. Therefore, there is obtained such an effect that the power supplied by the generator or the power supply can efficiently be consumed.

Embodiment 5

According to the embodiment 5 of the present invention, the generator or the power supply 11 is comprised of thermoelectric conversion devices 71. As shown in a top view and side view of the thermoelectric conversion devices 71 of FIG. 5, P-type thermoelectric material elements 52 and N-type thermoelectric material elements 53 are sandwiched between two substrates 50 and 51, and, on the substrate, P-type thermoelectric material elements 52 and N-type thermoelectric material elements 53 form a p-n junction through an electrically conductive material 54 and 55 such as metal to be connected in series with one another in a p-n-p-n manner. When the temperature difference is applied between p-n junctions, the thermoelectric conversion devices 71 generate a potential difference corresponding to the temperature difference. Therefore, when the number of p-n junctions is increased, a high voltage is generated.

Figure 6:
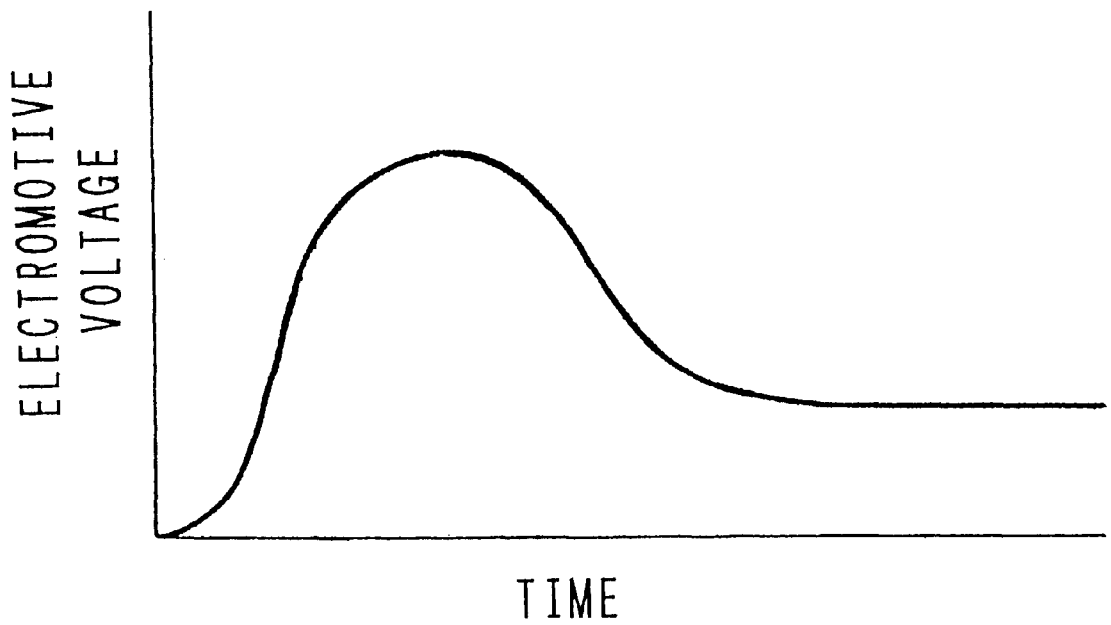
FIG. 6 is a graph showing characteristics of an output voltage of the thermoelectric conversion device in accordance with time-sequential changes.

Accordingly, when a temperature difference is applied between the substrate 50 and substrate 51, a potential difference is generated between electrodes 56 and 57 of the thermoelectric conversion device 71. In the present invention, power is generated with the substrate 50 as a high temperature side and with the substrate 51 as a low temperature side. FIG. 6 shows a time-sequential change of an electromotive voltage generated when a temperature difference is applied between substrates 50 and 51 of the thermoelectric conversion devices 71. As seen from the results of measurement, the voltage sharply increases immediately after the temperature difference is applied between the substrates of the thermoelectric conversion devices 71, but the voltage drops after passing a peak, and saturates at a certain value. Immediately after the temperature difference is given between the substrates, since the given temperature difference is directly applied to the thermoelectric conversion devices 71, a high voltage can be generated. As time elapses, however, heat is propagated from the substrate 50 to the substrate 51 through the P-type and N-type thermoelectric material elements 52 and 53, and the temperature difference between the substrates 50 and 51 is decreased. Accordingly, the generated voltage is also decreased. This phenomenon is an inevitable problem in using the thermoelectric conversion devices 71. For this reason, conventionally, thermoelectric material elements have to be connected in series so that the output voltage of the thermoelectric conversion devices 71 is always kept now lower than the minimum driving voltage of the driving circuit 42 of the electronic apparatus or the oscillator circuit 13 even if a saturated state. Further, since the thermoelectric conversion devices 71 generate power by a temperature difference, and are greatly influenced by the atmospheric temperature, a larger number of thermoelectric material elements are connected in series with one another. For this reason, the size of the thermoelectric conversion devices 71 is increased and the number of heat-propagating paths is also increased, which requires a larger heat radiating plate for the substrate 51. However, in the electronic apparatus 10 according to the present invention, when the output voltage of the thermoelectric conversion devices 71 changes from a non-output state (namely, the output voltage=0 V) as time elapses so that the output voltage exceeds the minimum driving voltage of the oscillator circuit, the voltage of the generator or the power supply 11 is inputted into the Vdd input terminal of the oscillator circuit 13 via a Schottky diode 20 to drive the oscillator circuit 13 and start oscillation. The oscillator circuit 13 that has started oscillation outputs the clock signal to the clock signal output terminal and inputs the signal in the clock signal input terminal of the booster circuit 12. The booster circuit 12 receives the clock signal to start boosting the output voltage of the generator or the power supply 11. The oscillator circuit 13 that has started oscillation continuously performs oscillation using the power boosted by the booster circuit 12. As this time, since the boosted voltage output terminal 14 of the booster circuit 12 is connected to the Vdd input terminal of the oscillator circuit 13, the boosted voltage is used as the power supply of the oscillator circuit 13. The Schottky diode 20 is connected between the output terminal of the generator or the power supply 11 and the input terminal of the oscillator circuit 13. Accordingly, once the oscillator circuit 13 operates to start boosting, the oscillator circuit 13 utilizes the voltage boosted by the booster circuit 12 as the power supply. For this reason, once the output voltage of the thermoelectric conversion devices 71 exceeds the minimum driving voltage of the oscillator circuit 13, even if thermal saturation occurs as time elapses and the voltage falls below the minimum driving voltage of the oscillator circuit, the boosting operation can be continued and the electronic apparatus 10 can continuously be driven. Therefore, if a peak value of the output voltage of the thermoelectric conversion devices 71 as shown in FIG. 6 is not lower than the minimum driving voltage of the oscillator circuit, the boosting operation is conducted to continuously drive the electronic apparatus 10 even if the output voltage of the thermoelectric conversion devices 71 is in a saturated state. The present invention enables the size of the thermoelectric conversion devices 71 to be decreased compared with conventional ones.

Embodiment 6

Description will be made of the case where the electronic apparatus 10 according to the embodiment 5 is employed for a wristwatch. Incidentally, this description can be apply to the case where the present embodiment is employed for the electronic apparatus 10 having another time display function.

The electronic apparatus 10 according to the embodiment 5 which is employed for the wristwatch is comprised of: a thermoelectric conversion device 71; a booster circuit 12 for boosting an output voltage of the thermoelectric conversion device 71; an oscillator circuit 13 which drives the booster circuit 12; a Schottky diode 20 for rectifying the power generated by the thermoelectric conversion device 71 and the power boosted by the booster circuit 12; a control circuit 40 for dividing the power into a watch movement 75 and a capacitor 41 or from the capacitor 41 to the watch movement 75 according to a value of the voltage boosted by the booster circuit 12; the capacitor 41 for accumulating the boosted power to supply the power to the watch movement 75; and the watch movement 75 which operates using the power boosted by the booster circuit 12 or the power accumulated in the capacitor 41. Connection in the above-described structure is the same with the connection as described in the embodiment 4.

Figure 7:
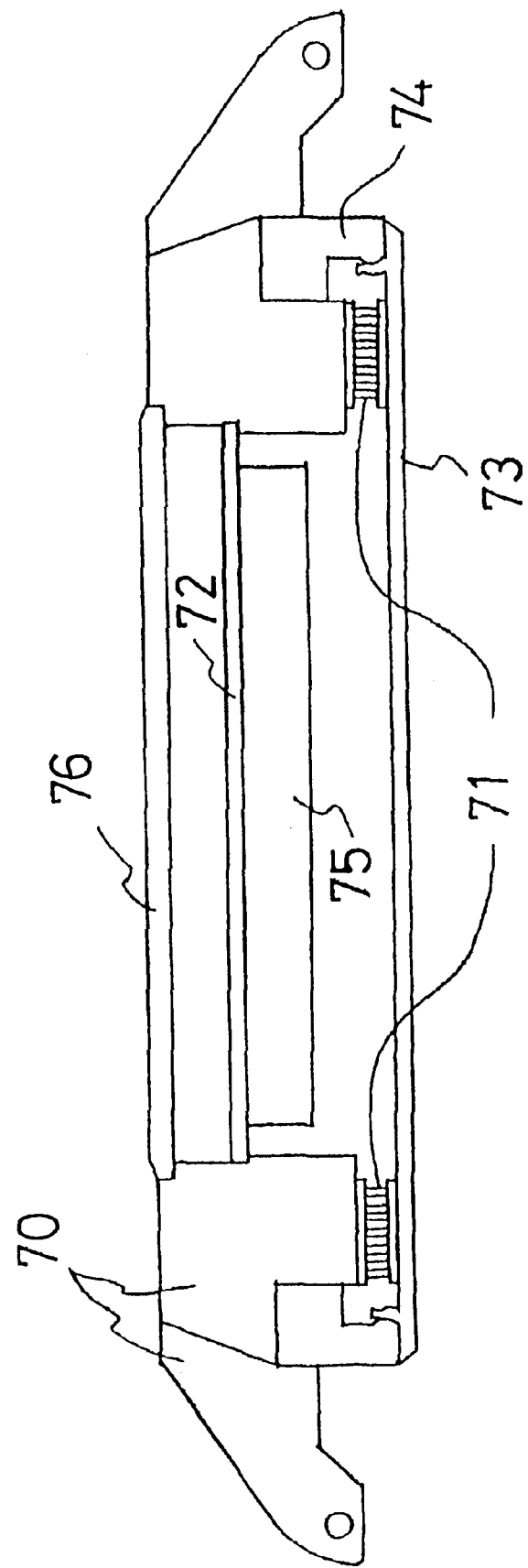
FIG. 7 is a perspective plan view in which the thermoelectric conversion device of the electronic apparatus according to the present invention is provided in a wristwatch.
Figure 8:
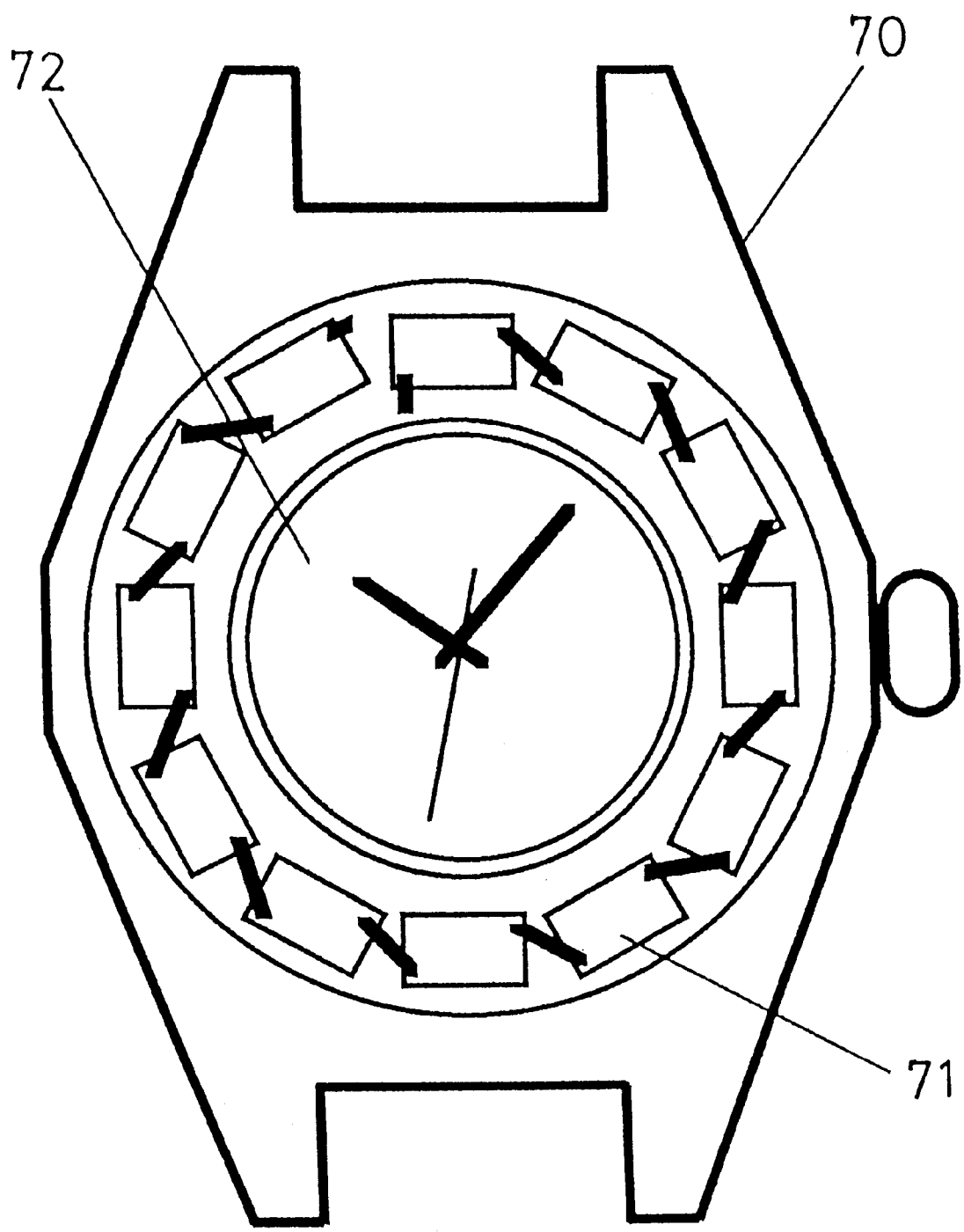
FIG. 8 is a cross-sectional view in which the thermoelectric conversion device of the electronic apparatus according to the present invention is provided in a wristwatch.
Figure 9:
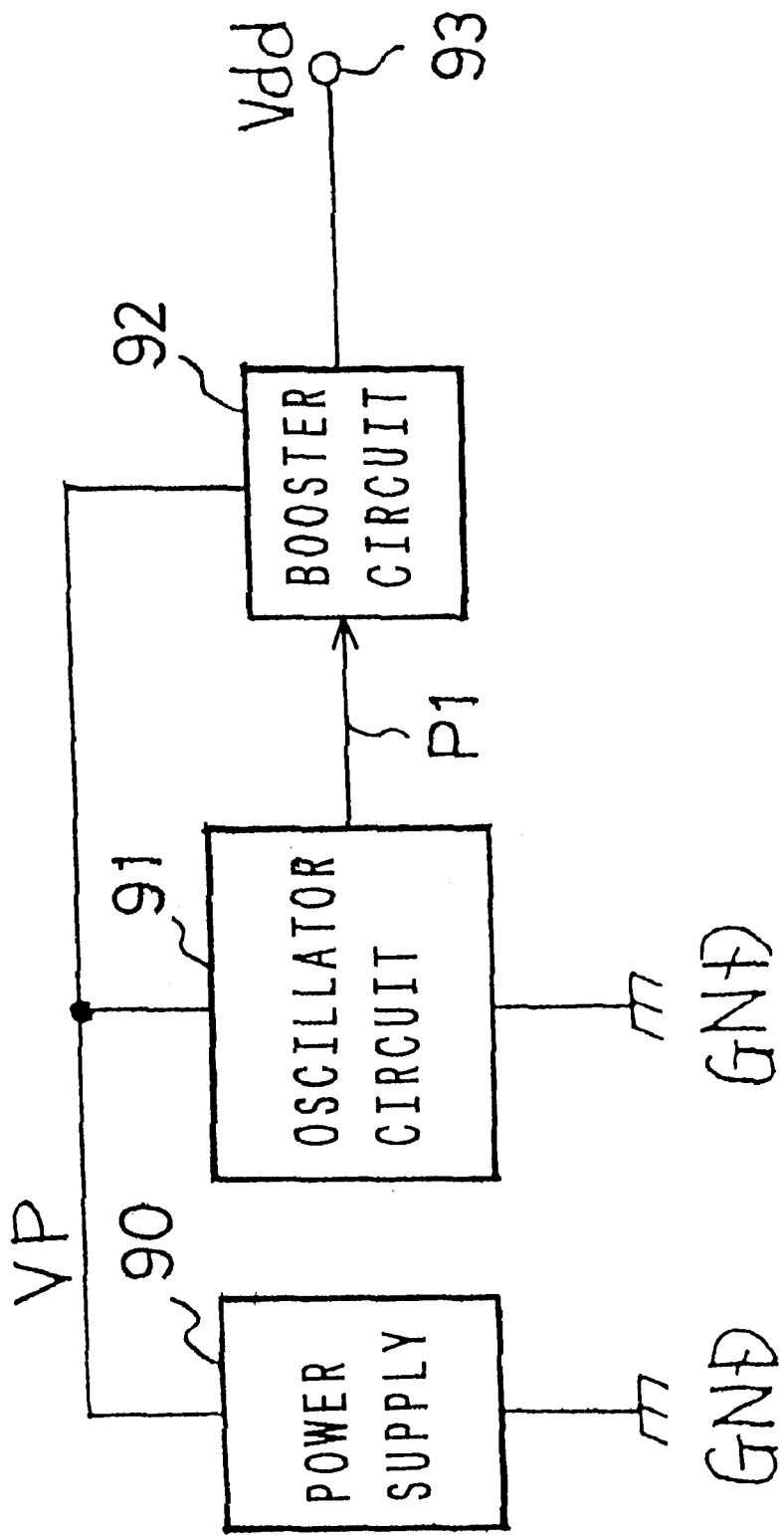
FIG. 9 is a block diagram showing a conventional booster system.

FIG. 7 is a cross-sectional view showing a case where the thermoelectric conversion devices 71 are incorporated into the wristwatch. The wristwatch is composed of: a case 70 made of a material that has a high thermal conductivity such as metal; a back cover 73; a plastic member 74 for preventing heat generated on a wrist surface from propagating to the case 70; a watch movement 75; a dial 72; a surface glass 76 covering the dial 72; and thermoelectric conversion devices 71. The circuits used in this embodiment are formed in the watch movement 75. The back cover 73 is brought into contact with a substrate 50 of the thermoelectric conversion devices 71 and the heat generated on the wrist surface is made to propagate to the substrate 50 of the thermoelectric conversion devices 71. Another substrate 51 of the thermoelectric conversion devices 71 is brought into contact with the case 70 of the wristwatch and serves as a heat radiating plate for radiating the heat to the atmosphere. The plastic member 74 is a heat insulating material for preventing the heat of the back cover 73 increased by the heat generated on the wrist surface from propagating to the case 70 of the wristwatch. When the wristwatch having the above-described structure is worn on a wrist, a temperature difference is generated between the two substrates of the thermoelectric conversion devices 71 to produce a voltage. In this case, in order to effectively generate a temperature difference between the substrates of the thermoelectric conversion devices 71, a difference is made between the heat capacities above and below the substrate. Namely, the total heat capacity of the substrate 51 of the thermoelectric conversion devices and case 70 is made to be larger than the total the capacity of the back cover 73 and the substrate 50 of the thermoelectric conversion devices. This prevents the heat of the substrate 50 from propagating to the substrate 51 via thermoelectric material elements and offsetting the temperature difference between the substrates to be saturated, so that the temperature difference is effectively produced between the substrates of thermoelectric conversion devices 71. Also, FIG. 8 is a perspective top view in which twelve mudules that are devices each including a plurality of p-n junctions of the thermoelectric conversion devices 71 which are connected in series with one another are connected in series with one another in the wristwatch. (In this case, one of the above devices is considered as one module.) Such a connection enables gaining the output voltage of the thermoelectric conversion devices 71.

In the wristwatch according to this embodiment, twelve modules having fifty pairs of the p-n junctions of the thermoelectric conversion devices 71 are connected in series with one another, and threshold voltages of transistors in the oscillator circuit 13 and booster circuit 12 are set to 0.3 V. These values must be changed depending upon the size of the wristwatch and the endothermic/heating values.

In the thermoelectric conversion devices 71, the power generated per thermoelectric material element is about 200 $\mu V/°C$. When the watch movement 75 that drives at 1.5 V is directly driven by the thermoelectric conversion devices 71, assuming that the temperature difference between the substrates is 2° C., at least 18,125 pairs of p-n junction pairs are required. However, it is difficult from the technical standpoint to contain about 2,000 pairs of devices in the wristwatch. Accordingly, the number of p-n junctions has to be decreased to thereby boost a voltage and gain 1.5 V. In this case, however, the voltage is a constant state, which is generated by the thermoelectric conversion devices 71, must exceed the minimum driving voltage of the oscillator circuit 13 that drives the booster circuit 12. To the contrary, in this embodiment, since characteristics of the thermoelectric conversion devices 71 as shown in FIG. 6 is utilized, when the generated voltage immediately after the wristwatch is worn on a wrist exceeds the minimum driving voltage of the oscillator circuit, the boosting operation is possible even if the generated voltage in a constant state (in a thermally saturated state) is lower than the minimum driving voltage of the oscillator circuit.

In this embodiment, the voltage immediately after the wristwatch is worn on the wrist is about 2 V, and a power generating ability in a constant state is about 0.5 V. Also, when the threshold voltage of the transistor is 0.3 V, the minimum driving voltage of the oscillator circuit 13 is about 0.7 V.

The principle of operation in this embodiment will be described. When the output voltage of the thermoelectric conversion devices 71 changes from a non-output state (namely, the output voltage=0 V) so that the output voltage exceeds the minimum driving voltage of the oscillator circuit after the wristwatch is worn on the wrist, the output voltage is inputted into the Vdd input terminal of the oscillator circuit 13 via the Schottky diode 20 to drive the oscillator circuit 13 and start oscillation. The oscillator circuit 13 that has started oscillation outputs a clock signal to a clock signal output terminal and inputs the signal in a clock signal input terminal of the booster circuit 12. The booster circuit 12 receives the clock signal to start boosting the output voltage of the thermoelectric conversion devices 71. At this time, since a boosted voltage output terminal 14 of the booster circuit 12 is connected to the Vdd input terminal of the oscillator circuit 13, the boosted voltage is used as the power supply of the oscillator circuit 13. The Schottky diode 20 is connected between an output terminal of the thermoelectric conversion device 71 and the input terminal of the oscillator circuit 13. Accordingly, once the oscillator circuit 13 operates to start boosting, the oscillator circuit 13 utilizes the voltage boosted by the booster circuit 12 as the power supply. For this reason, once the output voltage of the thermoelectric conversion devices 71 exceeds the minimum driving voltage of the oscillator circuit 13, even if the voltage in a constant state falls below the minimum driving voltage of the oscillator circuit, the boosting operation can be continued. Also, in this system, the voltage of the capacitor 41 can be used as an oscillation starting voltage of the oscillator circuit 13. That is, the voltage is supplied to a power terminal 22 of the oscillator circuit 13 via the control circuit 40 to start oscillation. Once the oscillator circuit 13 operates to start boosting, the boosted voltage becomes the power supply for the oscillator circuit 13 similar to the above-described operation. The control circuit 40 that receives the boosted voltage Vpp distributes power into the watch movement 75 and the capacitor 41 based upon a value of the boosted voltage Vpp. In the case where the boosted voltage Vpp is just equal to a voltage necessary for driving the watch movement 75, namely, 1.2 to 1.5 V, the control circuit 40 supplies the power boosted by the booster circuit 12 to the watch movement 75. If the boosted voltage Vpp is sufficient for driving the watch movement 75, namely, higher than 1.5 V, the control circuit 40 supplies the boosted power to both the watch movement 75 and the capacitor 41. In the case where the boosted voltage Vpp is such a voltage that cannot drive the watch movement 75, namely, lower than 1.2 V, the control circuit 40 supplies power from the capacitor 41 to the watch movement 75. By this operation, even if the boosted voltage drops and cannot drive the watch movement 75, operation can be performed by the power from the capacitor 41. Therefore, the watch movement 75 can continuously be driven.

By employing the structure as described above, since the output voltage of the thermoelectric conversion devices 71 is not required to be always kept at the minimum driving voltage of the oscillator circuit or higher, the thermoelectric conversion device 71 can be downsized. Downsizing of the thermoelectric conversion device 71 leads to broad application particularly to a portable watch apparatus. Also, once the output voltage of the thermoelectric conversion devices 71 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the watch movement 75 without the other power sources. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, the output voltage of the thermoelectric conversion devices 71 having a large internal resistance, in which devices are connected in series with one another, comes to drop so that a considerably long period of time is required for charging the capacitor 41. In the electronic apparatus 10 according to the present invention, however, the power after boosting operation is distributed to the capacitor 41 or the watch movement 75 according to a value of the voltage boosted by the booster circuit 12. Therefore, there is obtained such an effect that the power supplied by the thermoelectric conversion devices 71 can efficiently be consumed.

Embodiment 7

Figure 10:
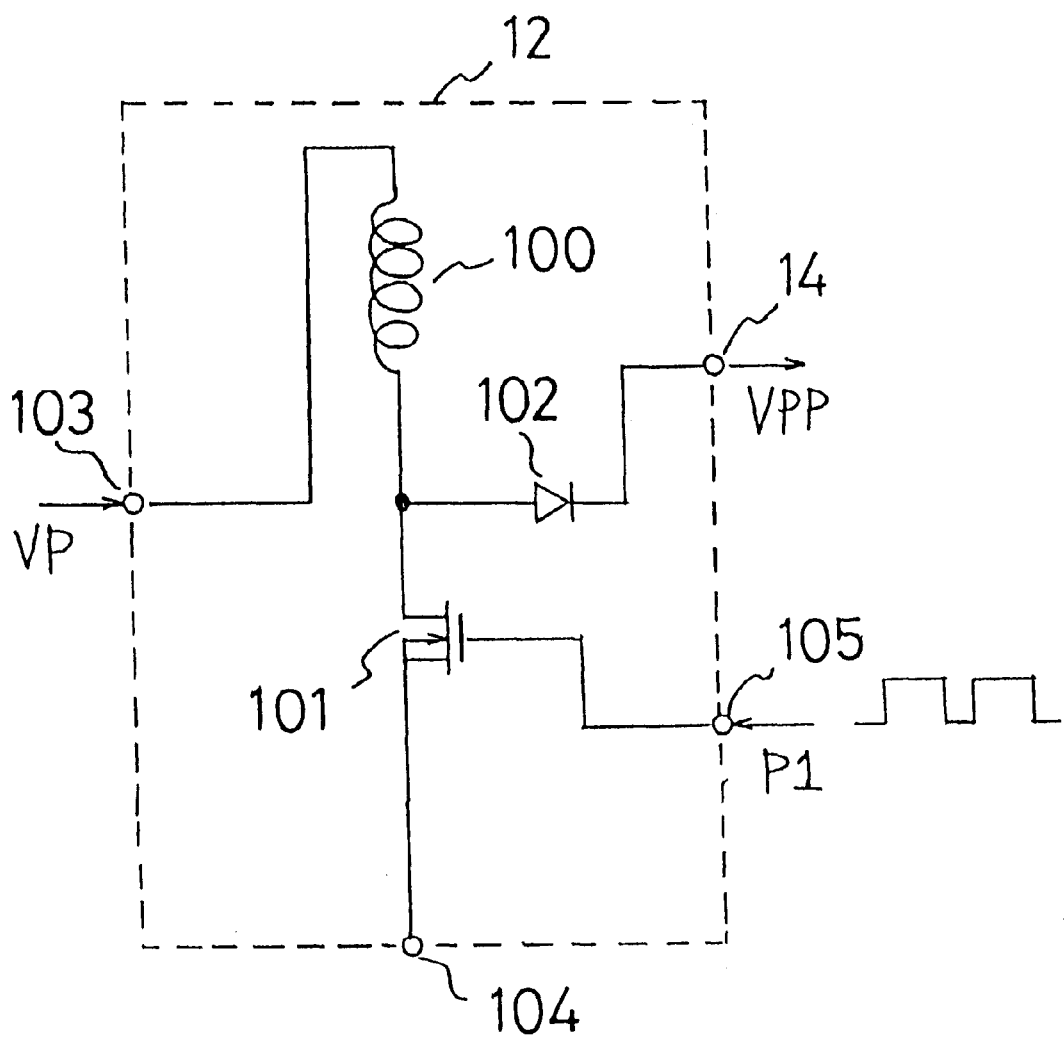
FIG. 10 is a booster circuit diagram showing a coil booster system of the electronic apparatus of the present invention.

In the embodiment 7 according to the present invention, description will be made of a booster circuit 12 having a coil as shown in FIG. 10. So long as there is no particular description, the arrangement of an embodiment is described where a power supply has a GND terminal at the lower potential side and a Vdd terminal at the higher potential side, each circuit has a CMOS transistor made by a P-substrate N-well process and the P substrate is used as a GND terminal. Accordingly, the substrate is common to all N-channel type MOS transistors and is connected with a GND terminal. And "high" means a signal of the voltage a level of a boosted voltage Vdd and "low" means a signal of the GND level.

An electromotive force input terminal 103 for inputting a voltage of a generator or the power supply 11 is connected to one of electrodes of a boosting coil 100, and the other electrode of the boosting coil 100 is connected to the drain of an N-channel type MOS transistor 101 and to a P-type electrode of a Schottky diode 102. The source of the N-channel type MOS transistor 101 is connected to a GND terminal 118 which is an electrode at the lower potential side of the generator or the power supply 11. The gate of the N-channel type MOS transistor 101 is connected to a clock signal input terminal 105 that is connected to a clock signal output terminal of the oscillator circuit 13, and an N-type electrode of the Schottky diode 102 is connected to a boosted voltage output terminal 14. In the above-described structure, the output voltage of the generator or the power supply 11 is boosted using the clock signal from the oscillator circuit 13. In the case where the booster circuit 12 according to the present invention is manufactured by the same process with that for the oscillator circuit 13, assuming that threshold voltages of the N- and P-channel type transistors of the oscillator circuit 13 are 0.3 V, the threshold voltage of the N-channel type MOS transistor 101 in the booster circuit 12 is also 0.3 V. At this time, the minimum driving voltage of the oscillator circuit 13 is 0.7 V. In the booster circuit 12 according to the present invention, however, since the transistor, the drain of which is connected to one of the electrodes of the coil, is an N-channel type transistor, boosting operation is possible even if the voltage of the electromotive force input terminal 103 is 0.1 V. In the case where the frequency of the output clock signal of the oscillator circuit 13 is 1 to 5 kHz and a duty thereof is 67%, the voltage of the electromotive force input terminal input terminal 103 which is 0.1 V is boosted to 1.5 V.

Figure 11:
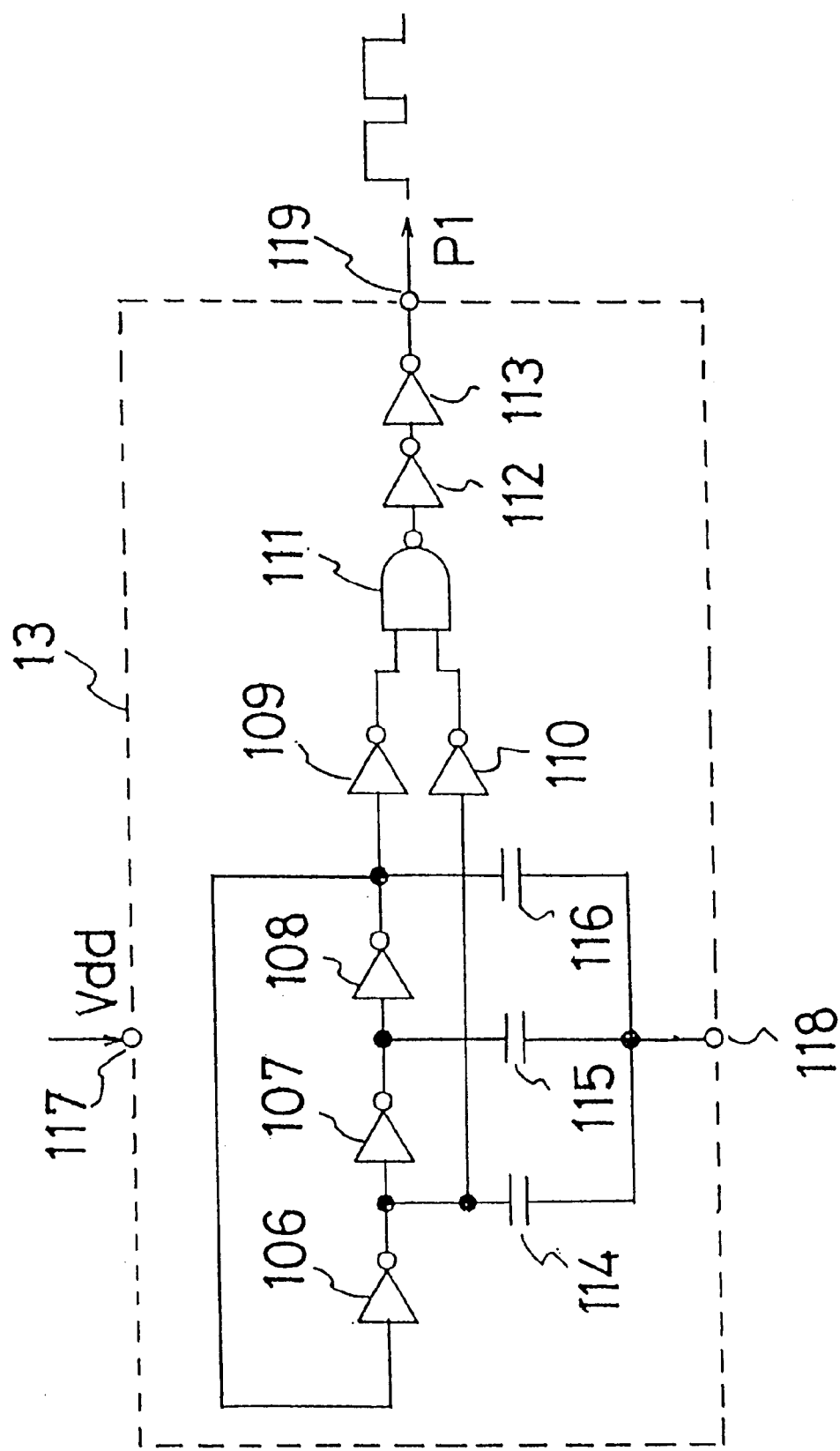
FIG. 11 is a circuit diagram showing an oscillator circuit used in the coil-boosting operation of the electronic apparatus of the present invention.

FIG. 11 shows the oscillator circuit 13 that outputs a clock signal necessary for boosting the voltage of the coil. An output terminal of an inverter circuit 106 is connected to an input terminal of an inverter circuit 107 and a first electrode of a capacitor 114 and an input terminal of an inverter circuit 110, and an output terminal of an inverter circuit 107 is connected to an input terminal of an inverter circuit 108 and a first electrode of a capacitor 115. An output terminal of the inverter circuit 108 is connected to the input terminals of the inverter circuit 106 and 109 and a first electrode of a capacitor 116. Two-input NAND circuit 111 connects an output terminal of the inverter circuit 109 to a first input terminal of the two-input NAND circuit 111, and an output terminal of the inverter circuit 110 is connected to a second input terminal of the two-input NAND circuit 111. The output terminal of the two-input NAND circuit 111 is connected to an input terminal of an inverter circuit 112, and an output terminal of the inverter circuit 112 is connected to an input terminal of an inverter circuit 113. An output terminal of the inverter circuit 113 is connected to a clock signal output terminal 119 for outputting a clock signal P1, and second electrodes of the capacitors 114, 115, and 116 are connected to the GND terminal 118 which is an electrode at the lower side of the generator or the power supply 11. In this case, the respective inverter circuits and a power supply of the two-input NAND circuit 111 is connected to a Vdd input terminal 117 of the oscillator circuit. The grounded terminals of the two-input NAND circuit 111 and the respective inverter circuits are connected to the GND terminal 118. By the above-described structure, the clock signal for about 67% of duty is obtained. Also, in the oscillator circuit 13 according to the present invention, assuming that threshold voltages of N-channel type transistors and P-channel type transistors in the inverter circuits are, for example, 0.3V, respectively, the minimum diving voltage of the oscillator 13 is 0.7 V.

The above-described structure enable effectively boosting a low voltage of the electromotive force input terminal 103 of the booster circuit 12. Particularly, this structure is more effective in the case where the voltage of the electromotive force input terminal 103 is lower than the threshold voltages of the MOS transistors.

Embodiment 8

Figure 12:
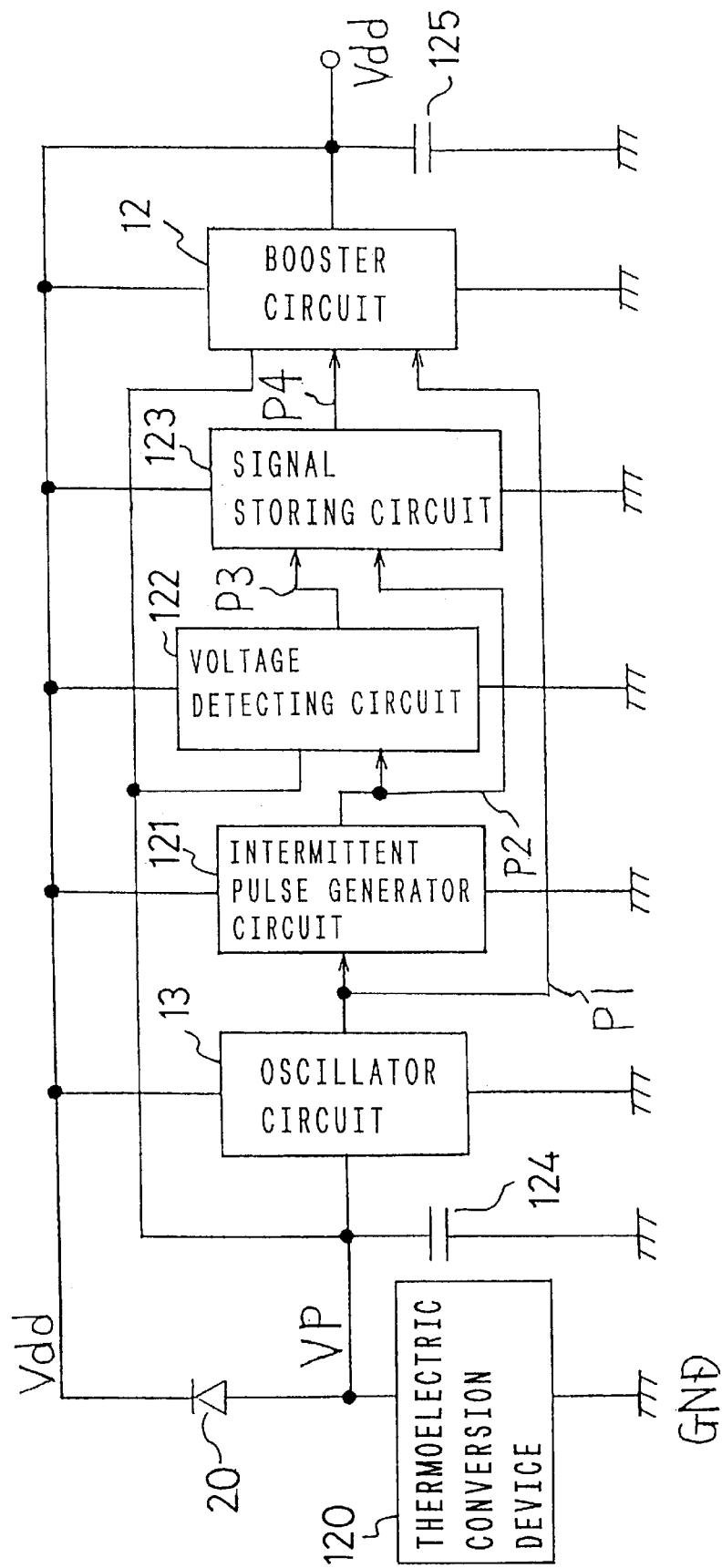
FIG. 12 is a block diagram showing an embodiment of a booster system of the electronic apparatus of the present invention.

FIG. 12 is a block diagram of a booster system of a thermoelectric conversion device according to an embodiment of the present invention. This system is composed of a thermoelectric conversion device 120, an oscillator circuit 13, an intermittent pulse generator circuit 121, a voltage detecting circuit 122, a signal storage circuit 123, a booster circuit 12, a diode 20, and smoothing capacitors 124 and 125.

Figure 5A:
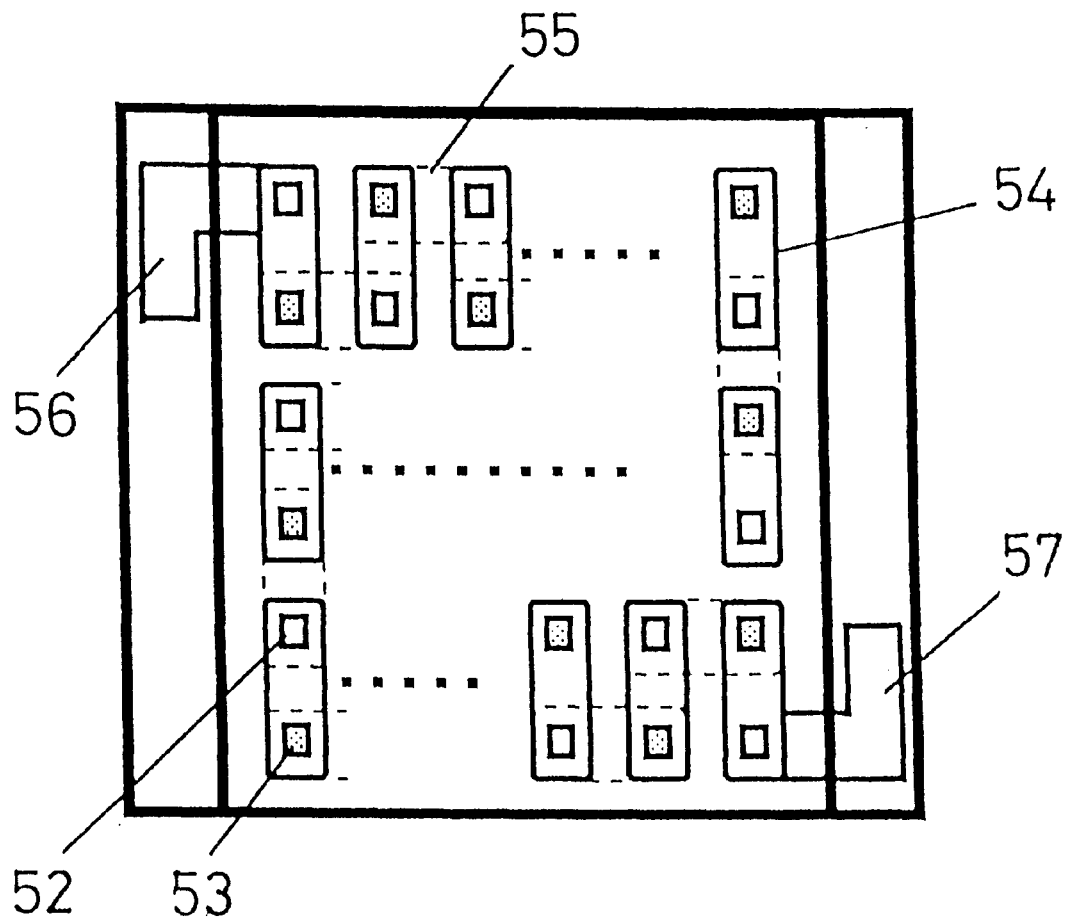
FIGS. 5A–B are a perspective plan view and a cross-sectional view showing a thermoelectric conversion device according to the present invention.
Figure 5B:
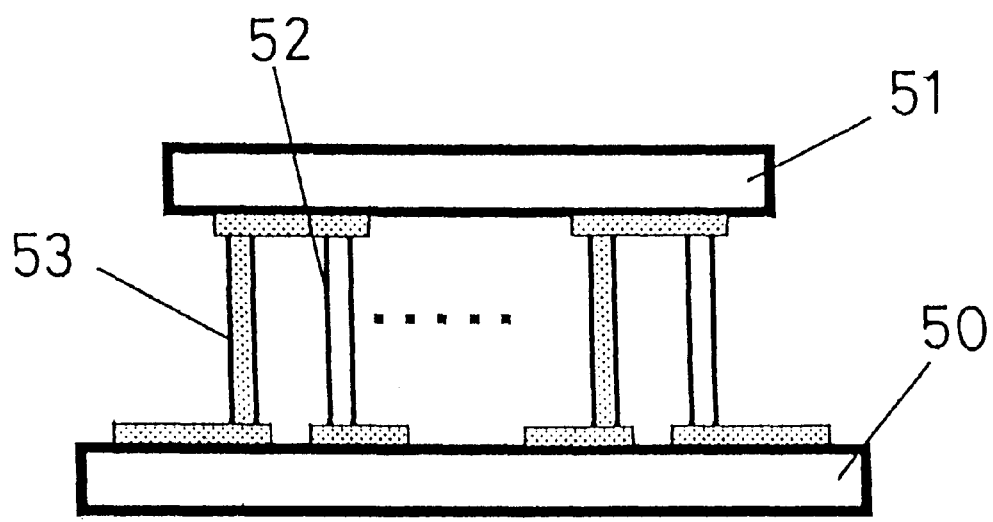

The thermoelectric device 120 is a device for generating electricity based upon the principle of Seebeck effect and is composed of a plurality of devices connected in series with one another each of which is made, shown in FIG. 5, by connecting a P-type semiconductor and an N-type semiconductor with each other which are formed by introducing impurities into a material of Bi-Te system, wherein one electrode at the lower potential side is the GND terminal and is connected to the GND terminals of the oscillator circuit 13, the intermittent pulse generator circuit 121, the voltage detecting circuit 122, the signal storage circuit 123 and the booster circuit 12. The other electrode of the thermoelectric conversion device 120 is used to take out an electromotive voltage Vp, and characteristics in 500 pairs of p-n junctions are such that its internal resistance is about 2 k Ω and its electromotive voltage is about 0.4 V at a temperature difference of 1° C.

The oscillator circuit 13 has a structure in which Vdd that is connected to an output terminal of the thermoelectric conversion device 120 via the Schottky diode 20 is connected to a Vdd input terminal of the oscillator circuit 13 and an oscillating frequency is varied according to the electromotive voltage Vp of the thermoelectric conversion device 120.

The intermittent pulse generator circuit 121 is a circuit which has its power terminal connected to Vdd and generates an intermittent pulse signal P2 based on a clock signal P1 outputted by the oscillator circuit 13.

The voltage detecting circuit 122, which has its power terminal connected to Vdd and detects the Vp, outputs a detection signal P3 according to the Vp and intermittently operates based on an intermittent pulse signal P2 from the intermittent pulse generator circuit 121.

The signal storage circuit 123 is a circuit which has its power terminal connected to Vdd, stores a detection signal P3 at the time of operation of the voltage detecting circuit 122 until the next operation of the voltage detecting circuit 122, and outputs the stored detection signal P3 to the booster circuit 12 as a storage signal P4.

The booster circuit 12, which has its power terminal connected to Vdd and boosts the Vp to a boosted voltage Vdd higher than the Vp, generates the boosted voltage Vdd by turning on/off each MOS transistor according to a clock signal P1 to charge/discharge a capacitor, and switches over its boosting factor according to a storage signal P4.

The diode 20 is provided in order to use the electromotive voltage Vp of the thermoelectric conversion device 120 as a boosting power at the initial stage at which a boosted voltage is not stored to Vdd yet and in order to supply the Vp which is so high enough as to need no boosting operation to Vdd as it is, and in order to use boosted output voltage of boosted circuit 13 as a boosting power when electromotive voltage of the electronic conversion device 120 is low and is connected between the thermoelectric conversion device 120 and the Vdd so that the direction from the thermoelectric conversion device 120 to the Vdd is its forward direction.

Moreover, the smoothing capacitors 124 and 125 each of which has one side connected to GND terminal are provided on the output of the thermoelectric conversion device 120 and the Vdd.

Due to the above-mentioned arrangement the boosting factor of the booster circuit 13 can be switched over according to the electromotive voltage of the thermoelectric conversion device 120. Therefore, it is possible to efficiently boost the Vp to the boosted voltage Vdd, and to prevent the boosted voltage Vdd from becoming overvoltage caused by that the Vp has become too high.

Furthermore, it is possible to keep low power consumption of the voltage detecting circuit 122 by making the voltage detecting circuit 122 operate intermittently. Namely, since its is possible to keep low power required for boosting voltage, the boosting efficiency is improved.

As the diode 20, a Schottky diode which is small in voltage drop in its forward direction, or an MOS transistor which has a low (0.1 V) threshold voltage when diode-connected, or an MOS transistor which has a low (0.1 V) threshold voltage when diode-connected and whose gate and source or drain are P-typed or N-typed is recommended.

Although the present invention has been described using a thermoelectric conversion device as an example, it is a matter of course that the invention can be applied also to boost an electromotive voltage of a device which generates power by means of another external energy, or to boost a voltage of a capacitor or a capacitor element of a secondary battery or the like.

Figure 13:
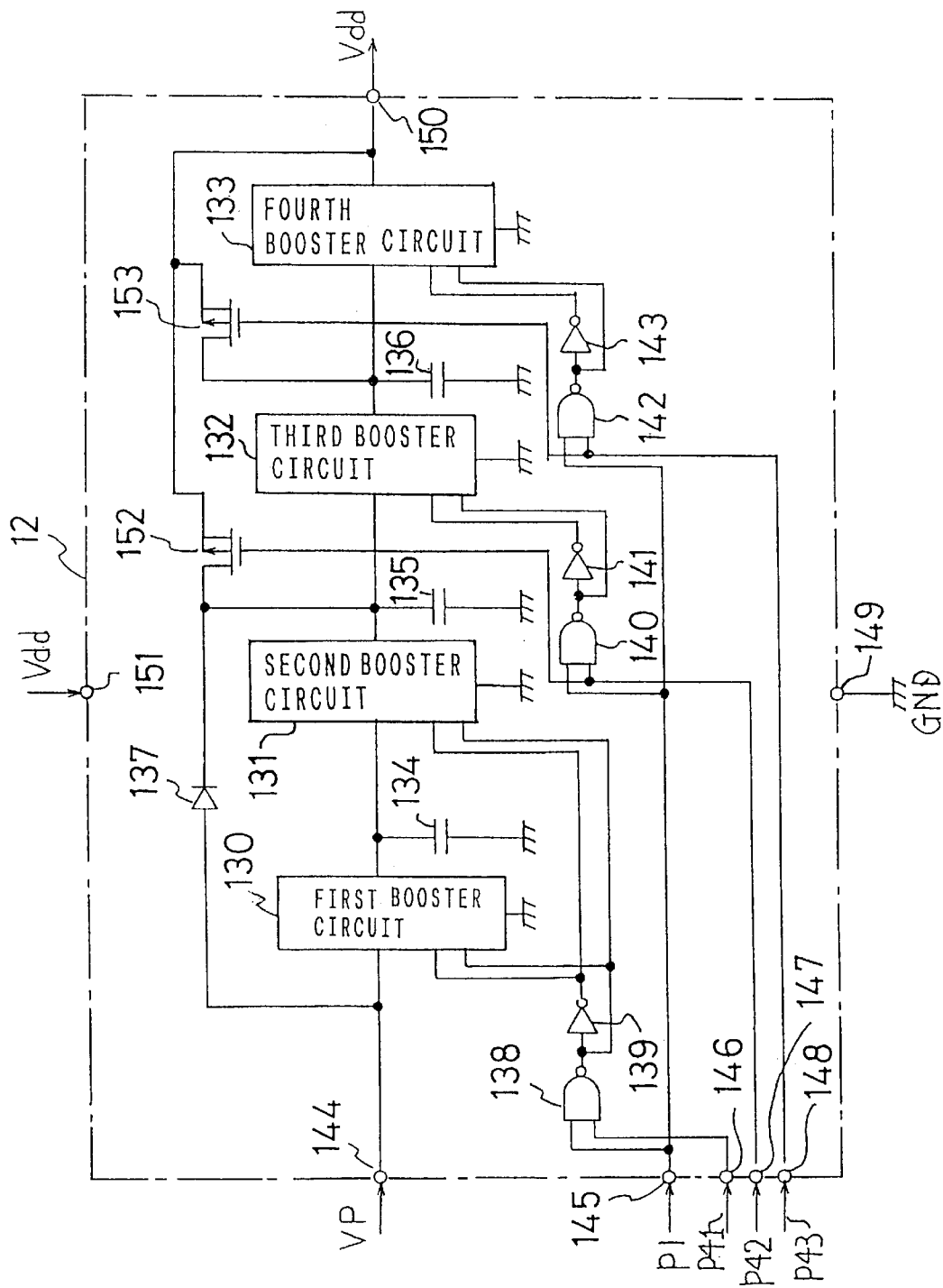
FIG. 13 is a block diagram showing a booster circuit in a switched capacitor system of the electronic apparatus of the present invention.

FIG. 13 is a circuit diagram of the booster circuit 13 shown in FIGS. 1, 2, 3, 4 and 12. It is composed of a first booster circuit 130, a second booster circuit 131, a third booster circuit 132, a fourth booster circuit 133, two-input NAND circuits 138, 140 and 142, inverter circuits 139, 141 and 143, P-channel type MOS transistors 152 and 153, smoothing capacitors 134, 135 and 136, and a diode 137.

First, a state of connection of the respective components is described.

An electromotive force input terminal 144 for inputting Vp which is the electromotive force of the thermoelectric conversion device 120 is connected to an input terminal of the first booster circuit 130 and the electrode at the positive side of the diode 137.

An output terminal of the first booster circuit is connected to one electrode of the smoothing capacitor 134 the other electrode of which is connected to the GND terminal and an input terminal of the second booster circuit 131.

An output terminal of the second booster circuit 131 is connected to one electrode of the smoothing capacitor 135 the other electrode of which is connected to the GND terminal, the electrode at the negative side of the diode 137, the drain terminal of the P-channel type MOS transistor 152, and an input terminal of the third booster circuit 132.

An output terminal of the third booster circuit 132 is connected to one electrode of the smoothing capacitor 136 the other electrode of which is connected to the GND terminal, the drain terminal of the P-channel type MOS transistor 153, and an input terminal of the fourth booster circuit 133.

An output terminal of the fourth booster circuit 133 is connected to the source and N well of each of the P-channel type MOS transistors 152 and 153, and a boosted voltage output terminal 150 for outputting a boosted voltage Vdd.

A clock signal input terminal 145 for inputting a clock signal P1 from the oscillator circuit 13 is connected to one input terminal of each of two-input NAND circuits 138, 140 and 142.

A first detection signal input terminal 146 for inputting a first storage signal P41 storing a first detection signal which is one of detection signals from the voltage detecting circuit 122 is connected to the other input terminal, which is not connected to the clock signal input terminal, of the two-input NAND circuit 138.

A second detection signal input terminal 147 for inputting a second storage signal P42 storing a second detection signal which is one of the detection signals from the voltage detecting circuit 122 is connected to the other input terminal, which is not connected to the clock signal input terminal, of the two-input NAND circuit 140 and the gate terminal of the P-channel type MOS transistor 152.

A third detection signal input terminal 148 for inputting a third storage signal P43 storing a third detection signal which is one of the detection signals from the voltage detecting circuit 122 is connected to the other input terminal, which is not connected to the clock signal input terminal, of the two-input NAND circuit 142 and the gate terminal of the P-channel type MOS transistor 153.

An output terminal of the two-input NAND circuit 138 is connected to an input terminal of an inverter circuit 139 and respective second clock signal input terminals of the first booster circuit 130 and the second booster circuit 131.

An output terminal of the inverter circuit 139 is connected to the respective first clock signal input terminals of the first booster circuit 130 and the second booster circuit 131.

An output terminal of the inverter circuit 141 is connected to the first clock signal input terminal of the third booster circuit 132, and an output terminal of the inverter circuit 143 is connected to the first clock signal input terminal of the fourth booster circuit 133.

The respective power terminals of the two-input NAND circuits 138, 140, and 142, and the inverter circuits 139, 141, and 143 are connected to the Vdd input terminal 151 having the boosted voltage Vdd to be inputted, and the respective GND terminals of them are connected to a GND terminal 149 connected to the low voltage side electrode of the thermoelectric conversion device.

In case that all of the first storage signal P41, the second storage signal P42 and the third storage signal P43 are "low", since no clock signal is inputted to all of the first to the fourth booster circuits, all the booster circuits do not operate and perform no boosting operation. Although the P-channel type MOS transistors 152 and 153 are on, a leak current leaking through the both transistors from the boosted voltage output terminal 150 is only a charging current from a capacitance component dangling about the drains of both the transistors.

In case that the first storage signal P41 is "high" and the second storage signal P42 and the third storage signal P43 are "low", since a clock signal is inputted into the first booster circuit 130 and the second booster circuit 131, only the first booster circuit 130 and the second booster circuit 131 operate and the P-channel type MOS transistor 152 is turned on, and therefore the electromotive voltage Vp of the thermoelectric conversion device 120 is first boosted by a factor of about 2 by the first booster circuit 130 and further boosted by a factor of about 2 by the second booster circuit 131, and supplied through the P-channel type MOS transistor 152 to the Vdd. Namely, since the boosting factor is about 4, the Vdd becomes about 4 times higher than Vp. Although the P-channel type MOS transistor 153 is also on, a current leaking through the transistor from the boosted voltage output terminal 150 is only a charging current from a capacitance component dangling about the drain of the transistor.

In case that the first storage signal P41 and the second storage signal P42 are "high" and the third storage signal P43 is "low", since a clock signal is inputted into the first booster circuit 130 and the second booster circuit 131, the first booster circuit 130, the second booster circuit 131 and the third booster circuit 132 operate and the P-channel type MOS transistor 152 is turned off and the P-channel type MOS transistor 153 is turned on, and therefore the Vp is first boosted by a factor of about 2 by the first booster circuit 130 and then boosted by a factor of about 2 by the second booster circuit 131 and further boosted by a factor of about 2 by the third booster circuit 132, and then supplied through the P-channel type MOS transistor 153 to the booster voltage output terminal 150. Namely, since the boosting factor is about 8, the Vdd becomes about 8 times higher than Vp.

In case that the first storage signal P41, the second storage signal P42 and the third storage signal P43 are all "high", since the clock signal is inputted into all of the first to the fourth booster circuits, the P-channel type MOS transistors 152 and 153 are turned off and all of the first to furth booster circuits operate, and therefore the Vp is first boosted by a factor of about 2 by the first booster circuit 130, and then boosted by a factor of about 2 by the second booster circuit 131 and further boosted by a factor of about 2 by the third booster circuit 132, and still further boosted by a factor of about 2 by the fourth booster circuit 133, and then outputted from the boosted voltage output terminal 150. Namely, since the boosting factor is about 16, the Vdd becomes about 16 times higher than Vp.

As described a diode 137 in detail later, the first booster circuit 130 and the second booster circuit 131 are characterized by being small in their boosting ability in case that the Vdd is low in voltage, and so the diode 137 is provided in order to improve the boosting speed at the initial stage where the Vdd voltage is low by using the third booster circuit 132 and the fourth booster circuit 133 without using the first booster circuit 130 and the second booster circuit 131.

Namely, by adopting the above-mentioned arrangement, it is possible to realize a booster circuit capable of varying its boosting factor according to the output signals P41, P42, and P43 of the signal storage circuit 123 storing detection signals of the voltage detecting circuit 122 as described above.

Figure 14:
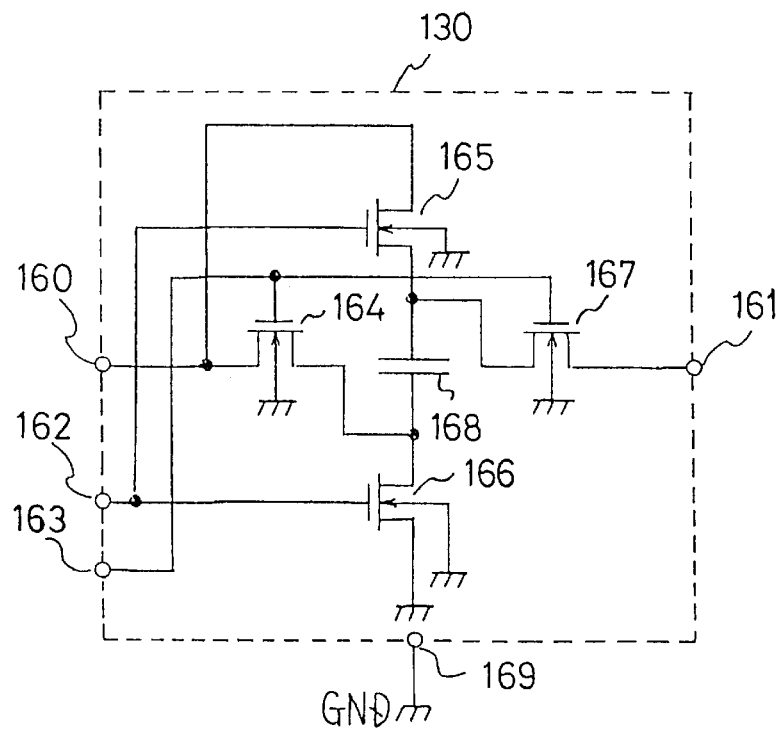
FIG. 14 is a circuit diagram showing a first booster circuit in the switched capacitor system of the electronic apparatus of the present invention.

FIG. 14 is a circuit diagram of the first booster circuit 130 shown in FIG. 13 according to the present invention.

First, its connection is described. An input terminal 160 to which an electromotive voltage Vp of the thermoelectric conversion device 120 is inputted is connected to the drain of an N-channel type MOS transistor 164 and the source of an N-channel type MOS transistor 165, a first clock signal input terminal 162 is connected to the gates of the N-channel type MOS transistor 165 and an N-channel type MOS transistor 166, a second clock signal input terminal 163 is connected to the gates of the N-channel type MOS transistor 164 and an N-channel type MOS transistor 167, the source of the N-channel type MOS transistor 164 is connected to the drain of the N-channel type MOS transistor 166 and a second electrode of a capacitor 168, a first electrode of the capacitor 168 is connected to the drain of the N-channel type MOS transistor 165 and the source of the N-channel type MOS transistor 167, an output terminal 161 for outputting a boosted voltage is connected to the drain of the N-channel type MOS transistor 167, and a GND input terminal 169 is connected to the source of the N-channel type MOS transistor 166.

Next, the principal of operation is described. First, when a first clock signal inputted from the first clock signal input terminal 162 is "high", a second clock signal inputted from the second clock signal input terminal 163 is "low" and the N-channel type MOS transistors 165 and 166 are turned on and the N-channel type MOS transistors 164 and 167 are turned off, and therefore since the first electrode of the capacitor 168 is supplied with a voltage supplied to the input terminal 160 through the N-channel type MOS transistor 165, the voltage of the first electrode rises to a certain voltage Va, and since the second electrode of the capacitor is supplied with a voltage of GND through the N-channel type MOS transistor 166, it becomes "low".

Next, when the first clock signal inputted from the first clock signal input terminal 162 is "low", the second clock signal inputted from the second clock signal input terminal 163 is "high" and the N-channel type MOS transistors 165 and 166 are turned off and the N-channel type MOS transistors 164 and 167 are turned on, and therefore since the second electrode of the capacitor 168 is supplied with a voltage supplied to the input terminal 160 through the N-channel type MOS transistor 164, the second electrode rises to a certain voltage Vb. Accordingly, the first electrode of the capacitor rises to a voltage obtained by adding the Va and the Vb to each other and since the voltage is supplied to the output terminal 161 through the N-channel type MOS transistor 167, the voltage of the output terminal 161 rises to a certain voltage Vc.

In this case, the values of Va, Vb and Vc are related to the maximum voltage value which can be supplied between the source and the drain when an N-channel type MOS transistor is turned on, and any low voltage can be supplied by the N-channel type MOS transistors so long as it is not higher than the maximum voltage value, but any high voltage can be supplied only up to the maximum voltage value, however high the voltage is, if it is higher than the maximum voltage value.

Namely, when a voltage supplied from the input terminal 160 is not higher than the maximum voltage value of the N-channel type MOS transistor 165, Va becomes the same voltage as the voltage supplied from the input terminal 160, but when the voltage supplied from the input terminal 160 is higher than the maximum voltage value of the N-channel type MOS transistor 165, Va becomes the maximum voltage value of the N-channel type MOS transistor 165; and when a voltage supplied from the input terminal 160 is not higher than the maximum voltage value of the N-channel type MOS transistor 164, Vb becomes the same voltage as the voltage supplied from the input terminal 160, but when the voltage supplied from the input terminal 160 is higher than the maximum voltage value of the N-channel type MOS transistor 164, Vb becomes the maximum voltage value of the N-channel type MOS transistor 164; and when a value obtained by adding Va and Vb to each other which are generated at the first electrode of the capacitor 168 is not higher than the maximum voltage value of the N-channel type MOS transistor 167, Vc becomes the same voltage value as the value obtained by adding Va and Vb to each other, but when the thus obtained value is higher than the maximum voltage value of the N-channel type MOS transistor 167, Vc becomes the maximum voltage value of the N-channel type MOS transistor 167. The maximum voltage value of each of the above-mentioned N-channel type MOS transistors is, when each of the N-channel type MOS transistors is turned on, a voltage of "high" of a clock signal inputted to the gate of each of the N-channel type MOS transistors, namely, a value obtained by subtracting the threshold voltage from the voltage applied to each N-channel type MOS transistor.

Namely, the first booster circuit 130 has a feature that in case that a voltage to be boosted is low and each N-channel type MOS transistor can do with supplying only a voltage not higher than the maximum voltage of the N-channel type MOS transistor, it can efficiently boost the voltage and further can boost the voltage however low it is, and has a feature that in case that a voltage to be boosted is high or in case that the Vdd is low and any one of the respective N-channel type MOS transistors must supply a high voltage than the maximum voltage value of the N-channel type MOS transistor, its boosting efficiency becomes low and moreover in case that a voltage to be boosted is further higher or in case that the Vdd becomes further lower, conversely the voltage to be boosted may come to drop.

Accordingly, each of the above-mentioned N-channel type MOS transistors of the first booster circuit 130 is formed so as to suppress a leak current even when its threshold voltage is lowered by having an N-type gate, and can boost a voltage from a higher voltage even if Vdd is low by keeping its threshold voltage as low as possible (0.2 V or so).

Although the first booster circuit 130 turns on an MOS transistor being off at the same time when an MOS transistor being on in the first booster circuit 130 is turned off, it is possible to prevent a passing-through current and improve the boosting efficiency of the first booster circuit 130 by turning on the MOS transistor being off after turning off the MOS transistor being on.

Figure 15:
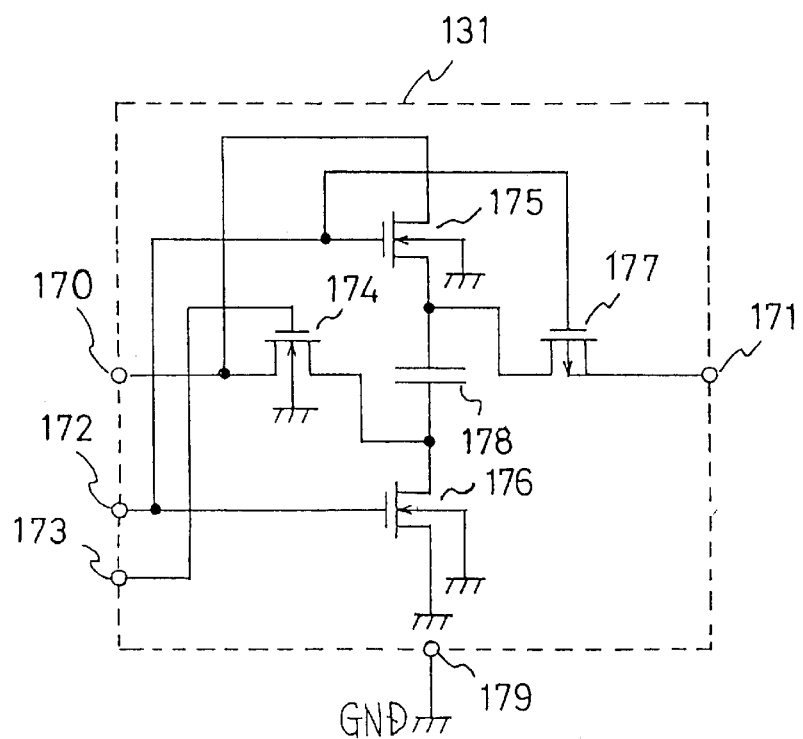
FIG. 15 is a circuit diagram showing a second booster circuit in the switched capacitor system of the electronic apparatus of the present invention.

FIG. 15 is a circuit diagram of the second booster circuit 131 shown in FIG. 13, according to the present invention.

The respective components are connected as follows. An input terminal 170 of the second booster circuit 131 which is connected to an output terminal 161 of the first booster circuit 130 is connected to the drain of an N-channel type MOS transistor 174 and the source of an N-channel type MOS transistor 175, a first clock signal input terminal 172 is connected to the gates of the N-channel type MOS transistor 175, 176, and 177, a second clock signal input terminal 173 is connected to the gate of the N-channel type MOS transistor 174, the source of the N-channel type MOS transistor 174 is connected to the drain of the N-channel type MOS transistor 176 and a second electrode of a capacitor 178, a first electrode of the capacitor 178 is connected to the drain of the N-channel type MOS transistor 175 and the drain of the P-channel type MOS transistor 177, an output terminal 171 for outputting a boosted voltage is connected to the source grounded on the substrate of the P-channel type MOS transistor 177, and a GND terminal 179 is connected to the source of the N-channel type MOS transistor 176.

Next, the principle of operation thereof will be described. First, when a first clock signal inputted from the first clock signal input terminal 172 is "high", a second clock signal inputted from the second clock signal input terminal 173 is "low" and the N-channel type MOS transistors 175 and 176 are turned on and the N-channel type MOS transistor 174 and the P-channel type MOS transistor 177 are turned off, and therefore since the first electrode of the capacitor 178 is supplied with a voltage supplied to the input terminal 170 through the N-channel type MOS transistor 175, the voltage of the first electrode rises to a certain voltage Va1, and since the second electrode of the capacitor 178 is supplied with a voltage of GND through the N-channel type MOS transistor 176, it becomes "low". Next, when the first clock signal inputted from the first clock signal input terminal 172 is "low", the second clock signal inputted from the second clock signal input terminal 173 is "high" and the N-channel type MOS transistor 175 and 176 are turned off and the N-channel type MOS transistor 174 and the P-channel type MOS transistor 177 are turned on, and therefore since the second electrode of the capacitor 178 is supplied with a voltage supplied to the input terminal 170 through the N-channel type MOS transistor 174, the voltage of the second electrode rises to a certain voltage Vb1. Accordingly, the first voltage of the first electrode of the capacitor 178 rises to a voltage obtained by adding the Va1 and the Vb1 to each other and since the voltage is supplied to the output terminal 171 through the P-channel type MOS transistor 177, the voltage of the output terminal 171 rises to a certain voltage Vc1.

Herein, in the case where a voltage of the first electrode of the capacitor 178 is lower than the minimum voltage which can be supplied between the source and the drain, the P-channel type MOS transistor 177 has two operational modes. When the voltage of the first electrode of the capacitor 178 is lower than 0.6 V at which the current is fed in the forward direction from the drain of the P-channel type MOS transistor to the substrate, the voltage cannot be supplied to the output terminal 171. However, when the voltage of the first electrode of the capacitor 178 is 0.6 V or higher and is lower than the minimum voltage that can be supplied between the source and the drain, a voltage obtained by subtracting 0.6 V from the voltage of the first electrode of the capacitor 77 is supplied to the output terminal 171. On the other hand, when the voltage of the first electrode of the capacitor 178 is higher than the minimum voltage that can be supplied between the source and the drain of the P-channel type MOS transistor 177, however high the voltage of the first electrode of the capacitor 178 is, the voltage can be supplied to the output terminal 171.

Furthermore, a gate voltage of a transistor minus a threshold voltage of the transistor is a minimum voltage. In the minimum voltage, current can flow between source and drain of P-channel type MOS transistor.

Accordingly the minimum voltage of the P-channel type MOS transistor 177 of FIG. 15 is a value obtained by subtracting the threshold voltage from a "low" voltage of the gate of the P-channel type MOS transistor 177, namely, the absolute value of the threshold voltage due to subtracting the threshold voltage value from the GND voltage.

Namely, the second booster circuit 131 has a feature that a voltage can be efficiently boosted in case that the voltage to be boosted is not higher than the maximum voltage of the N-channel type MOS transistors 174 and 175 and a boosted voltage generated at the first electrode of the capacitor 178 is not lower than the minimum voltage of the P-channel type MOS transistor 177, but has also a feature that its boosting efficiency is deteriorated or a voltage to be boosted drops in case that the voltage to be boosted is higher or in case that the Vdd is lower and a voltage to be boosted exceeds the maximum voltage of either one of the N-channel type MOS transistors 174 and 175, and no voltage is outputted to the output terminal 171 in case that the boosted voltage is lower than the minimum voltage of the P-channel type MOS transistor 177.

Accordingly, with regard to the respective MOS transistors of the second booster circuit 131, an N-channel type MOS transistor has an N-type gate formed therein and a P-channel type MOS transistor has a P-type gate formed therein so as to suppress a leak current even when the absolute value of its threshold voltage is lowered, and it has been possible to boost a voltage from a higher voltage even if Vdd is low and to boost a voltage from a lower voltage, by keeping the absolute value of its threshold voltage as low as possible (0.2 V or so).

Although the second booster circuit 131 turns on an MOS transistor being off at the same time when an MOS transistor being on in the second booster circuit 131 is turned off, it is possible to prevent a passing-through current and improve the boosting efficiency of the second booster circuit by turning on the MOS transistor being off after turning off the MOS transistor being on.

Figure 16:
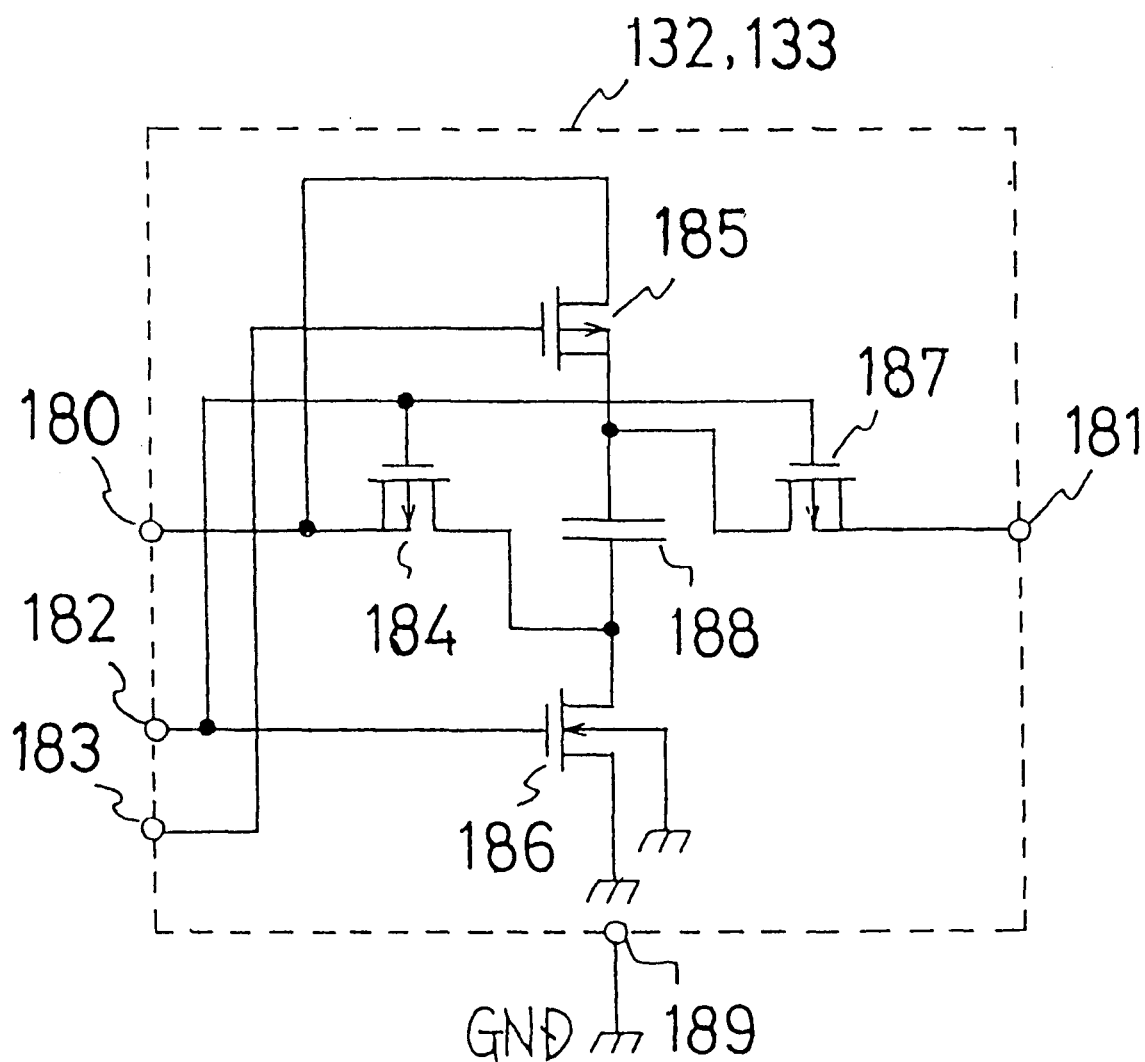
FIG. 16 is a circuit diagram showing third and fourth booster circuit in the switched capacitor system of the electronic apparatus of the present invention.

FIG. 16 is a circuit diagram of the third and fourth booster circuits. The respective components are connected as follows. An input terminal 180 of the third and the fourth booster circuits 132 and 133 which is connected to an output terminal 171 of the second booster circuit 131 or an output terminal 181 of the third booster circuit 132 is connected to the source grounded on the substrate of an P-channel type MOS transistor 184 and the drain of an P-channel type MOS transistor 185, a first clock signal input terminal 182 is connected to the gates of the P-channel type MOS transistors 184, 187, and N-channel type MOS transistor 186, a second clock signal input terminal 183 is connected to the gate of the P-channel type MOS transistor 185, the drain of the P-channel type MOS transistor 184 is connected to the drain of the N-channel type MOS transistor 186 and a second electrode of a capacitor 188, a first electrode of the capacitor 188 is connected to the source grounded on the substrate of the P-channel type MOS transistor 185 and the drain of the P-channel type MOS transistor 187, an output terminal 181 for outputting a boosted voltage is connected to the source grounded on the substrate of the P-channel type MOS transistor 187, and a GND terminal 189 is connected to the source of the N-channel type MOS transistor 186.

Next, the principle of operation thereof will be described. First, when a first clock signal inputted from the first clock signal input terminal 182 is "high", a second clock signal inputted from the second clock signal input terminal 183 is "low" and the N-channel type MOS transistor 186 and the P-channel type MOS transistor 185 are turned on and the P-channel type MOS transistors 184 and 187 are turned off.

Accordingly, since the first electrode of the capacitor 188 is supplied with a voltage supplied to the input terminal 180 through the P-channel type MOS transistor 185, the voltage of the first electrode rises to a certain voltage Va2. Since the second electrode of the capacitor 188 is supplied with a voltage of GND through the N-channel type MOS transistor 186, it becomes "low". Next, when the first clock signal inputted from the first clock signal input terminal 182 is "low", the second clock signal inputted from the second clock signal input terminal 183 is "high" and the N-channel type MOS transistor 186 and the P-channel type MOS transistor 185 are turned off and the P-channel type MOS transistors 184 and 187 are turned on, and therefore since the second electrode of the capacitor 188 is supplied with a voltage supplied to the input terminal 180 through the P-channel type MOS transistor 184, the voltage of the second electrode rises to a certain voltage Vb2. Accordingly, the voltage of the first electrode of the capacitor 188 rises to a voltage obtained by adding the Va2 and the Vb2 to each other and since the voltage is supplied to the output terminal 181 through the P-channel type MOS transistor 187, the voltage of the output terminal 181 rises to a certain voltage Vc2.

In case that a voltage is supplied to the first electrode of the capacitor 188 from the input terminal 180 when the P-channel type MOS transistor 185 is turned on, no voltage can be supplied to the capacitor 188 in case that the voltage of the input terminal 180 is lower than the minimum voltage which can be supplied by the P-channel type MOS transistor 185 and is lower than 0.6 V at which the forward direction from the P-type drain of the transistor to the substrate is turned on, and only a voltage obtained by subtracting 0.6 V from the voltage of the input terminal 180 can be supplied to the capacitor 188 in case that the input terminal 180 voltage is not lower than 0.6 V, but in case that the input terminal 180 voltage is not lower than the minimum voltage, the input terminal 180 voltage can be supplied to the capacitor 188 as it is, and in that in case that a voltage is supplied to the second electrode of the capacitor 188 from the input terminal 180 when the P-channel type MOS transistor 184 is turned on, no voltage can be supplied to the capacitor 188 in case that the voltage of the input terminal 180 is lower than the minimum voltage which can be supplied by the P-channel type MOS transistor 184, but in case that the voltage of the input terminal 180 is not lower than the minimum voltage of the transistor, the voltage of the input terminal 180 can be supplied to the capacitor as it is.

Namely, the third and fourth booster circuits have a feature that they cannot boost a voltage lower than the minimum voltage which can be supplied by the respective P-channel type MOS transistors but they can boost a voltage from a high voltage if it is not lower than the minimum voltage.

Accordingly, with regard to the respective P-channel type MOS transistors of the third booster circuit 132, each of which has a P-type gate formed therein so as to suppress a leak current even when the absolute value of its threshold voltage is lowered, and can boost a voltage from a lower voltage (0.2 V) by keeping the absolute value of its threshold voltage as low as possible (0.2 V or so).

Although each of the third and the fourth booster circuits turns on an MOS transistor being off at the same time when an MOS transistor being on in the booster circuit is turned off, it is possible to prevent a passing-through current and improve the boosting efficiency of the booster circuit by turning on the MOS transistor being off after turning the MOS transistor being on.

The booster circuit 12 of this embodiment shown in FIG. 13 has a feature that it is possible to boost a voltage in case that Vdd is not lower than 0.3 V and the Vp inputted from the electromotive force input terminal 144 is not lower than 0.05 V by composing the first to the fourth booster circuits so that the second booster circuit 131 boosts a voltage boosted by the first booster circuit 130, the third booster circuit 132 boosts a voltage boosted by the second booster circuit 131, and the fourth booster circuit 133 boosts a voltage boosted by the third booster circuit 132, and the second booster circuit 131 boosts a voltage up to a voltage which can be boosted by the third booster circuit 132 and the first booster circuit 130 boosts a voltage up to a voltage which can be boosted by the second booster circuit 131.

This embodiment has realized a thermoelectric conversion device booster system which can efficiently boost the electromotive voltage Vp of a thermoelectric conversion device 120 and further can boost the electromotive force Vp being low (0.5 V), by boosting the electromotive voltage Vp of the thermoelectric conversion device 120 by means of the booster circuit 12, as shown in FIG. 12.

Although the booster circuit of this embodiment shown in FIG. 13 is designed so that the electromotive voltage of the thermoelectric conversion device 120 having the performance is boosted up to a voltage capable of driving such an IC operating at about 1.5 V as used in a watch or the like, it is a matter of course that it is enough to perform such a design change that the booster circuit is additionally provided with a plurality of the first or the third booster circuits 130, 132 which are connected in series with one another, or a plurality of the first booster circuits 130 connected in series followed by a plurality of the third booster circuits 132 connected in series, or only a plurality of the third booster circuits 132 connected in series, in such case that a voltage to be boosted is different as a case of boosting the electromotive voltage of a thermoelectric conversion device different in performance or another power generating device or a case of boosting a voltage of such a capacitor element as a capacitor or a secondary battery, or in such case that a necessary voltage to be boosted is different as a case that a voltage necessary for an IC to be driven is different.

Embodiment 9

Figure 17:
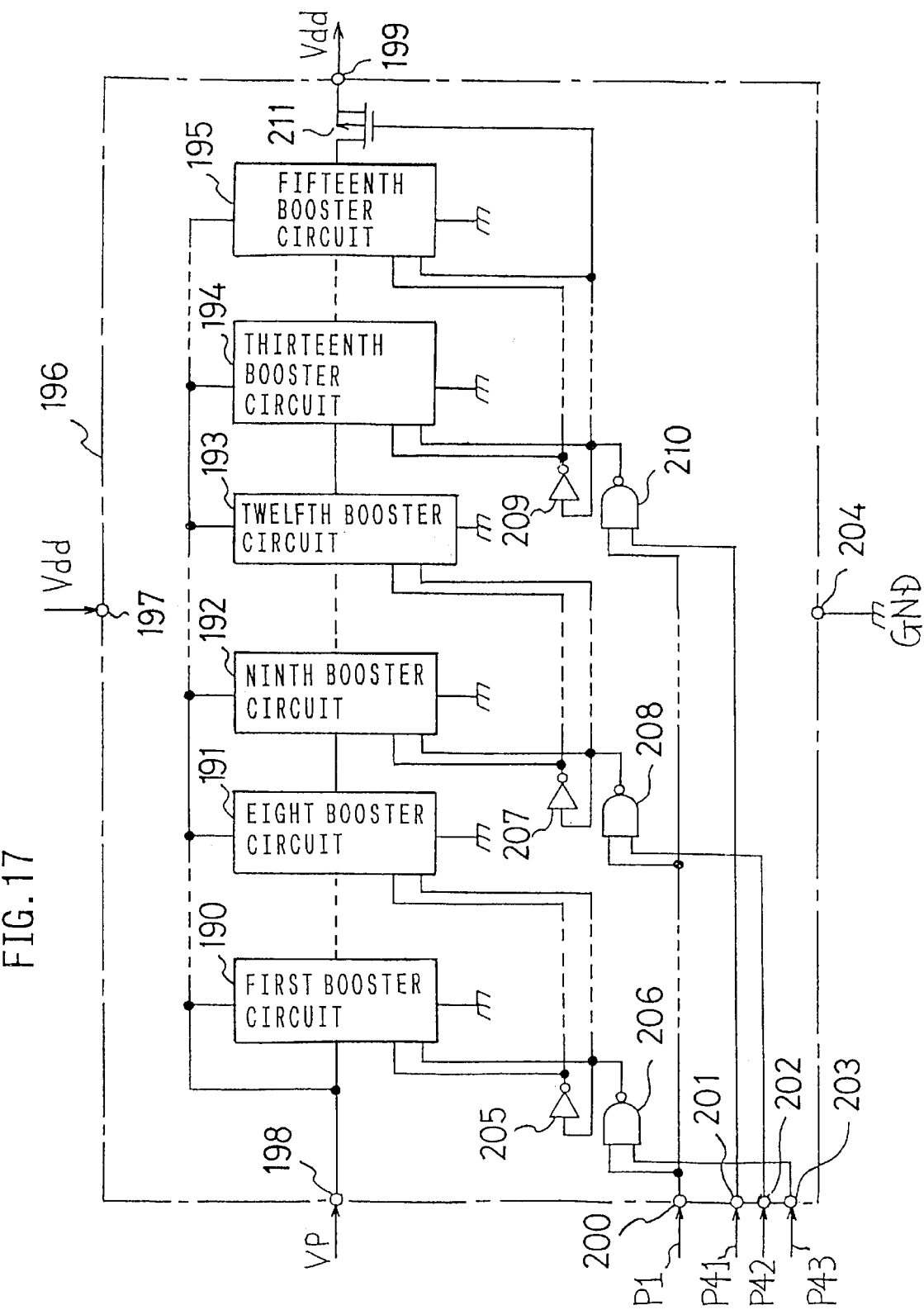
FIG. 17 is a circuit diagram showing an embodiment of the booster circuit of the electronic apparatus according to the present invention.

FIG. 17 is a circuit diagram of a booster circuit 12 of an embodiment according to the present invention in which another arrangement different from the booster circuit shown in FIG. 13 is adopted. It is composed of a total of 15 booster circuits of the first booster circuit 190 to the fifteenth booster circuit 195, two-input NAND circuits 206, 208 and 210, inverter circuits 205, 207 and 209, and a P-channel type MOS transistor 211.

First, a state of connection of the components is described.

An electromotive force input terminal 198 for inputting Vp which is the electromotive voltage of a thermoelectric conversion device is connected to a first input terminal of the first booster circuit 190 and a second input terminal of the first booster circuit 190 to the fifteenth booster circuit 195.

Each of output terminals of the respective booster circuits except the fifteenth booster circuit 195 is connected to the first input terminal of the booster circuit next thereto, and an output terminal of the fifteenth booster circuit 195 is connected to the drain of the P-channel type MOS transistor 211, and the source and substrates of the P-channel type MOS transistor 211 are connected to a boosted voltage output terminal 199 for outputting the boosted voltage Vdd.

A clock signal input terminal 200 for inputting a clock signal P1 from an oscillator circuit 13 is connected to one input terminal of each of the two-input NAND circuits 206, 208 and 210.

A first detection signal input terminal 201 for inputting a first storage signal P41 storing a first detection signal which is one of detection signals from a voltage detecting circuit 122 is connected to the other input terminal of the two-input NAND 210, which is not connected to the clock signal input terminal 200.

A second detection signal input terminal 202 for inputting a second storage signal P42 storing a second detection signal which is one of the detection signals from the voltage detecting circuit 122 is connected to the other input terminal of the two-input NAND 208, which is not connected to the clock signal input terminal 200.

A third detection signal input terminal 203 for inputting a third storage signal P43 storing a third detection signal which is one of the detection signals from the voltage detecting circuit 122 is connected to the other input terminal of the two-input NAND 206, which is not connected to the clock signal input terminal 200.

The output terminal of the two-input NAND circuit 206 is connected to the input terminal of the inverter circuit 205 and the second clock signal input terminals of the first booster circuit 190 to the eighth booster circuit 191.

The output terminal of the inverter circuit 205 is connected to the first clock signal input terminal of each of the first booster circuit 190 to the eighth booster circuit 191.

The output terminal of the two-input NAND circuit 208 is connected to the input terminal of the inverter circuit 207 and the second clock signal input terminals of the ninth booster circuit 192 to the twelfth booster circuit 193.

The output terminal of the inverter circuit 207 is connected to the first clock signal input terminal of each of the ninth booster circuit 192 to the twelfth booster circuit 193.

The output terminal of the two-input NAND circuit 210 is connected to the input terminal of the inverter circuit 209, the second clock signal input terminal of each of the thirteenth booster circuit 194 to the fifteenth booster circuit 195, and the gate of the P-channel type MOS transistor 211.

The output terminal of the inverter circuit 209 is connected to the first clock signal input terminals of the thirteenth booster circuit 194 to the fifteenth booster circuit 195.

The respective power terminals of the two-input NAND circuits 206, 208 and 210, and the inverter circuits 205, 207 and 209 are connected to a Vdd input terminal 197 to which a boosted voltage Vdd is inputted, and the respective GND terminals thereof are connected to a GND potential input terminal 204 connected to an electrode at the lower voltage side of the thermoelectric conversion device 120.

Next, its operation is described.

In case that all of the first storage signal P41, the second storage signal P42 and the third storage signal P43 are "low", since no clock signal is inputted to any of the first to the fifteenth booster circuits, any booster circuit does not operate and performs no boosting operation.

In case that the first storage signal P41 is "high" and the second storage signal P42 and the third storage signal P43 are "low", since a clock signal is inputted only to the booster circuits from the thirteenth booster circuit 194 to the fifteenth booster circuit 195, the booster circuits from the thirteenth booster circuit 194 to the fifteenth booster circuit 195 operate. Namely, the three booster circuits operate and each one of them boosts a voltage by Vp, a boosted voltage of 4×Vp obtained by adding 3×Vp to the electromotive voltage Vp of the thermoelectric conversion device 120 is outputted from the output terminal of the fifteenth booster circuit 195.

In case that the first storage signal P41 and the second storage signal P42 are "high" and the third storage signal P43 is "low", since a clock signal is inputted only to the booster circuits from the ninth booster circuit 192 to the fifteenth booster circuit 195, the booster circuits from the ninth booster circuit 192 to the fifteenth booster circuit 195 operate. Namely, since the seven booster circuits operate, a boosted voltage of 8×Vp obtained by adding 7×Vp to the electromotive voltage Vp of the thermoelectric conversion device 120 is outputted from the output terminal of the fifteenth booster circuit 195.

In case that all of the first storage signal P41, the second storage signal P42 and the third storage signal P43 are "high", since a clock signal is inputted to all the first to the fifteenth booster circuits, all the booster circuits operate. Namely, the fifteen booster circuits operate, a boosted voltage of 16×Vp obtained by adding 15×Vp to the electromotive voltage Vp of the thermoelectric conversion device 120 is outputted from the output terminal of the fifteenth booster circuit 195.

Although a boosted voltage is outputted from the output terminal of the fifteenth booster circuit 195, the boosted voltage does not continue being always outputted, but is outputted only when the clock signal P1 is "high", and the electromotive voltage Vp of the thermoelectric conversion device 120 is outputted as it is from the output terminal when the clock signal is "low". Namely, in case of connecting the output terminal to the boosted voltage output terminal 199 as it is, when the clock signal P1 is "low" a boosted voltage which has been outputted with much effort results in dropping to the electromotive voltage Vp of the thermoelectric conversion device 120. Therefore, the above-mentioned problem has been solved by providing a P-channel type MOS transistor 211 and turning on the transistor when the clock signal P1 is "high" and turning it off when the clock signal P1 is "low".

As described above, by adopting an arrangement as shown in FIG. 17, a booster circuit 12 capable of varying its boosting factor according to a storage signal outputted by a signal storage circuit 123 storing a detection signal of a voltage detecting circuit 122 can be realized by another arrangement different from the booster circuit shown in FIG. 13.

Figure 18:
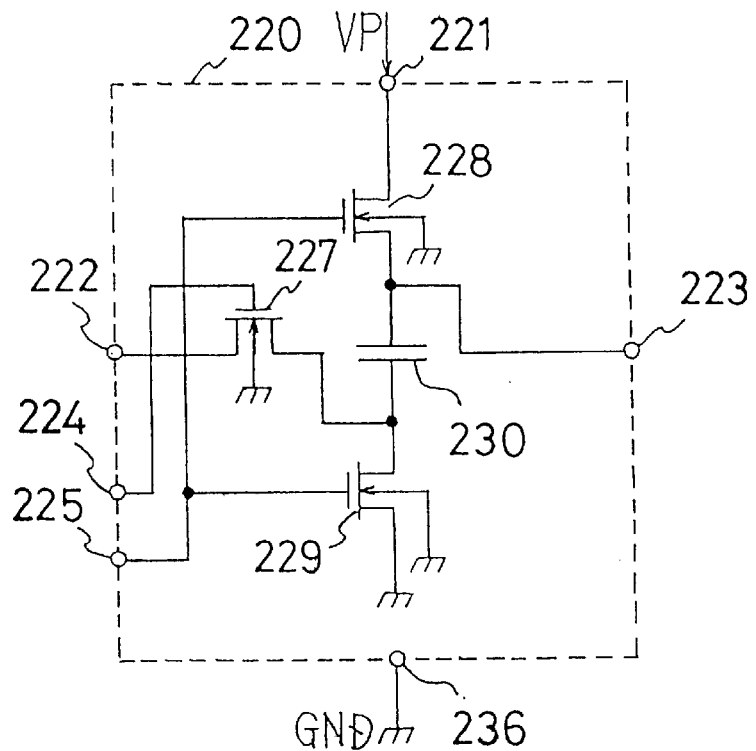
FIG. 18 is a circuit diagram showing a booster circuit of the electronic apparatus according to the present invention.

FIG. 18 is a circuit diagram of the first to the third booster circuits shown in FIG. 17 in the present invention.

First, its connection state is described.

A first input terminal 222 is connected to the drain of an N-channel type MOS transistor 227, a second input terminal 221 is connected to the source of an N-channel type MOS transistor 228, a first clock signal input terminal 224 is connected to the gate of the N-channel type MOS transistor 227, a second clock signal input terminal 225 is connected to the gates of the N-channel type MOS transistors 228 and 229, the source of the N-channel type MOS transistor 227 is connected to the drain of the N-channel type MOS transistor 229 and a second electrode of a capacitor 210, a first electrode of the capacitor 210 is connected to the drain of the N-channel type MOS transistor 228 and an output terminal 223 for outputting a boosted voltage, and a GND input terminal 226 is connected to the source of the N-channel type MOS transistor 229.

Next, its operation is described.

First, when a first clock signal inputted from the first clock signal input terminal 224 is "low", a second clock signal inputted from the second clock signal input terminal 225 becomes "high" and then the N-channel type MOS transistors 228 and 229 are turned on and the N-channel type MOS transistor 227 is turned off, and therefore the voltage of the first electrode of the capacitor 210 is raised to a certain voltage Va by being supplied with the electromotive voltage Vp of the thermoelectric conversion device 120 supplied to the second input terminal 221 through the N-channel type MOS transistor 228, and the second electrode of the capacitor is made "low" by being supplied with a voltage of GND through the N-channel type MOS transistor 227.

Next, when the first clock signal inputted from the first clock signal input terminal 224 is "high", the second clock signal inputted from the second clock signal input terminal 225 becomes "low" and the N-channel type MOS transistors 228 and 229 are turned off and the N-channel type MOS transistor 227 is turned on, and so that the voltage of the second electrode of the capacitor 210 is raised to a certain voltage Vb by being supplied with a voltage supplied to the first input terminal 222 through the N-channel type MOS transistor 227. Accordingly, the voltage of the first electrode of the capacitor 210 is raised to a voltage obtained by adding the Va and the Vb to each other and outputs the voltage from the output terminal 223.

In this case, the values of Va and Vb are related to the maximum voltage value which can be supplied when an N-channel type MOS transistor is turned on, and the N-channel type MOS transistor can supply any voltage lower than the maximum voltage value however low it is, but it can supply any voltage only up to the maximum voltage value however high it is, if it is higher than the maximum voltage value.

Namely, when a voltage supplied from the second input terminal 221 is not higher than the maximum voltage value of the N-channel type MOS transistor 228, Va becomes the same voltage as the voltage supplied from the second input terminal 221, but when a voltage supplied from the second input terminal 221 is higher than the maximum voltage value of the N-channel type MOS transistor 228, Va becomes the maximum voltage value of the N-channel type MOS transistor 228; and when a voltage supplied from the first input terminal 222 is not higher than the maximum voltage value of the N-channel type MOS transistor 227, Vb becomes the same voltage as the voltage supplied from the first input terminal 222, but when the voltage supplied from the first input terminal 222 is higher than the maximum voltage value of the N-channel type MOS transistor 227, Vb becomes the maximum voltage value of the N-channel type MOS transistor 227.

The maximum voltage value of each of the above-mentioned respective N-channel type MOS transistors is a voltage of "high" of a clock signal inputted to the gate of each of the respective N-channel type MOS transistors when the N-channel type MOS transistor is on, namely, a value obtained by subtracting the threshold voltage of each N-channel type MOS transistor from Vdd.

Namely, the booster circuit shown in FIG. 18 has a feature that in case that a voltage to be boosted is low and each N-channel type MOS transistor can do with supplying only a voltage not higher than the maximum voltage of the N-channel type MOS transistor, it can efficiently boost a voltage and further can boost any low voltage however low it is, but has a feature that in case that a voltage to be boosted is high or in case that the Vdd is low and any one of the respective N-channel type MOS transistors of the booster circuit must supply a higher voltage than the maximum voltage value of the N-channel type MOS transistor, its boosting efficiency becomes low. Further, in case that a voltage to be boosted is further higher or in case that the Vdd becomes further lower, conversely the boosted voltage may come to drop.

Accordingly, each of the above-mentioned N-channel type MOS transistors of the booster circuit shown in FIG. 18 has an N-type gate formed therein so as to suppress a leak current even when its threshold voltage is lowered, and can boost a voltage from a higher voltage even if Vdd is low, by keeping its threshold voltage as low as possible (0.2 V or so).

Although the booster circuit shown in FIG. 18 turns on an MOS transistor being off at the same time when an MOS transistor being on in the booster circuit is turned off, it is possible to prevent a passing-through current and improve the boosting efficiency of the booster circuit by turning on the MOS transistor being off after the MOS transistor being on has been turned off.

Figure 19:
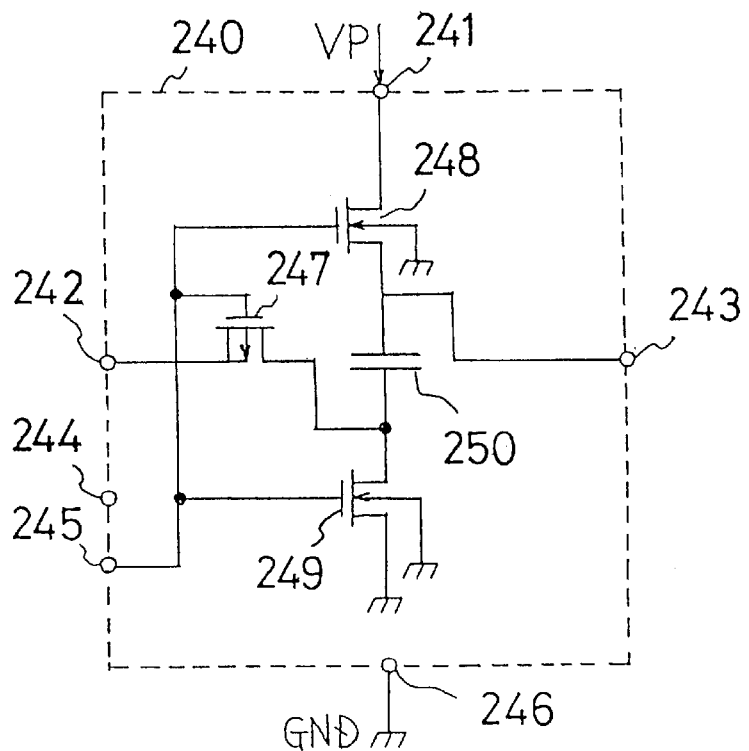
FIG. 19 is a circuit diagram showing a booster circuit of the electronic apparatus according to the present invention.

FIG. 19 is a circuit diagram of the fourth to fifteenth booster circuits shown in FIG. 17. Its arrangement is nearly the same as the booster circuit shown in FIG. 18, but is different from the booster circuit shown in FIG. 18 only in that the N-channel type MOS transistor 227 in the booster circuit of FIG. 18 is replaced with a P-channel type MOS transistor 247 in which the source and substrate are connected to a first input terminal 242, the drain is connected to a second electrode of the capacitor 250, and the gate is connected to a second clock signal input terminal 245.

Its operation is also nearly the same as the booster circuit shown in FIG. 18, but is different from that of the booster circuit in FIG. 18 in a relation between a voltage of the first input terminal 242 and a voltage Vb when the P-channel type MOS transistor 247 is turned on and the voltage Vb inputted to the first input terminal 242 is supplied to the second electrode of the capacitor 250 through the P-channel type MOS transistor 247, namely, in that no voltage can be supplied to the second electrode in case that the voltage of the first input terminal 242 is lower than the minimum voltage which can be supplied by the P-channel type MOS transistor 247, but the voltage of the first input terminal 242 can be supplied as it is in case that the voltage is not lower than the minimum voltage of the transistor.

The minimum voltage which the P-channel type MOS transistor 247 can supply is the minimum voltage which the P-channel type MOS transistor can supply through a channel from the drain of the transistor to the source or from the source to the drain, and is a value obtained by subtracting the threshold voltage of the transistor from a gate voltage of the transistor, and accordingly the minimum voltage of the P-channel type MOS transistor 247 is a value obtained by subtracting the threshold value from a "low" voltage of the gate of the P-channel type MOS transistor 247, namely, the absolute value of the threshold voltage because the threshold value having a negative value is subtracting from the GND voltage.

Namely, the booster circuit shown in FIG. 19 has a feature that a voltage can be efficiently boosted in case that a voltage inputted to the second input terminal 241 is not higher than the maximum voltage of the N-channel type MOS transistor 248 and a voltage inputted to the first input terminal 242 is not lower than the minimum voltage of the P-channel type MOS transistor 247. However, the above booster circuit has a feature that its boosting efficiency is deteriorated or a voltage to be boosted comes to be conversely dropped in case that the voltage of the second input terminal 241 is not lower than the maximum voltage of the N-channel type MOS transistor 248, or no boosting operation cannot be performed in case that the voltage of the first input terminal 242 is lower than the minimum voltage of the P-channel type MOS transistor 247.

Accordingly, in the present invention, with regard to the respective MOS transistors of the booster circuit shown in FIG. 19, an N-channel type MOS transistor has an N-type gate formed therein and a P-channel type MOS transistor has a P-type gate formed therein, and thereby a leak current can be suppressed even when the absolute value of its threshold voltage is lowered, and by keeping the absolute value of its threshold voltage as low as possible (0.2 V or so) a voltage can be boosted from a higher voltage even if Vdd is low and further can be boosted from a lower voltage.

Although the booster circuit shown in FIG. 19 turns on an MOS transistor being off at the same time when an MOS transistor being on in the booster circuit is turned off, it is possible to prevent a passing-through current and improve the boosting efficiency of the booster circuit by turning on the MOS transistor being off after the MOS transistor being on has been turned off.

The booster circuit 12 of this embodiment shown in FIG. 17 has the first to third booster circuits having such a feature as described above arranged at the fore stage and has the fourth to fifteenth booster circuits having such a feature as described above arranged at the latter stage, and makes the first to third booster circuits perform a boosting operation from a low voltage, which is a weak point of the fourth to fifteenth booster circuits, and makes the fourth to fifteenth booster circuits perform a boosting operation from a high voltage, which is a weak point of the first to third booster circuits. Thus, the booster circuit 12 has been able to have a feature of making it possible to perform a boosting operation in case that Vdd is not lower than 0.3 V and the electromotive voltage Vp of a thermoelectric conversion device is not lower than 0.05 V.

As shown in FIG. 12, this embodiment has realized a thermoelectric conversion device booster system which can efficiently boost the electromotive voltage Vp of a thermoelectric conversion device 120 and further can boost even the electromotive force Vp being as low as 0.05 V, by boosting the electromotive voltage Vp of the thermoelectric conversion device 120 by means of the booster circuit 12 shown in FIG. 17.

Although the booster circuit of this embodiment shown in FIG. 17 is designed so that the electromotive voltage of a thermoelectric conversion device 120 having the above-described performance is boosted to a voltage capable of driving such an IC operating at about 1.5 V as an IC used in a watch or the like, it is a matter of course that it is enough to perform such a design change as increasing or decreasing the number of the booster circuits arranged at the fore stage shown in FIG. 18 or the number of the booster circuits arranged at the latter stage shown in FIG. 19, in such a case that a voltage to be boosted is different as a case of boosting an electromotive voltage of a thermoelectric conversion device different in performance or another power generating device or a case of boosting a voltage of such a capacitor element as a capacitor or a secondary battery, or in such case that a necessary voltage to be boosted is different as a case that a voltage necessary for an IC to be driven is different.

Embodiment 10

Figure 20:
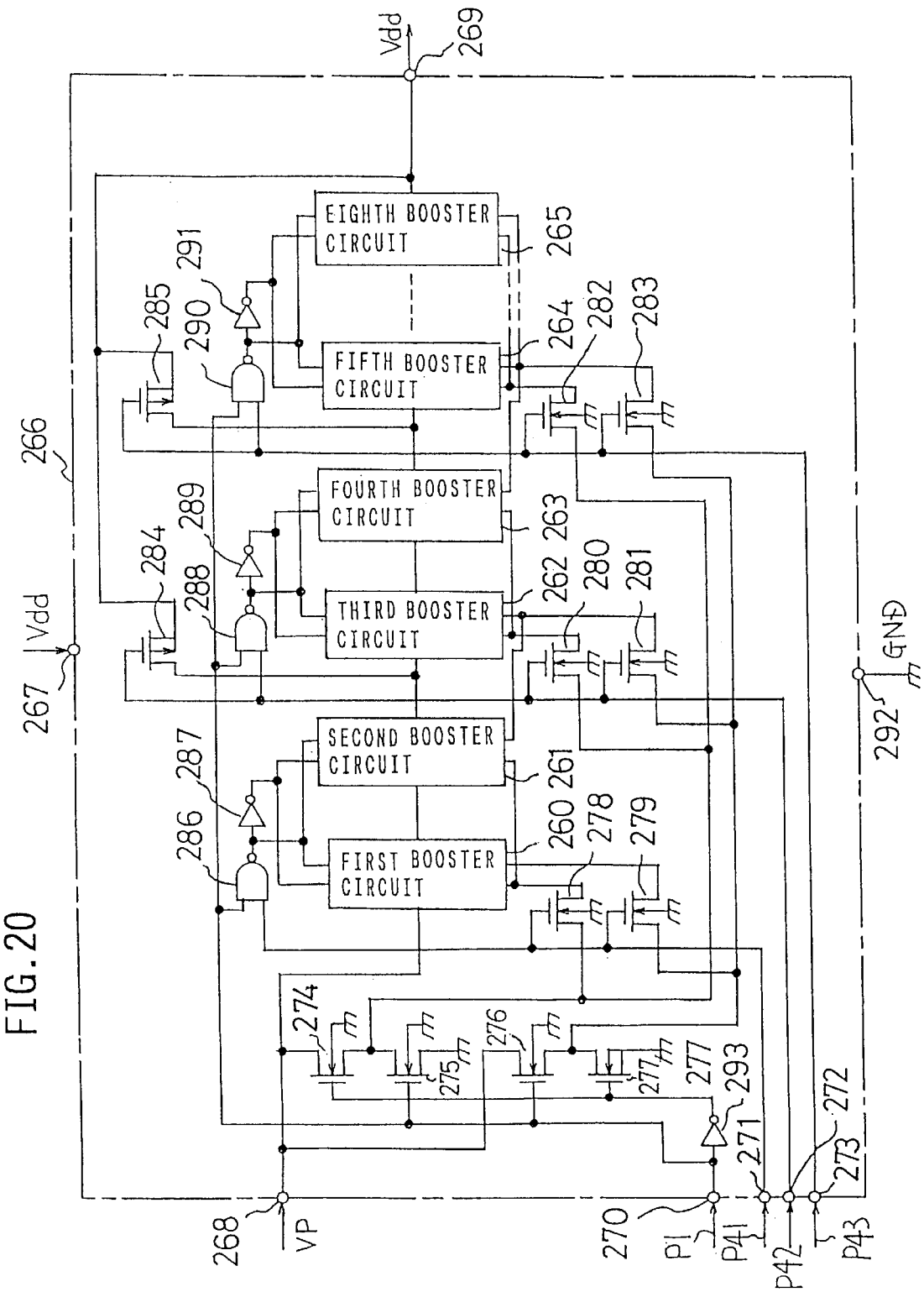
FIG. 20 is a circuit diagram showing a booster circuit of the electronic apparatus according to the present invention.

FIG. 20 shows the booster circuit 12 according to this embodiment of the present invention, which has a structure different from that of the booster circuit as shown in FIG. 13 or FIG. 17.

First, a state of connection of the components is described.

An electromotive force input terminal 268 for inputting Vp which is the electromotive voltage of a thermoelectric conversion device 120 is connected to an input terminal of a first booster circuit 260, the drain of an N-channel type MOS transistor 274 and the drain of an N-channel type MOS transistor 276.

Each of output terminals of the respective booster circuits except the eighth booster circuit 265 is connected to an input terminal of the booster circuit next thereto, and an output terminal of the eighth booster circuit 265 is connected to a boosted voltage output terminal 269.

A clock signal input terminal 270 for inputting a clock signal P1 from an oscillator circuit 12 is connected to one input terminal of each of two-input NAND circuits 286, 288 and 290, the input terminal of the inverter circuit 293, and the gates of the N-channel type MOS transistors 275 and 276.

A first detection signal input terminal 271 for inputting a first storage signal P41 storing a first detection signal which is one of detection signals from a voltage detecting circuit 122 is connected to the other input terminal of the two-input NAND 927, which is not connected to the clock signal input terminal 270, and the gates of the N-channel type MOS transistors 278 and 279.

A second detection signal input terminal 272 for inputting a second storage signal P42 storing a second detection signal which is one of the detection signals from the voltage detecting circuit 122 is connected to the other input terminal of the two-input NAND 288, which is not connected to the clock signal input terminal 270, the gates of the N-channel type MOS transistors 280 and 281, and the gate of a P-channel type MOS transistor 284.

A third detection signal input terminal 273 for inputting a third storage signal P43 storing a third detection signal which is one of the detection signals from the voltage detecting circuit 122 is connected to the other input terminal of the two-input NAND 290, which is not connected to the clock signal input terminal 270, the gates of the N-channel type MOS transistors 282 and 283, and the gate of a P-channel type MOS transistor 285.

The output terminal of the two-input NAND circuit 286 is connected to the input terminal of the inverter circuit 287 and the second clock signal input terminals of the first booster circuit 260 and the second booster circuit 261.

The output terminal of the inverter circuit 287 is connected to the first clock signal input terminals of the first booster circuit 260 and the second booster circuit 261.

The output terminal of the two-input NAND circuit 288 is connected to the input terminal of the inverter circuit 289 and the second clock signal input terminals of the third booster circuit 262 and the fourth booster circuit 263.

The output terminal of the inverter circuit 289 is connected to the first clock signal input terminals of the third booster circuit 262 and the fourth booster circuit 263.

The output terminal of the two-input NAND circuit 290 is connected to the input terminal of the inverter circuit 291 and the second clock signal input terminals of the fifth booster circuit 264 to the eighth booster circuit 265.

The output terminal of the inverter circuit 291 is connected to the first clock signal input terminals of the fifth booster circuit 264 to the eighth booster circuit 265.

The output terminal of the inverter circuit 293 is connected to the gates of the N-channel type MOS transistors 274 and 277.

The source of the N-channel type MOS transistor 274 is connected to the drains of the N-channel type MOS transistors 275, 278, 280 and 282, and the source of the N-channel type MOS transistor 276 is connected to the drains of the N-channel type MOS transistors 277, 279, 281 and 283, and the source of the N-channel type MOS transistors 275 and 277 are connected to GND terminals.

The source of the N-channel type MOS transistor 278 is connected to the third clock signal input terminals of the first booster circuit 260 and the second booster circuit 261, and the source of the N-channel type MOS transistor 279 is connected to the fourth clock signal input terminal of the first booster circuit 260.

The source of the N-channel type MOS transistor 280 is connected to the third clock signal input terminals of the third booster circuit 262 and the fourth booster circuit 263, and the source of the N-channel type MOS transistor 281 is connected to the fourth clock signal input terminals of the third booster circuit 262 and the second booster circuit 261.

The source of the N-channel type MOS transistor 282 is connected to the third clock signal input terminals of the fifth booster circuit 264 to the eighth booster circuit 265, and the source of the N-channel type MOS transistor 283 is connected to the fourth clock signal input terminals of the fourth booster circuit 263 and the eighth booster circuit 265.

The sources and substrates of the P-channel type MOS transistors 284 and 285 are connected to the boosted voltage output terminal 269.

The power terminals of the two-input NAND circuits 286, 288 and 290, the inverter circuits 287, 289, 291 and 293 are connected to a Vdd input terminal 267 to which a boosted voltage Vdd is inputted, and the GND terminals thereof are connected to a GND potential input terminal 292 connected to an electrode at the lower voltage side of the thermoelectric conversion device 120.

Next, its operation is described. In case that all of the first storage signal P41, the second storage signal P42 and the third storage signal P43 are "low", since no clock signal is inputted to any of the first to eighth booster circuits 260 to 265 shown in FIG. 20, any booster circuit does not operate and performs no boosting operation. Although the P-channel type MOS transistors 284 and 285 are on, a current leaking through both the transistors from the boosted voltage output terminal 269 is only a charging current of a capacitance component dangling about the drains of both the transistors.

In case that the first storage signal P41 is "high" and the second storage signal P42 and the third storage signal P43 are "low", since clock signals are inputted to the respective clock signal input terminals of the first booster circuit 260 and clock signals are inputted to the other clock signal input terminals than the fourth clock signal input terminal of the second booster circuit 261, a voltage is boosted by Vp in the first booster circuit 260 and is boosted by Vp in the second booster circuit 261, and since the P-channel type MOS transistor 284 is turned on, a voltage of 4×Vp obtained by adding 3×Vp to Vp is supplied through the P-channel type MOS transistor 284 to the boosted voltage output terminal 269. Namely, the boosted voltage becomes 4 Vp. Although the P-channel type MOS transistor 285 is also turned on, a current leaking through the P-channel type MOS transistor 285 from the boosted voltage output terminal 269 is only a charging current of a capacitance component dangling about the drains of both the transistors.

In case that the first storage signal P41 and the second storage signal P42 are "high" and the third storage signal P43 is "low", since clock signals are inputted to the respective clock signal input terminals of the first booster circuit 260, the second booster circuit 261 and the third booster circuit 262 and clock signals are inputted to the other clock signal input terminals of the fourth booster circuit 263 than the fourth clock signal input terminal, a voltage is boosted by 2×Vp in each of the first booster circuit 260 to the third booster circuit 262 and is boosted by 4×Vp in the fourth booster circuit 263, and the P-channel type MOS transistor 284 is turned off and the P-channel type MOS transistor 285 is turned on, a voltage of 8 Vp obtained by adding 7 Vp to Vp is supplied through the P-channel type MOS transistors 285 to the boosted voltage output terminal 269. Namely, the boosted voltage Vdd becomes 8×Vp.

In case that all of the first storage signal P41, the second storage signal P42 and the third storage signal P43 are "high", since the clock signals are inputted to clock signal input terminals of all of the first to eighth booster circuits 260 to 265 shown in FIG. 20, a voltage is boosted by 2×Vp in each of the first to seventh booster circuits and is boosted by Vp in the eighth booster circuit 265, and so a voltage of 16×Vp obtained by adding 15 Vp to Vp is supplied to the boosted voltage output terminal 269. Namely, the boosted voltage Vdd becomes 16 Vp.

Although it has been described that a portion boosted in each booster circuit is 2×Vp or Vp, such a value can be obtained in case that Vp is not higher than the maximum voltage value of the N-channel type MOS transistors 274, 276, 278, 279, 280, 281, 282 and 283, namely, in case that the wave height value of a clock signal inputted to the third or fourth clock signal input terminal of each booster circuit is Vp. In case that Vp is higher than the maximum voltage value, the wave height value of a clock signal inputted to the third or fourth clock signal input terminal of each booster circuit becomes the maximum voltage value and a boosted portion in each booster circuit becomes two times the maximum voltage value or becomes the maximum voltage value. Namely, the boosted voltage results in dropping.

Therefore, in the booster circuit of this embodiment shown in FIG. 20, each of the N-channel type MOS transistors 274, 276, 278, 279, 280, 281, 282 and 283 has an N-type gate formed therein so as to suppress a leak current even if its threshold voltage is lowered and keeps its threshold voltage as low as possible (0.2 V or so), and thereby makes it possible to have a boosted portion of 2×Vp or Vp in each booster circuit even if the Vp is high to some degree.

As described above, by forming a booster circuit into the arrangement as shown in FIG. 20, the booster circuit 12 capable of varying its boosting factor according to a storage signal outputted by a signal storage circuit 123 storing a detection signal of a voltage detecting circuit 122 can be realized by another arrangement different from the booster circuit shown in FIG. 13 or 17.

Figure 21:
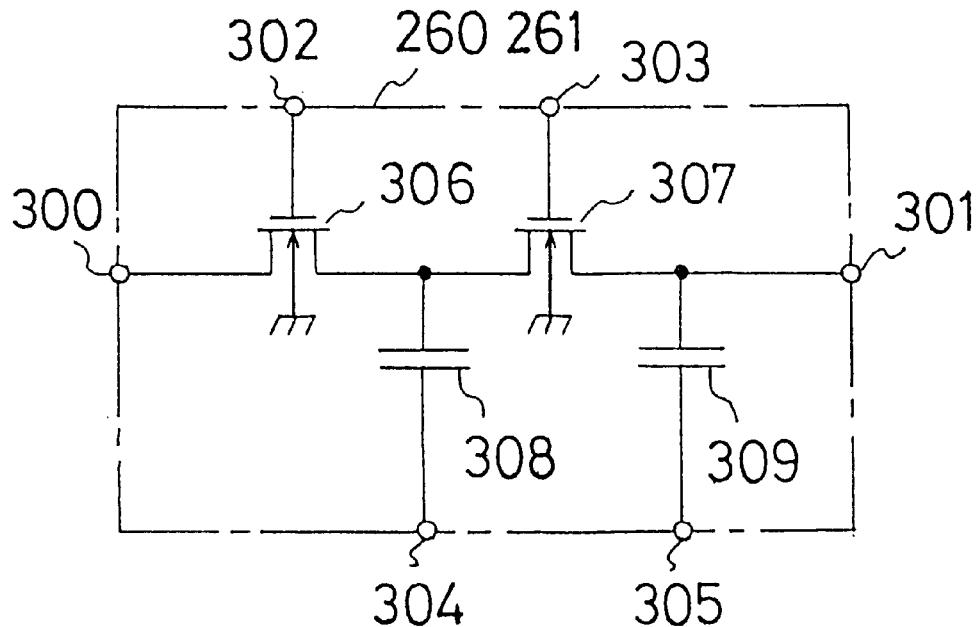
FIG. 21 is a circuit diagram showing an embodiment of the booster circuit of the electronic apparatus according to the present invention.

FIG. 21 is a circuit diagram of the first and second booster circuits shown in FIG. 20 of the present invention.

First, its connection is described.

An input terminal 300 is connected to the drain of an N-channel type MOS transistor 306, the gate of the N-channel type MOS transistor 306 is connected to a first clock signal input terminal 302, the source of the transistor is connected to a first electrode of a capacitor 308 and the drain of an N-channel type MOS transistor 307, a second electrode of the capacitor 308 is connected to a third clock signal input terminal 304, the gate of the N-channel type MOS transistor 307 is connected to a second clock signal input terminal 303, the source of the transistor is connected to a first electrode of a capacitor 309 and an output terminal 301, and a second electrode of the capacitor 309 is connected to a fourth clock signal input terminal 305.

Next, its operation is described. It is assumed that the higher voltage of the third and the fourth clock signal is Vh and the lower voltage is "low".

First, a case of inputting a clock signal to the fourth clock signal input terminal 305 is described.

A boosted voltage is outputted from the output terminal 301 by successively supplying electric charges from the input terminal 300 to the output terminal 301 as repeating alternately a first state and a second state as follows. The first state is such that a clock signal of the first clock signal input terminal 302 is "high", a clock signal of the second clock signal input terminal 303 is "low", a clock signal of the third clock signal input terminal 106 is "low", a clock signal of the fourth clock signal input terminal 305 is Vh, and the N-channel type MOS transistor 306 is turned on and the N-channel type MOS transistor 307 is turned off, and an electric charge is supplied from the input terminal 300 through the N-channel type MOS transistor 306 to the first electrode of the capacitor 308 by lowering the voltage of the first electrode of the capacitor 308 by Vh from its previous state and boosting the voltage of the first electrode of the capacitor 309 by Vh from its previous state and at the same time a boosted voltage is outputted from the first electrode of the capacitor 309 to the output terminal 301. The second state is such that a clock signal of the first clock signal input terminal 302 is "low", a clock signal of the second clock signal input terminal 303 is "high", a clock signal of the third clock signal input terminal 106 is Vh, a clock signal of the fourth clock signal input terminal 305 is "low", and the N-channel type MOS transistor 306 is turned off and the N-channel type MOS transistor 307 is turned on, and an electric charge is supplied from the first electrode of the capacitor 308 through the N-channel type MOS transistor 307 to the first electrode of the capacitor 309 by boosting the voltage of the first electrode of the capacitor 308 by Vh from its previous state and lowering that of the first electrode of the capacitor 309 by Vh from its previous state.

When the respective N-channel type MOS transistors are turned on, in case that electric charges have been able to be supplied from the drain to the source until a voltage difference between the drain and the source of each of the N-channel type MOS transistors is eliminated, a boosted voltage of the first electrode of the capacitor 308 becomes a value obtained by adding Vh to the voltage of an input terminal 300 and a boosted voltage of the first electrode of the capacitor 309 becomes a value obtained by adding Vh to the boosted voltage of the capacitor 308, and so a boosted voltage to be outputted from this output terminal 301 becomes a value obtained by adding 2 Vh to the voltage of the input terminal 300. However, when the N-channel type MOS transistors 306 and 307 are turned on, in case that the source voltage of either one of the transistors has reached the maximum voltage value of the transistor, the boosted voltage to be outputted from this output terminal 301 becomes a lower value compared with a case where the source voltage does not reach the maximum voltage value, and it may become a voltage not higher than the voltage of the input terminal 300, namely, a lowered voltage according to circumstances.

Namely, the booster circuit 12 has a feature that a voltage can be efficiently boosted and furthermore can be boosted however low it is in case that a voltage to be boosted is low or in case that Vdd is high, as described above, and the maximum voltage of each of the N-channel type MOS transistors is high and each of the transistors can do with supplying only a voltage not higher than the maximum voltage value, but has a feature that its boosting efficiency becomes low in case that a voltage to be boosted is high or in case that Vdd is low, as described above, and the maximum voltage of each of the N-channel type MOS transistors is low and any one of the transistors must supply a voltage higher than the maximum voltage value of the N-channel type MOS transistor, and a voltage to be boosted may result in conversely dropping in case that the voltage to be boosted is higher or the Vdd becomes further lower.

Accordingly, each of the above-mentioned N-channel type MOS transistors shown in FIG. 21 has an N-type gate formed therein so as to suppress a leak current even when its threshold voltage is lowered, and can boost a voltage from a higher voltage even if Vdd is low by keeping its threshold voltage as low as possible (0.2 V or so).

Next, a case where no clock signal is inputted to the fourth clock signal input terminal 305 is described.

This case is different from a case where a clock signal is inputted to the fourth clock signal input terminal 304 only in that the capacitor 309 is a smoothing capacitor and does not contribute to its boosting operation. Namely, a boosted voltage to be outputted to the output terminal 301 drops by the Vh, and so becomes a value obtained by adding the Vh to the voltage of the input terminal 300.

Figure 22:
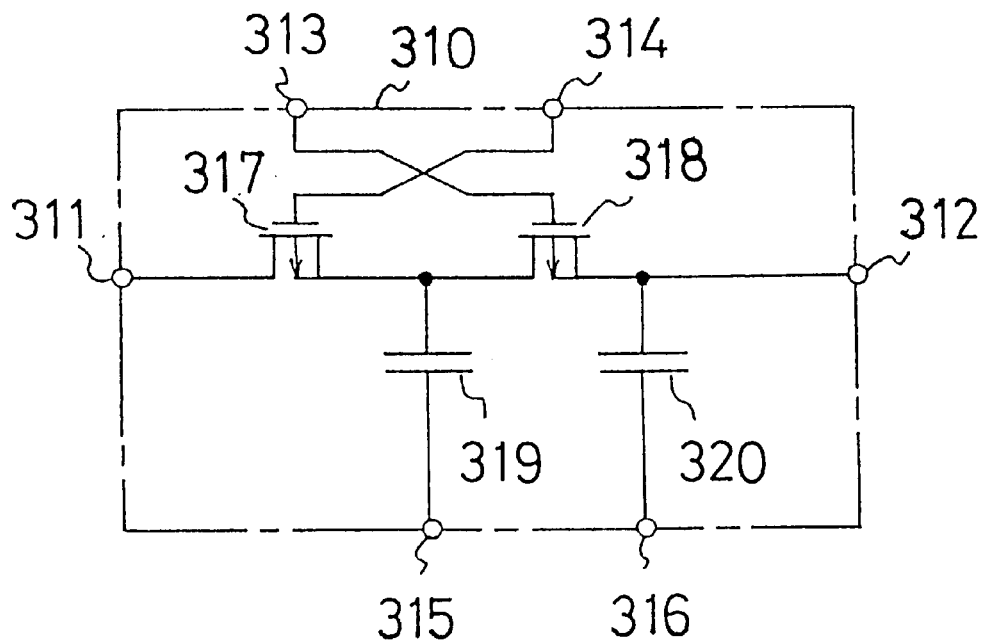
FIG. 22 is a circuit diagram showing an embodiment of the booster circuit of the electronic apparatus according to the present invention.

FIG. 22 is a circuit diagram of each of the third to seventh booster circuits shown in FIG. 20.

Its arrangement is nearly the same as the booster circuit shown in FIG. 21, and is different from the booster circuit only in that the N-channel type MOS transistor 306 in the booster circuit of FIG. 21 is replaced, as shown in FIG. 22, with a P-channel type MOS transistor 317 in which the drain is connected to an input terminal 311, the source and substrate are connected to a first electrode of a capacitor 319, and the gate is connected to a second clock signal input terminal, and the N-channel type MOS transistor 307 in the booster circuit of FIG. 21 is replaced, as shown in FIG. 22, with a P-channel type MOS transistor 318 in which the drain is connected to a first electrode of the capacitor 319, the source and substrate are connected to a first electrode of a capacitor 320, and the gate is connected to a first clock signal input terminal 313.

Its operation is also the same as the booster circuits 260 and 261 shown in FIG. 21 in the timing when the respective MOS transistors are turned on/off and in the timing when the level of a clock signal inputted to the second electrode of each capacitor becomes Vh or "low", and is different from the booster circuits of FIG. 21 in a voltage condition for efficiently boosting a voltage. Namely, while the booster circuits shown in FIG. 21 can efficiently boost a voltage in case that a voltage supplied by each N-channel type MOS transistor is not higher than the maximum voltage value of the transistor since each MOS transistor is formed out of an N-channel type MOS transistor, the booster circuit shown in FIG. 22 can efficiently boost a voltage in case that a voltage supplied by each P-channel type MOS transistor is not lower than the minimum voltage value of the transistor since each MOS transistor is formed out of a P-channel type MOS transistor.

Namely, the booster circuit shown in FIG. 22 has a feature that a voltage can be efficiently boosted and further can be boosted however high it is in case that the voltage to be boosted is high and each P-channel type MOS transistor supplies a voltage not lower than the minimum voltage value of the transistor, but has a feature that its boosting efficiency becomes low or no voltage may be outputted from the output terminal 312 according to circumstances in case that the voltage to be boosted is low and any one of the N-channel type MOS transistors is to supply a voltage lower than the minimum voltage value of the transistor.

Accordingly, each of the P-channel type MOS transistors of the booster circuit shown in FIG. 22 has a P-type gate formed therein and thereby a leak current can be suppressed even when the absolute value of its threshold voltage is lowered, and a voltage can be boosted from a lower voltage by keeping the absolute value of its threshold voltage as low as possible (0.2 V or so).

Figure 23:
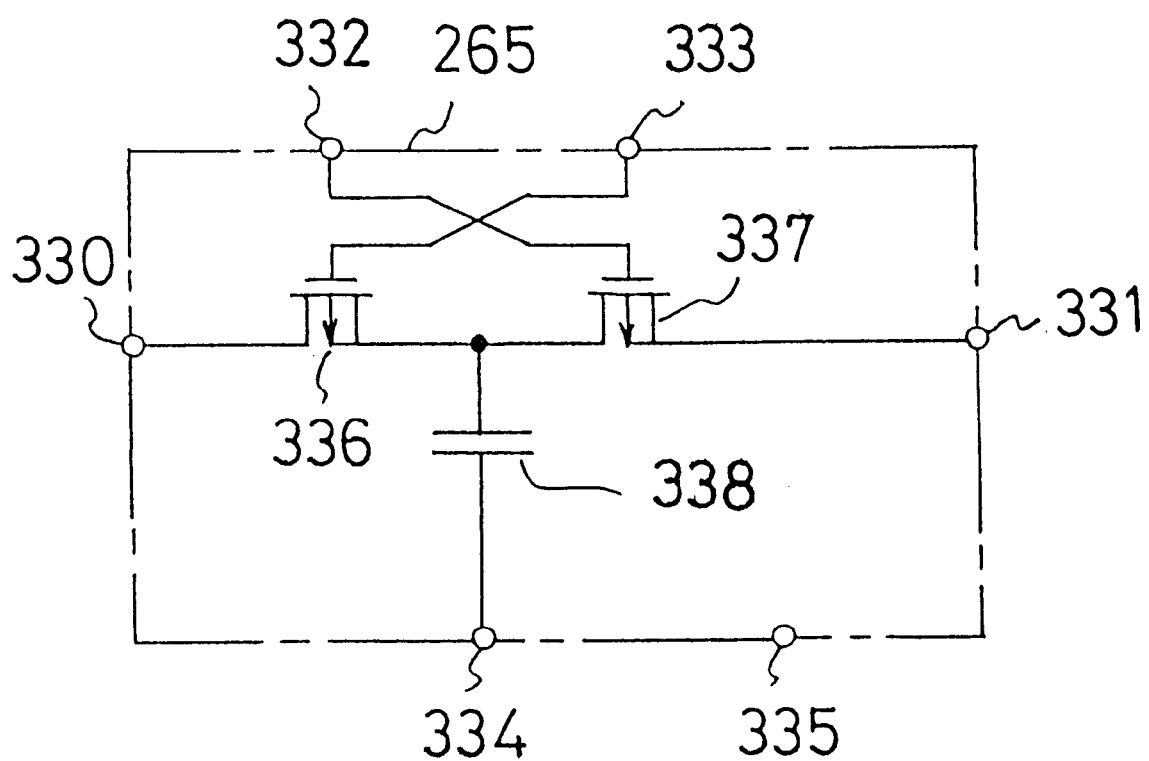
FIG. 23 is a circuit diagram showing an embodiment of the booster circuit of the electronic apparatus according to the present invention.

FIG. 23 is a circuit diagram of the eighth booster circuit 265 shown in FIG. 20 in the present invention. Its arrangement is nearly the same as the booster circuit 310 shown in FIG. 22, and is different from the booster circuit 310 only in that it does not have a capacitor 320 corresponding to the capacitor of the booster circuit 310 shown in FIG. 22. As shown in FIG. 23, therefore, nothing is connected to a fourth clock signal input terminal 335 thereof.

Its operation is also nearly the same as the booster circuit 310 shown in FIG. 22, and is different from the booster circuit 310 in that since there is not the capacitor 320 shown in FIG. 22, a voltage to be outputted from an output terminal 331 drops lower by Vh than the boosted voltage outputted to the output terminal 312 of the booster circuit 310 of FIG. 22.

The booster circuit 266 of the embodiment shown in FIG. 20 has been able to have a feature capable of performing a boosting operation in case that Vdd is not lower than 0.3 V and the electromotive voltage Vp of a thermoelectric conversion device is not lower than 0.05 V, by forming each of the first booster circuit 260 and the second booster circuit 261 at the fore stage into the booster circuit shown in FIG. 21, forming each of the third to seventh booster circuits 265 at the latter stage into the booster circuit shown in FIG. 22 as described above, and forming the eighth booster circuit at the last stage into the booster circuit shown in FIG. 23 as described above, and by making the first and second booster circuits 260 and 261 perform a boosting operation from a low voltage, which is a weak point of the third to eighth booster circuits, and making the third to eighth booster circuits perform a boosting operation from a high voltage, which is a weak point of the first and second booster circuits.

As shown in FIG. 12, the embodiment has realized a thermoelectric conversion device booster system which can efficiently boost an electromotive voltage Vp of a thermoelectric conversion device 120 and further can boost even the electromotive force Vp being as low as 0.05 V by boosting the electromotive voltage Vp of the thermoelectric conversion device 120 by means of the booster circuit 266 shown in FIG. 20.

Although the booster circuit of the embodiment shown in FIG. 20 is designed so that the electromotive voltage of a thermoelectric conversion device having the above-described performance is boosted to a voltage capable of driving such an IC operating at about 1.5 V as used in a watch or the like, it is a matter of course that it is enough to perform such a design change as increasing or decreasing the number of the booster circuits arranged at the fore stage shown in FIG. 21, or the number of the booster circuits arranged at the latter stage shown in FIG. 22, in such a case that a voltage to be boosted is different as a case of boosting an electromotive voltage of a thermoelectric conversion device different in performance or another power generating device or a case of boosting a voltage of such a capacitor element as a capacitor or a secondary battery, or in such case that a necessary voltage to be boosted is different as a case that a voltage necessary for an IC to be driven is different.

Moreover, it is a matter of course that a booster circuit having an aimed performance can be realized also by combining the features of the respective booster circuits shown in FIGS. 13, 17 and 20 as described above.

Embodiment 11

The oscillator circuit 13 according to this embodiment of the present invention will be described.

Figure 24:
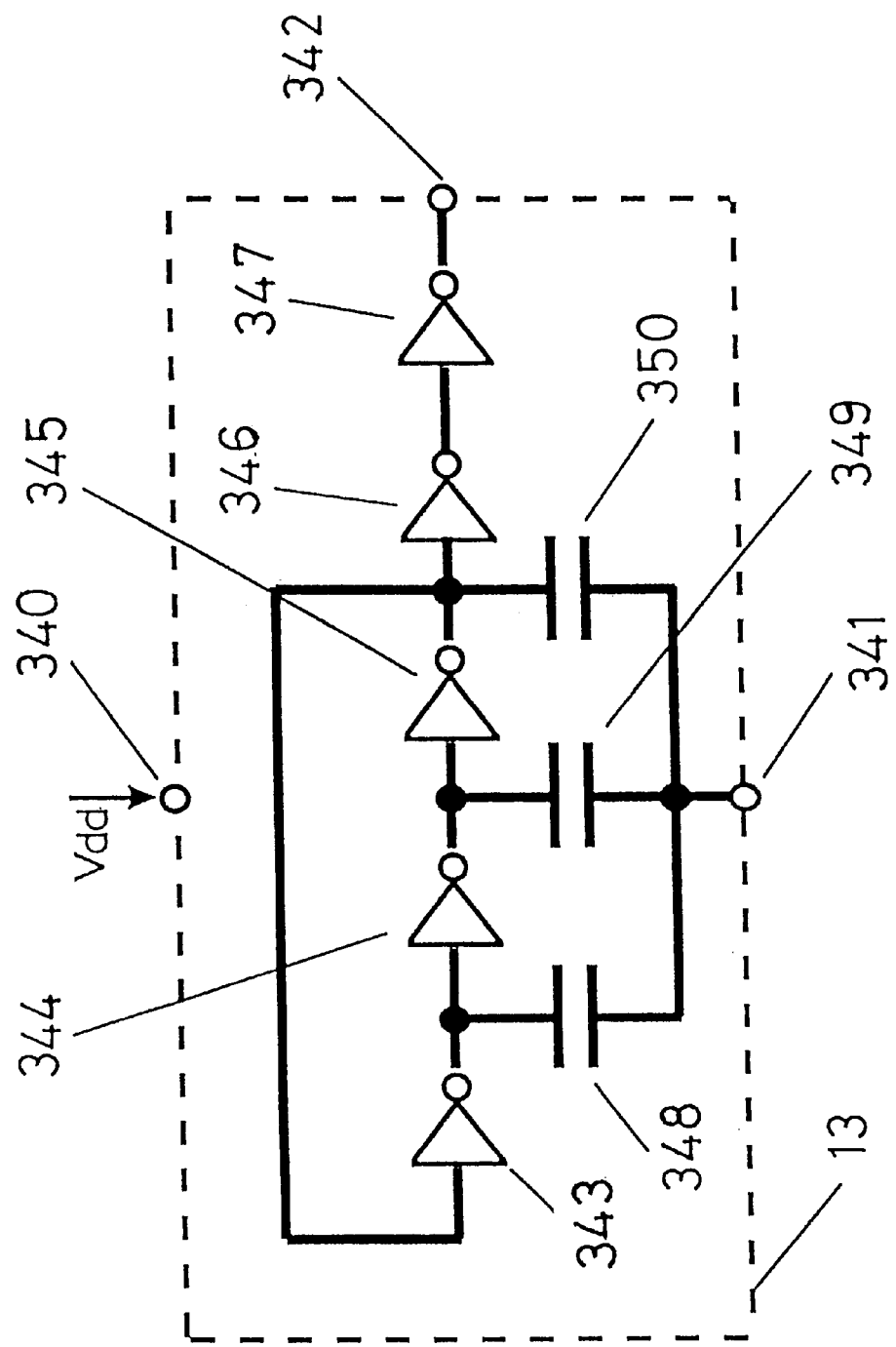
FIG. 24 is a circuit diagram showing an oscillator circuit used in the switched capacitor system of the electronic apparatus of the present invention

FIG. 24 shows an oscillator circuit diagram. An output terminal of an inverter circuit 343 is connected to an input terminal of an inverter circuit 344 and a first electrode of a capacitor 348, an output terminal of the inverter circuit 344 is connected to an input terminal of an inverter circuit 345 and a first electrode of a capacitor 349, an output terminal of the inverter circuit 345 is connected to input terminals of the inverter circuit 343 and 346 and a first electrode of a capacitor 350. An output terminal of the inverter circuit 346 is connected to an input terminal of the inverter circuit 347, and the output terminal of the inverter circuit 347 is connected to a clock signal output terminal 342 for outputting a clock signal P1. Second electrodes of capacitors 348, 349, and 350 are connected to a GND terminal 341 that is an electrode at the lower potential side of the generator or the power supply 11. Herein, the power supply of each inverter circuit is connected to a Vdd input terminal 340, and the grounded terminal of each inverter circuit is connected to the GND terminal 341. By employing the above-described structure, the clock signal for about 50% of duty is obtained. Also, in the oscillator circuit 13 according to the present invention, assuming that threshold voltages of N-channel type transistors and P-channel type transistors in the inverter circuits are 0.3 V, respectively, the minimum diving voltage of the oscillator circuit 13 is 0.7 V.

Figure 25:
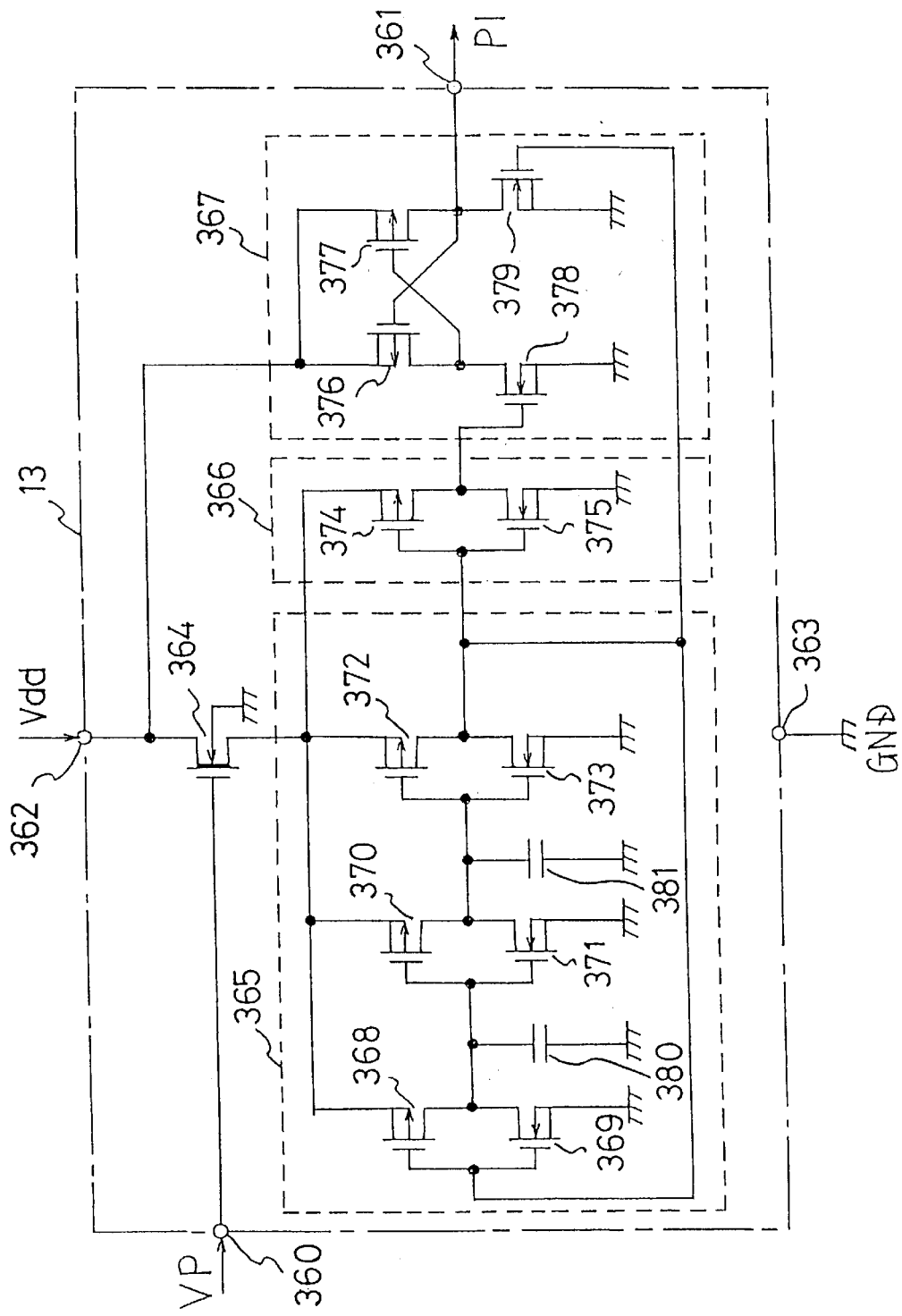
FIG. 25 is a circuit diagram showing an embodiment of an oscillator circuit of the electronic apparatus according to the present invention.

FIG. 25 shows a diagram of the oscillator circuit 13 according to this embodiment, which has a structure different from that of the oscillator circuit as shown in FIG. 24.

First, a state of connection thereof is described.

An electromotive voltage input terminal 360 for inputting the electromotive voltage Vp of a thermoelectric conversion device 120 is connected to the gate of an N-channel type MOS transistor 364 of a depletion type (normally-on type) and a Vdd input terminal 362 into which a boosted voltage Vdd is inputted, is connected to the drain of an N-channel type MOS transistor 364 and the sources and substrates of P-channel type MOS transistors 376 and 377.

The source of the depletion-type N-channel type MOS transistor 364 is connected to the sources and substrates of P-channel type MOS transistors 368, 370 and 372, and the source and substrate of a P-channel type MOS transistor 374 of an inverter circuit 366.

The drain of the P-channel type MOS transistor 368 is connected to the drain of an N-channel type MOS transistor 369, a first electrode of a capacitor 380 and the gates of the P-channel type MOS transistor 370 and an N-channel type MOS transistor 371.

The drain of the P-channel type MOS transistor 370 is connected to the drain of the N-channel type MOS transistor 371, a first electrode of a capacitor 381 and the gates of the P-channel type MOS transistor 372 and the N-channel type MOS transistor 373.

The drain of the P-channel type MOS transistor 372 is connected to the drain of the N-channel type MOS transistor 373, the gates of the P-channel type MOS transistor 368 and the N-channel type MOS transistor 369, the gates of the P-channel type MOS transistor 374 and the N-channel type MOS transistor 375, and the gate of the N-channel type MOS transistor 379.

The drain of the P-channel type MOS transistor 374 is connected to the drain of the N-channel type MOS transistor 375 and the gate of the N-channel type MOS transistor 378.

The drain of the P-channel type MOS transistor 376 is connected to the gate of the P-channel type MOS transistor 377 and the drain of the N-channel type MOS transistor 378.

The drain of the P-channel type MOS transistor 377 is connected to the gate of the P-channel type MOS transistor 376, the drain of the N-channel type MOS transistor 379 and a clock signal output terminal 361 for outputting a clock signal P1.

The sources of the N-channel type MOS transistors 369, 371, 373, 375, 378 and 379, and the second electrodes of the capacitors 380 and 381 are connected to a GND terminal.

The section 365 enclosed by a dotted line shows a ring oscillator circuit, the section 366 enclosed by a dotted line shows an inverter circuit, and the section 367 enclosed by a dotted line shows a level shift circuit.

And connecting to the GND terminal means connecting to a GND potential input terminal 363 connected with an electrode at the lower potential side of the thermoelectric conversion device 120.

Next, operation of the respective components is described. The depletion-type N-channel type MOS transistor 364 regulates a voltage of Vdd inputted from the Vdd input terminal 362. The regulated voltage of the transistor becomes a voltage obtained by adding a voltage of the gate of the transistor, namely, an electromotive voltage Vp of the thermoelectric conversion device 120 to the absolute value of the threshold voltage of the transistor. Namely, the regulated voltage of the transistor rises when the electromotive voltage Vp of the thermoelectric conversion device rises, and drops when the Vp drops.

The ring oscillator circuit 365 generates a clock signal. The frequency of the clock signal rises or drops, respectively, when the power voltage of the ring oscillator 365, namely, the regulated voltage rises or drops. Therefore, while the frequency of the clock signal rises when the electromotive voltage Vp of the thermoelectric conversion device 120 rises, the frequency of the clock signal drops when the Vp drops.

The inverter circuit 366 has the clock signal inputted therein and outputs a clock signal obtained by inverting the clock signal in phase.

The level shift circuit 367 takes in a clock signal from the ring oscillator circuit 365 and a clock signal from the inverter circuit 366, and outputs a clock signal obtained by converting the wave height value of the clock signal from the inverter circuit 366 into a boosted voltage Vdd to the clock signal output terminal 361.

Namely, by adopting the arrangement shown in FIG. 25 as described above, it is possible to realize an oscillator circuit capable of varying the frequency of a clock signal to be outputted according to the electromotive voltage Vp of a thermoelectric conversion device 120.

Moreover, the oscillator circuit of this embodiment shown in FIG. 25 has a feature that a clock signal can ve outputted in a state where a boosted voltage Vdd or the electromotive voltage Vp of a thermoelectric conversion device is low (0.3 V or so) by making a P-channel type MOS transistor have a P-type gate or making an N-channel type MOS transistor have an N-type gate so as to suppress a leak current even when the absolute value of its threshold voltage with regard to the other MOS transistors than a depletion-type N-channel type MOS transistor 364 and thereby making the absolute value of the threshold voltage of each of the MOS transistors as low as possible (0.2 V or so).

Embodiment 12

Figure 26:
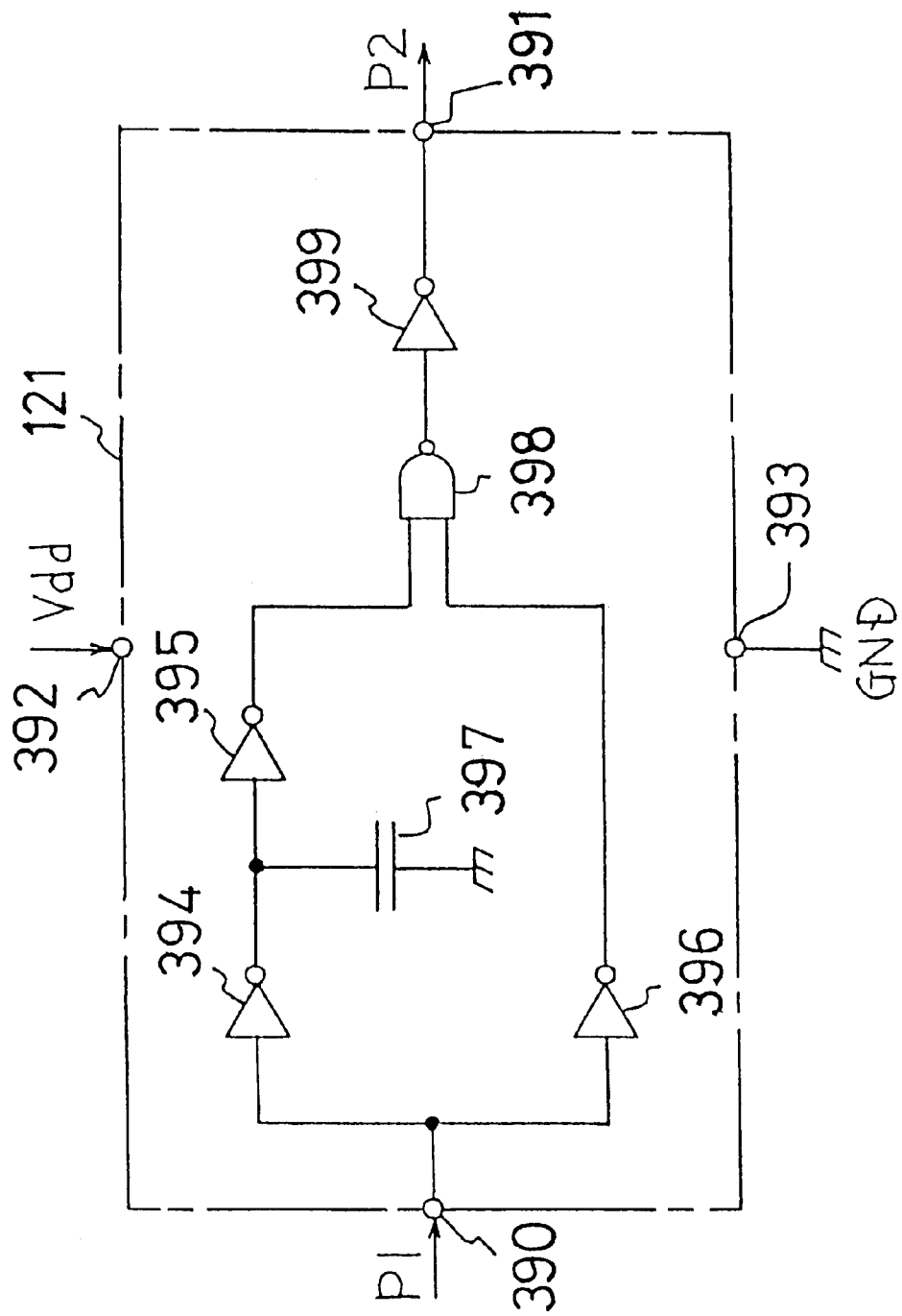
FIG. 26 is a circuit diagram showing an embodiment of an intermittent pulse generator circuit of the electronic apparatus according to the present invention.

FIG. 26 is a circuit diagram of the intermittent pulse generator circuit 121 shown in FIG. 12.

First, its connection state is described.

A clock signal input terminal 390 for inputting a clock signal P1 from an oscillator circuit 13 is connected to the input terminals of inverter circuits 394 and 396, the output terminal of the inverter circuit 394 is connected to a first electrode of a capacitor 397, whose second electrode is connected to a GND terminal, and the input terminal of an inverter circuit 395, the output terminal of the inverter circuit 395 is connected to a first input terminal of a two-input NAND circuit 398, the output terminal of the inverter circuit 396 is connected to a second input terminal of the two-input NAND circuit 398, the output terminal of the two-input NAND circuit 398 is connected to the input terminal of an inverter circuit 399, and the output terminal of the inverter circuit 399 is connected to an intermittent pulse output terminal 391 for outputting an intermittent pulse signal P2.

In the respective inverter circuits and the two-input NAND circuit, their power terminals are connected to a Vdd terminal 392 to which a boosted voltage Vdd is inputted, and their GND terminals are connected to a GND potential input terminal 393 which is connected to an electrode at the lower potential side of the thermoelectric conversion device 120.

Next, its operation is described. The clock signal P1 inputted from the clock signal input terminal 390 is inputted to the first input terminal of the two-input NAND circuit 398 through the inverter circuit 394 and the inverter circuit 395. This clock signal inputted to the first input terminal of the two-input NAND circuit 398 is delayed in phase more than the clock signal P1 by a time necessary for charging/discharging the capacitor 397.

On the other hand, a clock signal inputted to the second input terminal of the two-input NAND circuit 398 through the inverter circuit 396 is inverse in phase to the clock signal P1.

In the two-input NAND circuit 398, since the clock signals as described above are inputted to the input terminals of the two-input NAND circuit, the output terminal of the two-input NAND circuit outputs a clock signal which is "low" only for a period from the time when the second input terminal of the two-input NAND circuit has been changed from "low" to "high" to the time when the first input terminal of the two-input NAND circuit is changed from "high" to "low," namely, only for a period of time necessary for charging the capacitor 397.

The inverter circuit 399 inverts a pulse signal outputted by the two-input NAND circuit 398 in phase and outputs a clock signal obtained by the phase inversion to the intermittent pulse signal output terminal 391.

The intermittent pulse signal output terminal 391 outputs a pulse signal outputted by the inverter circuit 399 as an intermittent pulse signal P2.

It is a matter of course that a period for which the intermittent pulse signal P2 is "high" can be varied by varying the driving capability of the inverter circuit 394 or the capacity of the capacitor 397.

Moreover, the intermittent pulse generator circuit 121 of the embodiment shown in FIG. 26 has a feature that an intermittent clock signal can be outputted even in a state where a boosted voltage Vdd is low by making a P-channel type MOS transistor have a P-type gate or making an N-channel type MOS transistor have an N-type gate so as to suppress a leak current even when the absolute value of its threshold voltage is lowered with regard to the MOS transistors forming the respective circuits and thereby making the absolute value of the threshold voltage of each of the MOS transistors as low as possible (0.2 V or so).

Embodiment 13

Figure 27:
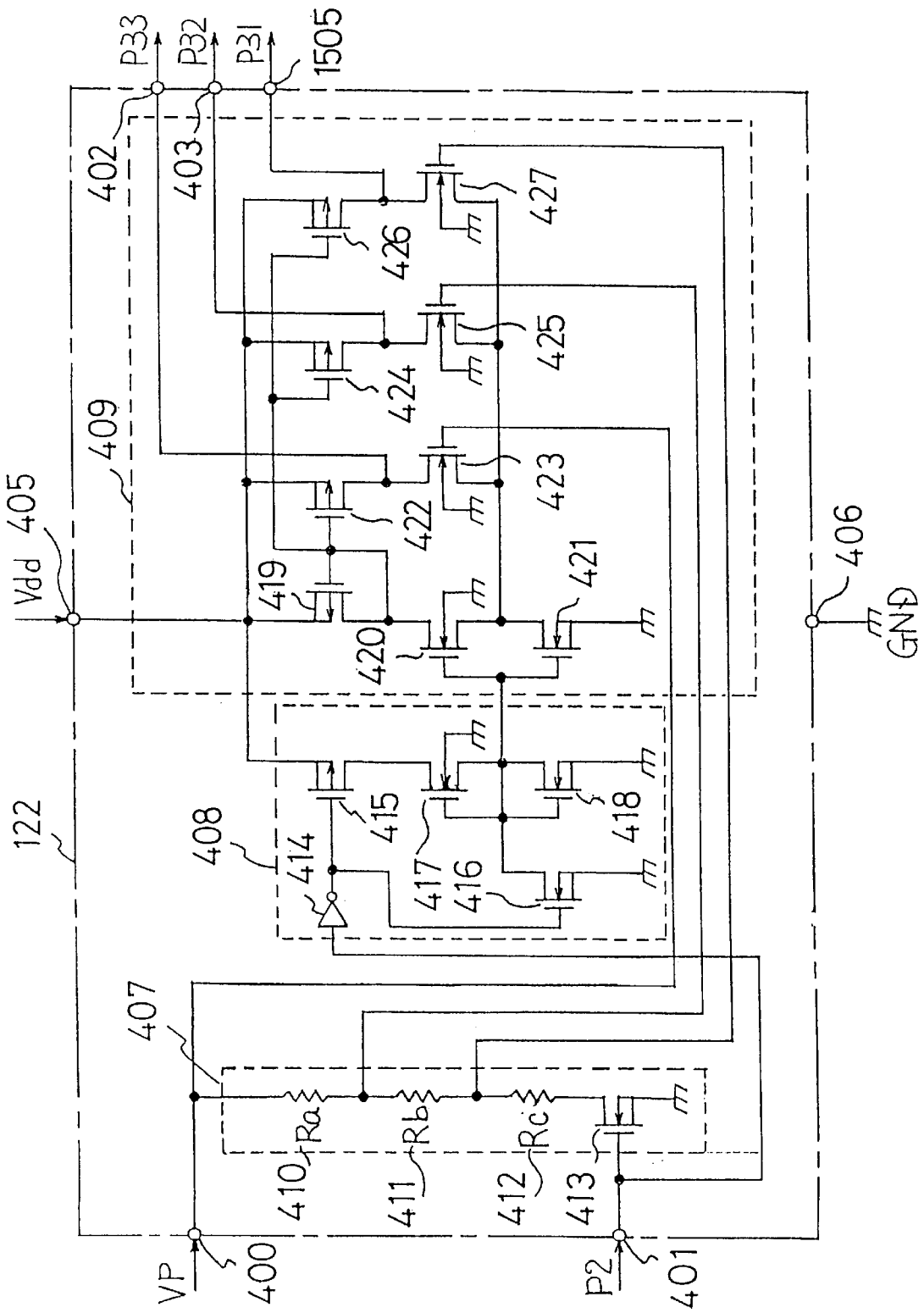
FIG. 27 is a circuit diagram showing an embodiment of a voltage detecting circuit of the electronic apparatus according to the present invention.

FIG. 27 is a circuit diagram of the voltage detecting circuit 122 of the embodiment shown in FIG. 12. First, its connection state is described. An electromotive voltage input terminal 400 for inputting the electromotive voltage Vp of a thermoelectric conversion device 120 is connected to a first electrode of a resistor Ra 410 and the gate of an N-channel type MOS transistor 423.

A second electrode of the resistor Ra is connected to a first electrode of a resistor Rb and the gate of an N-channel type MOS transistor 425.

A second electrode of the resistor Rb is connected to a first electrode of a resistor Rc and the gate of an N-channel type MOS transistor 427, and a second electrode of the resistor Rc is connected to the drain of an N-channel type MOS transistor 413.

An intermittent pulse signal input terminal 401 for inputting an intermittent pulse signal P2 is connected to the gate of an N-channel type MOS transistor 413 and the input terminal of an inverter circuit 414.

The output terminal of the inverter circuit 414 is connected to the gate of a P-channel type MOS transistor 415 and the gate of an N-channel type MOS transistor 416.

In an N-channel type MOS transistor 417 of a depletion type (normally-on type), the drain of the transistor is connected to the drain of the P-channel type MOS transistor 415, and the gate of the transistor is connected to the source of the transistor, the drain and gate of an N-channel type MOS transistor 418, the drain of the N-channel type MOS transistor 416, and the gates of a P-channel type MOS transistor 420 and an N-channel type MOS transistor 421.

The gate of a P-channel type MOS transistor 419 is connected to the drain of the P-channel type MOS transistor 419, the gates of P-channel type MOS transistors 422, 424 and 426, and the drain of the N-channel type MOS transistor 420.

The source of the N-channel type MOS transistor 420 is connected to the drain of the N-channel type MOS transistor 421 and the sources of N-channel type MOS transistors 423, 425 and 427.

The drain of the P-channel type MOS transistor 422 is connected to the drain of the N-channel type MOS transistor 423 and a third output terminal 402 for outputting a third detection signal P33.

The drain of the P-channel type MOS transistor 424 is connected to the drain of the N-channel type MOS transistor 425 and a second output terminal 403 for outputting a second detection signal P32.

The drain of the P-channel type MOS transistor 426 is connected to the drain of the N-channel type MOS transistor 427 and a first output terminal 404 for outputting a first detection signal P31.

A Vdd input terminal 405 for inputting a boosted voltage Vdd is connected to the sources and substrates of the P-channel type MOS transistors 415, 419, 422, 424 and 426, and the power source of the inverter circuit 414.

The sources of the N-channel type MOS transistors 413, 416, 418 and 421 are connected to a GND terminal.

With regard to the sections enclosed by dotted lines shown in FIG. 27, reference numeral 407 denotes a voltage dividing resistor section, 408 denotes a reference voltage generator circuit section, and 409 denotes a comparator circuit section.

And connecting to the GND terminal means connecting to a GND potential input terminal 406 connected with an electrode at the lower potential side of the thermoelectric conversion device 120.

Next, operation of the respective components is described. The voltage dividing resistor section 407 outputs divided voltages of the electromotive voltage Vp of the thermoelectric conversion device. The divided voltages include a first divided voltage obtained by dividing the Vp with the resistor Ra 410 and a resistor in which the resistor Rb 411 and Rc 412 are connected in series with each other, and a second divided voltage obtained by dividing the Vp with a resistor in which the resistor Ra 410 and Rb 411 are connected in series with each other and the resistor Rc 412, and the first divided voltage and the second divided voltage are outputted, respectively, from the first electrode of the resistor Rb 411 and the first electrode of the resistor Rc 412. Furthermore, an intermittent operation is performed to reduce a current consumption by controlling the voltage dividing resistor section 407 so as to output the divided voltages only for a period when the intermittent pulse signal P2 is "high" and so as to output no divided voltage by cutting the current flowing through the resistors when the intermittent pulse signal P2 is "low" by means of the N-channel type MOS transistor 413 having the intermittent pulse signal P2 inputted into its gate.

The reference voltage generator circuit section 408 outputs a reference voltage. The reference voltage is outputted from the drain of the N-channel type MOS transistor 418. Furthermore, an intermittent operation is performed to reduce a current consumption by controlling the reference voltage generator section 408 so as to output the reference voltage only for a period when the intermittent pulse signal P2 is "high" and output the GND potential instead of the reference voltage by turning off the P-channel type MOS transistor 415 to cut an electric current from the Vdd and turning on the N-channel type MOS transistor 416 for a period when the intermittent pulse signal P2 is "low", by means of the P-channel type MOS transistor 415 and the N-channel type MOS transistor 416 having the intermittent pulse signal P2 inputted into the gates thereof through the inverter circuit 414.

The comparator circuit section 409 is a comparator circuit using a comparison method of a current mirror type, and performs an operation which compares with each other the reference voltage inputted to the gate of the N-channel type MOS transistor 420 with the electromotive voltage Vp of the thermoelectric conversion device 120 inputted to the gate of the N-channel type MOS transistor 423, and outputs a detection signal in three manners as follows. In a first manner, a signal of "high" is outputted as the third detection signal P33 from the third output terminal 402 in case that the Vp is lower than the reference voltage and a signal of "low" is outputted as the signal P33 in case that the Vp is higher than the reference voltage. In a second manner, the reference voltage is compare with the first divided voltage inputted from the voltage dividing resistor section 407 to the gate of the N-channel type MOS transistor 425, and a signal of "high" is outputted as the second detection signal P2 from the second output terminal 403 in case that the first divided voltage is lower than the reference voltage and a signal of "low" is inputted as the signal P2 in case that the first divided voltage is higher than the reference voltage. In a third manner, the reference voltage is compared with the second divided voltage inputted from the voltage dividing resistor section 407 to the gate of the N-channel type MOS transistor 427, and as the first detection signal P31 a signal of "high" is outputted from the first output terminal 404 in case that the second divided voltage is lower than the reference voltage and a signal of "low" is outputted in case that the second divided voltage is higher than the reference voltage.

Furthermore, the comparator circuit section 409 performs a detecting operation by making an electric current flow to the GND terminal when the reference voltage is outputted, namely, when the intermittent pulse signal P2 is "high", and performs no detecting operation by making no electric current flow to the GND terminal when the reference voltage is not outputted and the GND potential is outputted, namely, when the intermittent pulse signal is "low", by means of the N-channel type MOS transistor 421 having the reference voltage inputted into its gate. Namely, it reduces a current consumption by intermittently performing a detecting operation.

This embodiment has been designed so that the first divided voltage is 0.4 V when the electromotive voltage Vp of the thermoelectric conversion device 120 is 0.8 V and the second divided voltage is 0.4 V when the electromotive voltage Vp of the thermoelectric conversion device 120 is 1.6 V, and the reference voltage is 0.4 V. Namely, the third detection voltage P33 is "low" when the electromotive voltage Vp of the thermoelectric conversion device is not lower than 0.4 V and the voltage P33 is "high" when the Vp is lower than 0.4 V, and the second detection signal P2 is "low" when the Vp is not lower than 0.8 V and the signal P2 is "high" when the Vp is lower than 0.8 V, and the first detection signal P31 is "low" when the Vp is not lower than 1.6 V and the signal P31 is "high" when the Vp is lower than 1.6 V.

Moreover, the voltage detecting circuit 122 of the embodiment shown in FIG. 27 has a feature that the respective detection signals can be outputted even in a state where a boosted voltage Vdd or the electromotive voltage Vp of the thermoelectric conversion device 120 is low by making a P-channel type MOS transistor have a P-type gate formed therein or making an N-channel type MOS transistor have an N-type gate formed therein so as to suppress a leak current even when the absolute value of its threshold voltage is lowered with regard to the MOS transistors forming the respective circuits and thereby making the absolute value of the threshold voltage of each of the MOS transistors as low as possible (0.2 V or so).

Namely, by forming the voltage detecting circuit 122 of the embodiment shown in FIG. 12 into such an arrangement as shown in FIG. 27, it is possible to realize a voltage detecting circuit having a little current consumption, the circuit performing an intermittent operation based upon an intermittent pulse signal P2.

Embodiment 14

Figure 28:
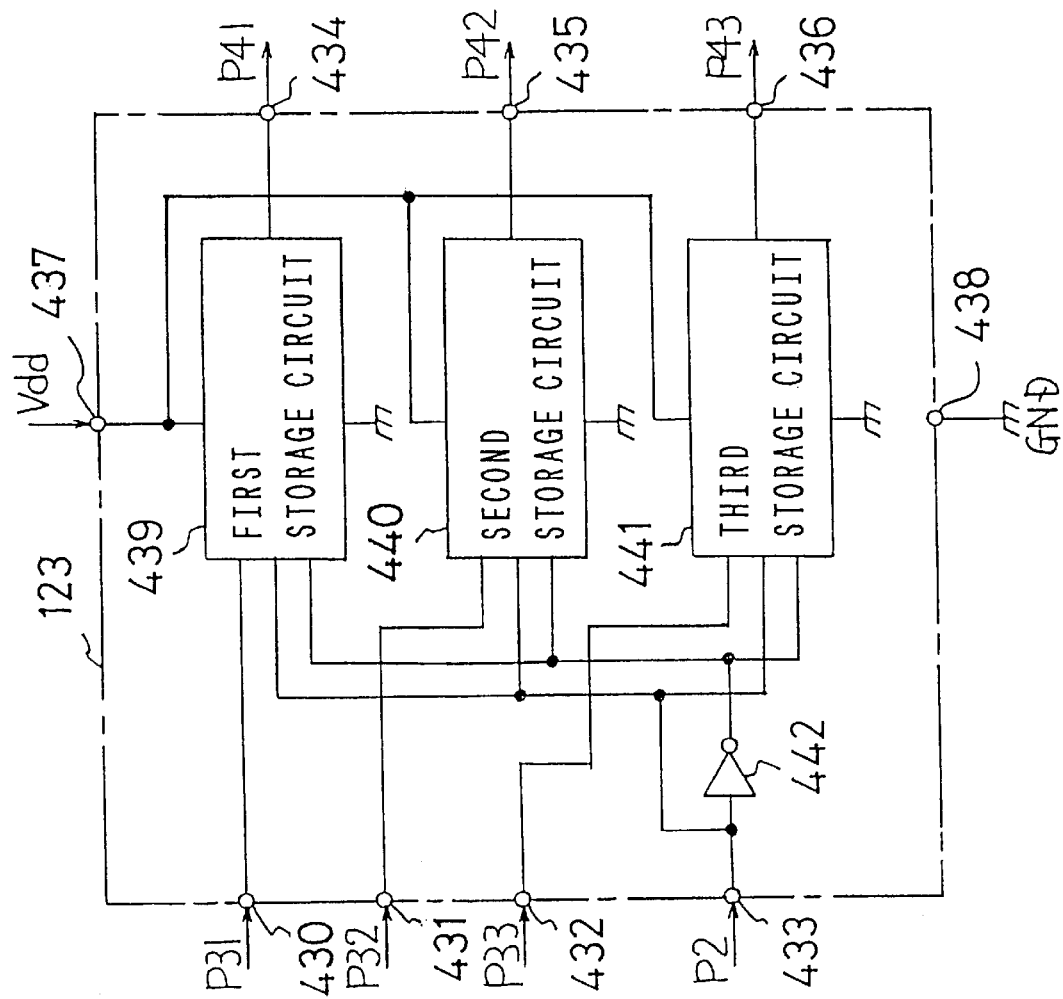
FIG. 28 is a circuit diagram showing an embodiment of a signal storage circuit of the electronic apparatus according to the present invention.

FIG. 28 shows a circuit diagram of the signal storage circuit 123 of the embodiment shown in FIG. 12. First, its connection state is described. A first input terminal 430 for inputting a first detection signal P31 outputted from the voltage detecting circuit 122 is connected to a signal input terminal of a first storage circuit 439, a second input terminal 431 for inputting a second detection signal P32 outputted from the voltage detecting circuit is connected to a signal input terminal of a second storage circuit 440, and a third input terminal 432 for inputting a third detection signal P33 outputted from the voltage detecting circuit is connected to a signal input signal of a third storage circuit 441.

An intermittent pulse signal input terminal 433 for inputting an intermittent pulse signal P2 outputted from an intermittent pulse generator circuit 121 is connected to a first intermittent pulse signal input terminal of each of a first storage circuit 439, a second storage circuit 440 and a third storage circuit 441, and the input terminal of an inverter circuit 442; and the output terminal of the inverter circuit 442 is connected to a second intermittent pulse signal input terminal of each of the first storage circuit 439, the second storage circuit 440 and the third storage circuit 441.

A Vdd input terminal 437 for inputting a boosted voltage Vdd is connected to a Vdd input terminal of each of the first storage circuit 439, the second storage circuit 440 and the third storage circuit 441, and a GND potential input terminal 438 connected with an electrode at the lower potential side of the thermoelectric conversion device 120 is connected to a GND potential input terminal of each of the first storage circuit 439, the second storage circuit 440 and the third storage circuit 441.

An output terminal of the first storage circuit 439 is connected to a first output terminal 434 for outputting a first storage signal P41, an output terminal of the second storage circuit 440 is connected to a second output terminal 435 for outputting a second storage signal P42, and an output terminal of the third storage circuit 441 is connected to a third output terminal 436 for outputting a third storage signal P43.

And a power terminal of the inverter circuit 442 is connected to a Vdd input terminal 437 for inputting a boosted voltage Vdd, and a GND terminal of the inverter circuit 442 is connected to a GND potential input terminal 438 connected with an electrode at the lower potential side of the thermoelectric conversion device 120.

Next, its operation is described. First, since the first intermittent pulse signal input terminal of each of the respective storage circuits is "high" and the second intermittent pulse signal input terminal of each of the respective storage circuits is "low" for a period when the intermittent pulse signal P2 is "high", the first storage circuit 439 outputs the same signal as the first detection signal P31 to the first output terminal 434, the second storage circuit 440 outputs the same signal as the second detection signal P32 to the second output terminal 435, and the third storage circuit 441 outputs the same signal as the third detection signal P33 to the third output terminal 436.

Next, since the first intermittent pulse signal input terminal of each of the respective storage circuits is "low" and the second intermittent pulse signal input terminal of each of the respective storage circuits is "high" for a period when the intermittent pulse signal P2 is "low" after "high", the first storage circuit 439 stores the voltage of the first detection signal P31 at the time when the intermittent pulse signal P2 becomes "low" from "high" and continues outputting the voltage of the stored first detection signal P31 to the first output terminal 434, the second storage circuit 440 stores the voltage of the second detection signal P32 at the time when the intermittent pulse signal P2 becomes "low" from "high" and continues outputting the voltage of the stored second detection signal P32 to the second output terminal 435, and the third storage circuit 441 stores the voltage of the third detection signal P33 at the time when the intermittent pulse signal P2 becomes "low" from "high" and continues outputting the voltage of the stored third detection signal P33 to the third output terminal 436.

Namely, by forming the signal storage circuit 123 shown in FIG. 12 into the arrangement shown in FIG. 28, it is possible to realize a signal storage circuit which outputs a detection signal of the voltage detecting circuit 122 as a storage signal as it is for a period when the voltage detecting circuit performing an intermittent operation is operated, namely, for a period when an intermittent pulse signal is "high", and stores a detection signal for a period when the voltage detecting circuit is operated before a period when the voltage detecting circuit is not operated, for the period, namely, for a period when the intermittent pulse signal is "low", and outputs the stored detection signal as a storage signal.

Figure 29:
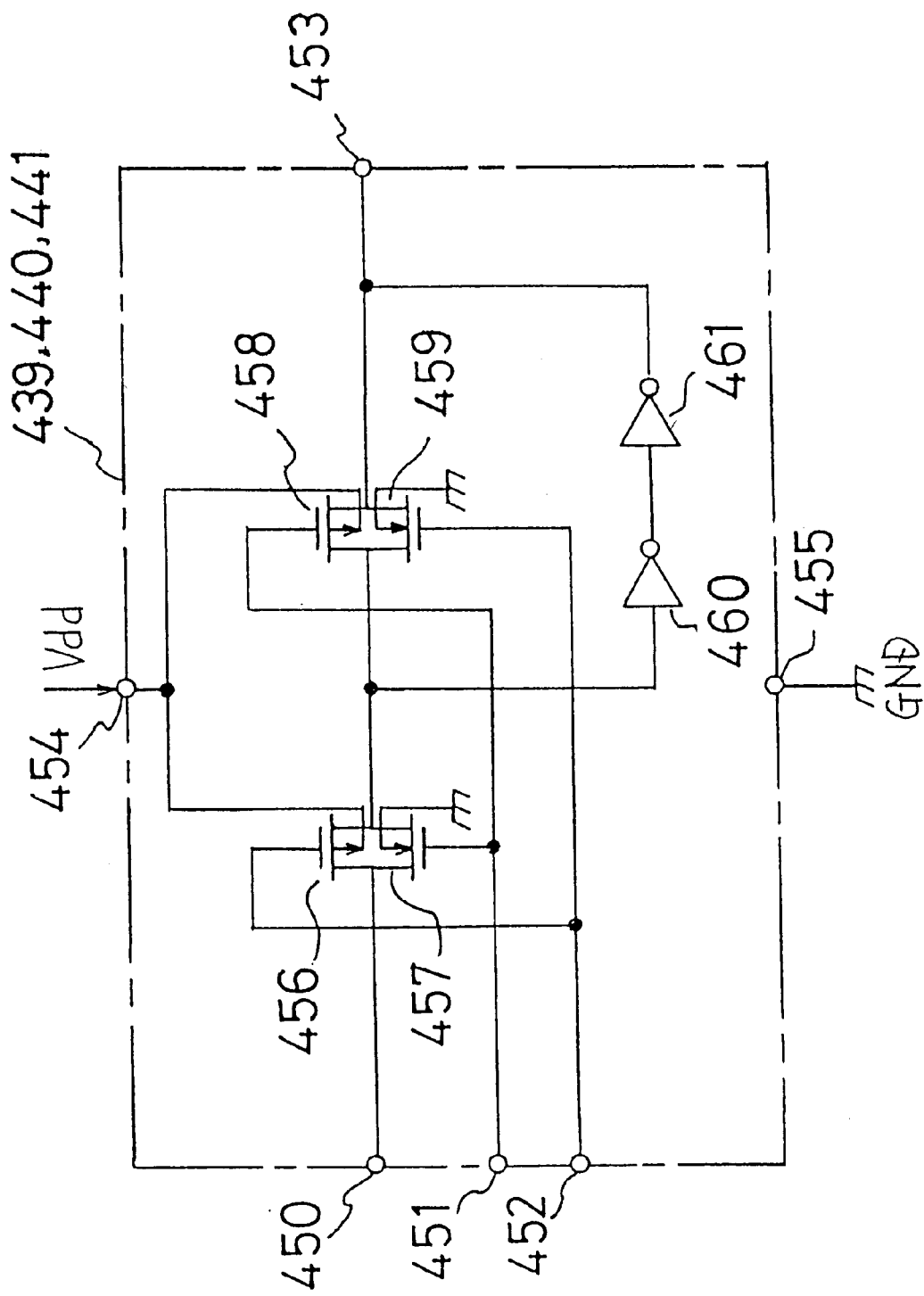
FIG. 29 is a circuit diagram showing an embodiment of a signal storage circuit of the electronic apparatus according to the present invention.
Figure 30:
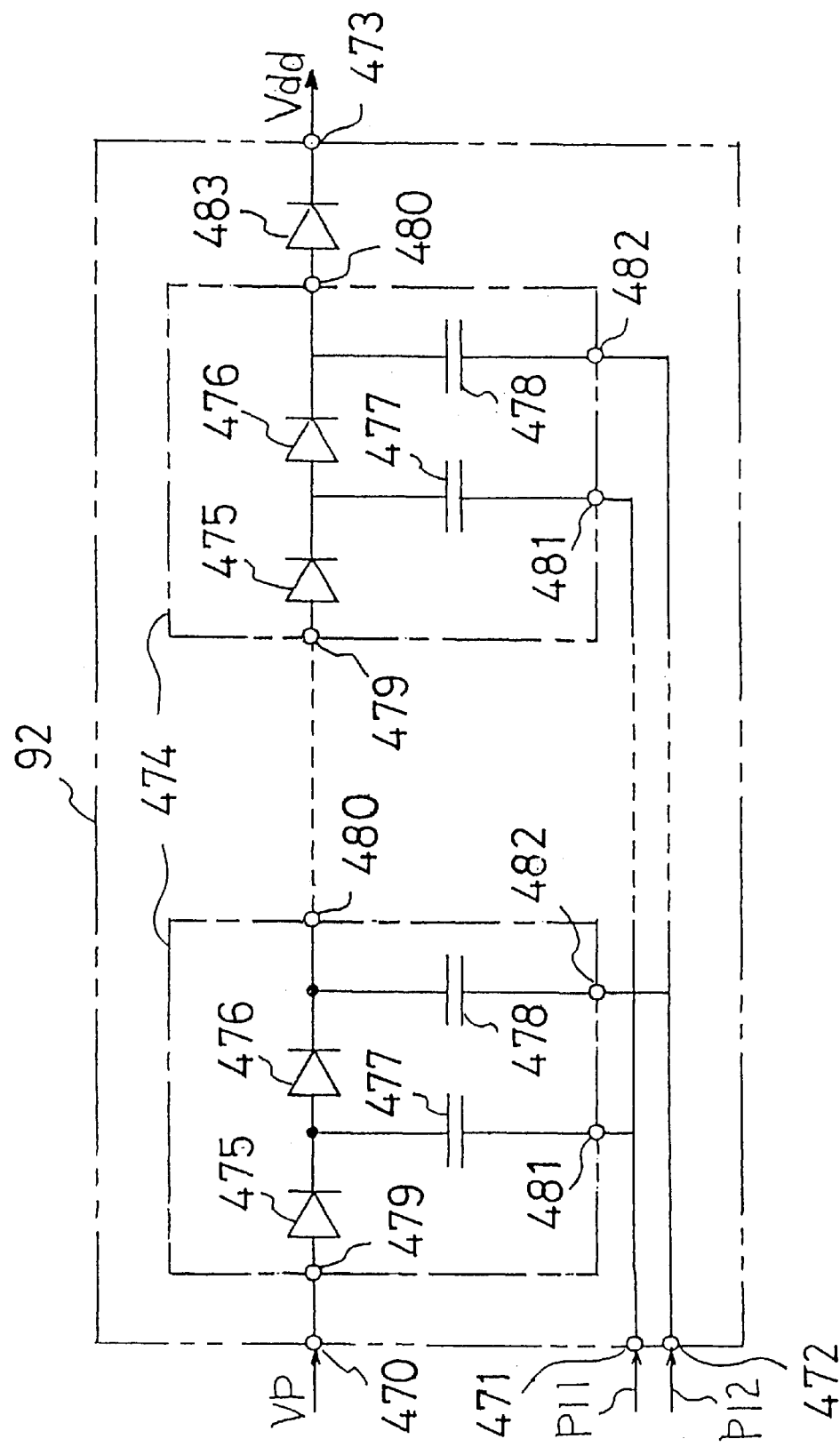
FIG. 30 is a circuit diagram showing a booster circuit in a conventional booster system.

FIG. 29 shows a circuit diagram of the first storage circuit 439, the second storage circuit 440 and the third storage circuit 441 as shown in FIG. 28. First, its connection state is described. A detection signal input terminal 450 for inputting a detection signal is connected to the source of a P-channel type MOS transistor 456 and the drain of an N-channel type MOS transistor 457.

A first intermittent pulse signal input terminal 451 to which an intermittent pulse signal P2 is inputted is connected to the gate of the N-channel type MOS transistor 457 and the gate of a P-channel type MOS transistor 458.

A second intermittent pulse signal input terminal 452 to which a signal obtained by inverting in phase the intermittent pulse signal P2 is inputted is connected to the gate of the P-channel type MOS transistor 456 and the gate of an N-channel type MOS transistor 459.

The drain of the P-channel type MOS transistor 456 is connected to the source of the N-channel type MOS transistor 457, the source of the P-channel type MOS transistor 458, the source of the N-channel type MOS transistor 459, and the input terminal of an inverter circuit 460, and the output terminal of the inverter circuit 460 is connected to the input terminal of an inverter circuit 461.

The output terminal of the inverter circuit 461 is connected to the drain of the P-channel type MOS transistor 458, the source of the N-channel type MOS transistor 459, and a storage signal output terminal 453 for outputting a storage signal.

A Vdd input terminal 454 for inputting a boosted voltage Vdd is connected to the substrates of the P-channel type MOS transistors 456 and 458, and the power terminals of the inverter circuits 460 and 461, and a GND potential input terminal 455 connected with an electrode at the lower potential side of the thermoelectric conversion device is connected to the GND terminals of the inverter circuits 460 and 461.

Next, its operation is described. First, since the first intermittent pulse signal input terminal 451 is "high" and the second intermittent pulse signal input terminal 452 is "low" when the intermittent pulse signal P2 is "high", the P-channel type MOS transistor 456 and the N-channel type MOS transistor 457 are turned on, and the P-channel type MOS transistor 458 and the N-channel type MOS transistor 459 are turned off, and since a detection signal inputted from the detection signal input terminal 450 is inputted to the input terminal of the inverter circuit 460, the detection signal is outputted from the storage signal output terminal 453 as it is.

Next, since the first intermittent pulse signal input terminal 452 becomes "low" and the second intermittent pulse signal input terminal 452 becomes "high" when the intermittent pulse signal P2 has become "low" from "high" as described above, the P-channel type MOS transistor 456 and the N-channel type MOS transistor 457 are turned off, and the P-channel type MOS transistor 458 and the N-channel type MOS transistor 459 are turned on, and a detection signal inputted from the detection signal input terminal 450 is not inputted to the input terminal of the inverter circuit 460 and the last detection signal at the time when the intermittent pulse signal is "high" is left as it has been inputted, and therefore the last detection signal at the time when the intermittent pulse signal is "high" continues being outputted from the storage signal output terminal 453.

Namely, by adopting such an arrangement as shown in FIG. 29, it is possible to realize a storage circuit which outputs a detection signal as a storage signal as it is when an intermittent pulse signal is "high", namely, when the voltage detecting circuit operates and outputs the detection signal, and stores the last detection signal at the time when the intermittent pulse signals is "high", when the intermittent pulse signal has become "low" from "high", namely, when the voltage detecting circuit has stopped and a detection signal has not been outputted, and continues outputting the stored detection signal until the next intermittent pulse signal becomes "high."

In this embodiment, as described above, by making the signal storage circuit 123 shown in FIG. 12 into the arrangement as shown in FIG. 29 by using a storage circuit formed as shown in FIG. 28, it is possible to realize a signal storage circuit which outputs a detection signal of the voltage detecting circuit 122 performing an intermittent operation shown in FIG. 12 when the voltage detecting circuit 122 is operated, and stores a detection signal before the voltage detecting circuit 122 has stopped, namely, a detection signal at the time when the voltage detecting circuit 122 is in operation when the voltage detecting circuit 122 is stopped, and outputs the stored detection signal until the voltage detecting circuit 122 operates at the next time.

Moreover, the signal storage circuit of this embodiment has a feature that a storage signal cannot be outputted even in a state where a boosted voltage Vdd or the electromotive voltage Vp of a thermoelectric conversion device is low, by making a P-channel type MOS transistor have a P-type gate or making an N-channel type MOS transistor have an N-type gate with regard to the respective MOS transistors forming the signal storage circuit so as to suppress a leak current even when the absolute value of its threshold voltage is lowered and thereby making the absolute value of the threshold voltage of each of the MOS transistors as low as possible (0.2 V or so).

Embodiment 15

In this embodiment of the present invention, the circuit as described in the embodiments 7, 8, 9 and 10 is used as the booster circuit 12 of the electronic apparatus 10 as shown in FIG. 2, the circuit as described in the embodiment 11 is used as the oscillator circuit 13, and the thermoelectric conversion devices 71 are used instead of the generator or the power supply 11. The voltage of the thermoelectric conversion devices 71 sharply increases immediately after the temperature difference is applied between the substrates of the thermoelectric conversion devices 71, but the voltage drops after passing a peak, and saturates at a certain value. Immediately after the temperature difference is given between the substrates, since the given temperature difference is applied to the thermoelectric conversion devices 71, a high voltage can be generated. As time elapses, however, the heat is propagated from the substrate 50 to the substrate 51 through the P-type and N-type thermoelectric material elements 52 and 53, and the temperature difference between the substrates 50 and 51 is decreased. Accordingly, the generated voltage is also decreased. In the conventional booster circuit 92, if it is attempted to boost the voltage generated by the thermoelectric conversion devices 71, the generated voltage is low so that it is impossible to boost the voltage by the loss in the switching elements at the initial stage. By employing the booster circuit 12 according to the present invention, however, the output voltage of the thermoelectric conversion devices 71 that are saturated can be boosted. In this embodiment, although the booster circuit 12 as described in embodiments 7, 8, 9 and 10 is incorporated into the electronic apparatus as shown in FIG. 2, when the booster circuit 12 is incorporated also into the electronic apparatus 10 as shown in FIGS. 1, 3 and 4, the object of the present invention will be attained more certainly.

As described above, the electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; and the oscillator circuit 13 which drives the booster circuit 12. Therefore, the output voltage of the generator or the power supply 11 is not required to be always kept at the minimum driving voltage of the oscillator circuit or higher, so that the generator or the power supply 11 can be downsized. Downsizing of the generator or the power supply 11 leads to broad application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

The electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; and the oscillator circuit 13 which drives the booster circuit 12. Therefore, the output voltage of the generator or the power supply 11 is not required to be always kept at the minimum driving voltage of the oscillator circuit or higher. Once the voltage exceeds the minimum driving voltage of the oscillator circuit, the booster circuit 12 can be driven, and therefore, the generator or the power supply 11 can be downsized. Downsizing of the generator or the power supply 11 leads to broad application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

The electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; and the oscillator circuit 13 which drives the booster circuit 12. Therefore, the output voltage of the generator or the power supply 11 is not required to be always kept at the minimum driving voltage of the oscillator circuit or higher, so that the generator or the power supply 11 can be downsized. Downsizing of the generator or the power supply 11 leads to broad application to a portable apparatus. Also, once the output voltage of the generator or the power supply 11 exceeds the minimum driving voltage of the oscillator circuit, the above-mentioned oscillator circuit 4 starts operating, boosts the voltage, and drives the oscillator circuit 4 using the boosted power. Therefore, it is possible to continuously drive the driving circuit 42 of the electronic apparatus without the other power sources. Also, since the voltage not higher than the minimum driving voltage of the oscillator circuit, which cannot be boosted in the conventional electronic apparatus, can be boosted, there is obtained an effect that the power efficiency of the whole system can be improved.

The electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; the oscillator circuit 13 which drives the booster circuit 12; and the power source 30 provided independently of the generator or the power supply 11. Therefore, the output voltage of the generator or the power supply 11 is not required to be always kept at the minimum driving voltage of the oscillator circuit or higher. Further, since the electronic apparatus 10 according to the present invention can continue operating even if the voltage of the generator or the power supply 11 cannot exceed the minimum driving voltage of the oscillator circuit as time elapses, the generator or the power supply 11 can be downsized. Downsizing of the generator or the power supply 11 leads to broad application to a portable apparatus. Also, since the voltage not higher than the minimum driving voltage of the oscillator circuit, which cannot be boosted in the conventional electronic apparatus, can be boosted, there is obtained an effect that the power efficiency of the whole system can be improved.

The electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; the oscillator circuit 13 which drives the booster circuit 12; and the power source 30 provided independently of the generator or the power supply 11. Therefore, the output voltage of the generator or the power supply 11 is not required to be always kept at the minimum driving voltage of the oscillator circuit or higher. Further, since the electronic apparatus 10 according to the present invention can continue operating even if the voltage of the generator or the power supply 11 cannot exceed the minimum driving voltage of the oscillator circuit as time elapses, the generator or the power supply 11 can be downsized. Downsizing of the generator or the power supply 11 leads to broad application to a portable apparatus. Also, once the output voltage of the power source 30 provided independently of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without the other power sources. Further, since it is not necessary for the power source 30 provided independently of the generator or the power supply 11 to always supply power to the oscillator circuit 13, the power source 30 can be downsized. Also, since the voltage not higher than the minimum driving voltage of the oscillator circuit, which cannot be boosted in the conventional electronic apparatus, can be boosted, there is obtained an effect that the power efficiency of the whole system can be improved.

The electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; the oscillator circuit 13 which drives the booster circuit 12; the Schottky diode 20 for rectifying the power generated by the generator or the power supply and the power boosted by the booster circuit 12; the control circuit 40 for dividing the power into the driving circuit 42 of the electronic apparatus and the capacitor 41 or from the capacitor 41 to the driving circuit 42 of the electronic apparatus according to the value of the voltage boosted by the booster circuit 12; the capacitor 41 for accumulating the boosted power to supply the power to the driving circuit 42 of the electronic apparatus; and the driving circuit 42 of the electronic apparatus which operates using the power boosted by the booster circuit 12 or the power accumulated in the capacitor 41. Therefore, since the output voltage of the generator or the power supply 11 is not required to be always kept at the minimum driving voltage of the oscillator circuit or higher, the generator or the power supply 11 can be downsized. Downsizing of the generator or the power supply 11 leads to broad application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without the other power sources. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is distributed to the capacitor 41 or the driving circuit 42 of the electronic apparatus according to the value of the voltage boosted by the booster circuit 12. Therefore, there is obtained such an effect that the power supplied by the generator or the power supply 11 can efficiently be consumed.

The electronic apparatus according to the present invention is comprised of: the thermoelectric conversion device 71 in which P-type thermoelectric material elements 52 and N-type thermoelectric material elements 53 are sandwiched between two substrates and form the p-n junction through the electrically conductive materials 54 and 55 such as metal to be connected in series with one another; the booster circuit 12 for boosting the output voltage of the generator or the power supply 11; the oscillator circuit 13 which drives the booster circuit 12; the Schottky diode 20 for rectifying the power generated by the generator or the power supply and the power boosted by the booster circuit 12; the control circuit 40 for dividing the power into the driving circuit 42 of the electronic apparatus and the capacitor 41 or from the capacitor 41 to the driving circuit 42 of the electronic apparatus according to the value of the voltage boosted by the booster circuit 12; the capacitor 41 for accumulating the boosted power to supply the power to the driving circuit 42 of the electronic apparatus; and the driving circuit 42 of the electronic apparatus which operates using the power boosted by the booster circuit 12 or the power accumulated in the capacitor 41. Therefore, in the case where the electronic apparatus 10 is continuously driven, since the output voltage of the thermoelectric conversion device 71 is not required to be always kept at the minimum driving voltage of the oscillator circuit or higher, the thermoelectric conversion device 71 can be downsized. Downsizing of the generator or the power supply 11 leads to broad application to a portable apparatus. Also, once the output voltage of the thermoelectric conversion device 71 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the driving circuit 42 of the electronic apparatus without the other power sources. Particularly, since the output voltage of the thermoelectric conversion device 71 at a time instant when a temperature difference generates is several times as large as the voltage in a constant state after time elapses, the thermoelectric conversion device 71 is suitable for the electronic apparatus 10 according to the present invention. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is distributed to the capacitor 41 or the driving circuit 42 of the electronic apparatus according to the value of the voltage boosted by the booster circuit 12. Therefore, there is obtained such an effect that the power supplied by the thermoelectric conversion device 71 can efficiently be consumed.

The electronic apparatus according to the present invention is comprised of: the generator in which the voltage of power generated changes as time elapses or the power supply 11 in which the voltage changes as time elapses; the booster circuit 12 for boosting the output voltage of the generator or the power supply 11; the oscillator circuit 13 which drives the booster circuit 12; the Schottky diode 20 for rectifying the power generated by the generator or the power supply and the power boosted by the booster circuit 12; the control circuit 40 for dividing the power into the watch movement 75 and the capacitor 41 or from the capacitor 41 to the watch movement 75 according to the value of the voltage boosted by the booster circuit 12; the capacitor 41 for accumulating the boosted power to supply the power to the watch movement 75; and the watch movement 75 including a time display function, which operates using the power boosted by the booster circuit 12 or the power accumulated in the capacitor 41. Therefore, since the output voltage of the generator or the power supply 11 is not required to be always kept at the minimum driving voltage of the oscillator circuit or higher, the generator or the power supply 11 can be downsized. Downsizing of the generator or the power supply 11 leads to broad application to a portable apparatus. Also, once the output voltage of the generator or the power supply 11 exceeds the minimum driving voltage of the oscillator circuit, the above-mentioned oscillator circuit 13 starts operating, boosts the voltage, and drives the oscillator circuit 13 using the boosted power. Therefore, it is possible to continuously drive the watch movement 75 without the other power sources. Further, since the voltage not higher than the minimum driving voltage of the oscillator circuit, which cannot be boosted in the conventional electronic apparatus, can be boosted, there is obtained an effect that the power efficiency of the whole system can be improved. Also, when it is attempted to charge the capacitor 41 that is not charged, in the case of the generator or the power supply having a large internal resistance, the output voltage of the generator or the power supply 11 comes to drop so that a considerably long period of time is required for charging the capacitor 41. In the electronic apparatus 10 according to the present invention, however, the power after boosting operation is distributed to the capacitor 41 or the watch movement 75 according to the value of the voltage boosted by the booster circuit 12. Therefore, there is obtained such an effect that the power supplied by the generator or the power supply 11 can efficiently be consumed.

Further, according to the present invention, since P-channel type MOS transistors and N-channel type MOS transistors are suitably arranged to charge and discharge capacitors in MOS transistors and boost the voltage, boosting efficiency is high and the boosting circuit capable of boosting a low voltage can be realized.

Since the P-type gate is formed in the P-channel type MOS transistor and the N-type gate is formed in the N-channel type MOS transistor, the absolute value of the threshold voltage of each MOS transistor can also be reduced. Accordingly, the boosting circuit capable of boosting a low voltage can be realized.

Also, the oscillator circuit 13 is provided, which is capable of varying a frequency of the clock signal that is outputted according to the electromotive voltage of the power source that generates power by an external energy, for example, the thermoelectric conversion device 120. And the booster circuit 12 boosts the electromotive voltage of the thermoelectric conversion device 120 by the clock signal that the oscillator circuit 13 outputs. By employing such a structure, the booster capable of converting the electromotive voltage of the thermoelectric conversion device 120 into a boosting power without wasteful consumption can be realized.

Further, the voltage detecting circuit 122 for detecting the electromotive voltage of the thermoelectric conversion device and outputting the detection signal corresponding to the electromotive voltage is provided, and a boosting factor of the booster circuit 12 is varied by the detection signal that the voltage detecting circuit 122 outputs. Such a structure makes it possible to realize the booster system capable of converting efficiently the electromotive voltage of the thermoelectric conversion device 120 into a boosting power even if the electromotive voltage of the thermoelectric conversion device 120 is changed.

The intermittent pulse generator circuit 121 for producing the intermittent pulse from the clock signal outputted from the oscillator circuit 13 is provided, so that the voltage detecting circuit 122 is intermittently driven by the intermittent pulse signal. Also, there is provided the signal storage circuit 123 for outputting as a storage signal the detection signal outputted from the voltage detecting circuit 122 to the boosting circuit 12 while the voltage detecting circuit 122 is operated, and for storing, while the voltage detecting circuit 122 is not operated, the last detection signal that is outputted when the voltage detecting circuit 122 is operated, and for outputting as a storage signal the stored detection signal to the booster circuit until the voltage detecting circuit 122 is operated again. And the booster circuit varies the boosting factor according to the storage signal that the signal storage circuit 123 outputs. Such a structure makes it possible to reduce the current to be consumed in the voltage detecting circuit 122 and realize the booster system having a high boosting efficiency.

What is claimed is:

1. An electronic apparatus comprising:
   a power supply for producing an output power which changes as time elapses;
   a booster circuit for boosting an output voltage of the power supply and producing a boosted output voltage;
   an oscillator circuit for generating a periodic pulse signal for driving the booster circuit; and
   a load circuit having a minimum operating voltage higher than that of the oscillator circuit;
   wherein the load circuit is driven by the boosted output voltage, and the oscillator circuit is driven by the output voltage of the power supply to start oscillation and is thereafter driven by the boosted output voltage of the booster circuit.

2. An electronic apparatus according to claim 1; further comprising a diode that connects in a forward direction an output of the power supply and an input of the oscillator circuit, and inputs the output voltage of the power supply as the driving voltage of the oscillator circuit.

3. An electronic apparatus according to claim 1; further comprising a second power supply, and a diode that connects in a forward direction an output of the second power source and an input of the oscillator circuit, and inputs an output voltage of the second power source as the driving voltage of the oscillator circuit.

4. An electronic apparatus according to claim 1; further comprising a capacitor, and a control circuit for switching an output of the capacitor with the boosted output voltage of the booster circuit.

5. An electronic apparatus according to claim 1; wherein the load circuit comprises a time display unit driven by the boosted output voltage of the booster circuit.

6. An electronic apparatus according to claim 4; wherein the load circuit comprises a time display unit connected to an output of the control circuit.

7. An electronic apparatus according to any one of claims 1 to 6; wherein the power supply comprises a plurality of substrates, and a thermoelectric device comprising a plurality of pairs of P-type thermoelectric material and an N-type thermoelectric material which form a p-n junction through an electrically conductive material connected in series with one another.

8. In a miniature electronic apparatus having an electric load circuit and a boosting power supply for driving the load circuit, the boosting power supply comprising:
   a power source for producing an output power which varies with time;
   a voltage detecting circuit for detecting a voltage of the power source; and a booster circuit having a boosting factor which is varied based on an output of the voltage detecting circuit.

9. A miniature electronic apparatus comprising:
a power source for producing an output power which varies with time;
a voltage detecting circuit for detecting an output voltage of the power source;
a booster circuit for boosting the output voltage of the power source and producing a boosted output voltage;
a load circuit driven by the boosted output voltage; and
an oscillator circuit for generating a clock signal for driving the booster circuit, the clock signal having a frequency which varies depending upon the detected output voltage of the power source.

10. An electronic apparatus according to claim 8 or 9; comprising an intermittent pulse generator circuit for intermittently generating pulses for driving the voltage detecting circuit in an intermittent manner, and a storage circuit for storing an output signal of the voltage detecting circuit until a subsequent pulse is generated by the intermittent pulse generator circuit.

11. An electronic apparatus comprising: an electronic load; a power supply for producing an output voltage; and a booster circuit for boosting the output voltage, the boosting circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element and the said electrode of the third switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, and the first electrode of the fourth switching element is connected to the output terminal, wherein the booster unit is receptive of control signals at the gate electrodes of the respective elements so as to alternately repeat an operation of turning on the second switching element and the third switching element while the first and fourth switching elements are off and an operation of turning on the first switching element and the fourth switching element while the second and third switching elements are off, and outputs from the output terminal a boosted voltage obtained by boosting further positively a positive voltage inputted from the input terminal, and wherein each of the first to fourth switching elements of the booster unit comprises an N-channel type MOS transistor in which the first electrode is a source electrode and the second electrode is a drain electrode and having a substrate electrode connected to the GND terminal.

12. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element and the second electrode of the third switching element, the second electrode of the first switching element is connected to the second electrode of the capacitor and the second electrode of the second switching element, the first electrode of the second switching element is connected to the GND terminal, a first electrode of the capacitor is connected to the first electrode of the third switching element and the second electrode of the fourth switching element, the first electrode of the fourth switching element is connected to the output terminal, wherein the booster unit is receptive of control signals at the gate electrodes of the respective switching elements so as to alternately repeat an operation of turning on the second switching element and the third switching element while the first and fourth switching elements are off and an operation of turning on the first switching element and the fourth switching element while the second and third switching elements are off, and outputs from the output terminal a boosted voltage obtained by boosting further positively a positive voltage inputted from the input terminal, and wherein each of the first to third switching elements of the booster unit comprises an N-channel type MOS transistor in which the first electrode is a source electrode and the second electrode is a drain electrode and having a substrate electrode connected to the GND terminal, and the fourth switching element of the booster unit comprises a P-channel type MOS transistor in which the first electrode is a source electrode and the second electrode is a drain electrode and having a substrate electrode connected to the source electrode.

13. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element and the second electrode of the third switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, the first electrode of the fourth switching element is connected to the output terminal, wherein the booster unit is receptive of control signals at the gate electrodes of the respective switching elements so as to alternately repeat an operation of turning on the second switching element and the third switching element while the first and fourth switching elements are off and an operation of turning on the first switching element and the fourth switching element while the second and third switching elements are off, and outputs from the output terminal a boosted voltage obtained by boosting further positively a positive voltage inputted from the input terminal, and wherein each of the first, third, and fourth switching elements of the booster unit comprises a P-channel type MOS transistor in which the first electrode is a source electrode and the second electrode is a drain electrode and having a substrate electrode connected to the source electrode, and the second switching element of the booster unit comprises an N-channel type MOS transistor in which the first electrode is a source electrode and the second electrode is a drain electrode and having a substrate electrode connected to the GND terminal.

14. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element, the second electrode of the first switching element is connected to a second electrode of the capacitor and the second electrode of the second switching element, the said first electrode of the second switching element is connected to the GND terminal, a first electrode of the capacitor is connected to the first electrode of the third switching element and the second electrode of the fourth switching element, and the first electrode of the fourth switching element is connected to the output terminal, wherein the booster unit is receptive of control signals at the gate electrodes of the respective switching elements so as to alternately repeat an operation of turning on the second switching element and the third switching element while the first switching element is off and an operation of turning on the first switching element while the second and third switching elements are off, and outputs from the output terminal a boosted voltage obtained by boosting further positively a positive voltage inputted from the input terminal, and wherein each of the first to third switching elements of the booster unit comprises an N-channel type MOS transistor in which the first electrode is a source electrode and the second electrode is a drain electrode and having a substrate electrode connected to the GND terminal.

15. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, and the first electrode of the fourth switching element is connected to the output terminal, wherein the booster unit is receptive of control signals at the gate electrodes of the respective switching elements so as to alternately repeat an operation of turning on the second switching element and the third switching element while the first switching element is off and an operation of turning on the first switching element while the second and third switching elements are off, and outputs from the output terminal a boosted voltage obtained by boosting further positively a positive voltage inputted from the input terminal, and wherein the first switching element of the booster unit comprises a P-channel type MOS transistor in which the second electrode is a source electrode and the first electrode is a drain electrode and having a substrate electrode connected to the source electrode, and the second and third switching elements of the booster unit each comprise an N-channel type MOS transistor in which the first electrode is a source electrode and the second electrode is a drain electrode and having a substrate electrode connected to the GND terminal.

16. An electronic apparatus comprising: an electric load; a power supply for producing an output voltage; and a booster circuit for boosting the output voltage, the booster circuit including a booster unit comprising first and second input terminals, an output terminal, a GND terminal, a capacitor, a plurality of switching elements each comprising a MOS transistor having a gate electrode and a first and a second electrode, wherein the first input terminal is connected to the first electrode of a first switching element, the second electrode of the first switching element is connected to a first electrode of the capacitor and the output terminal, a second electrode of the capacitor is connected to the second input terminal, wherein the booster unit is receptive of control signals at the gate electrodes of the respective switching elements so as to alternately repeat an operation of inputting a voltage below a predetermined value to the second input terminal while the switching element is on and an operation of inputting a voltage above the predetermined value while the switching element is off, and outputs from the output terminal a boosted voltage obtained by boosting further positively a positive voltage inputted from the first input terminal each time a voltage above the predetermined value is inputted to the second input terminal, and wherein the respective switching elements of the booster unit each comprise an N-channel type MOS transistor in which the first electrode is a drain electrode and the second electrode is a source electrode and having a substrate electrode connected to the GND terminal.

17. An electronic apparatus comprising: an electric load; a power supply for producing an output voltage; and a booster circuit for boosting the output voltage, the booster circuit including a booster unit comprising first and second input terminals, an output terminal, a GND terminal, a capacitor, a plurality of switching elements each comprising a MOS transistor having a gate electrode and a first and a second electrode, wherein the first input terminal is connected to the first electrode of the first switching element, the second electrode of the first switching element is connected to a first electrode of the capacitor and the output terminal, a second electrode of the capacitor is connected to the second input terminal, wherein the booster unit is respective of control signals at the gate electrodes of the respective switching elements so as to alternately repeat an operation of inputting a voltage below a predetermined value to the second input terminal while the switching element is on and an operation of inputting a voltage above the predetermined value while the switching element is off, and outputs from the output terminal a boosted voltage obtained by boosting further positively a positive voltage inputted from the first input terminal each time a voltage above the predetermined value is inputted to the second input terminal, and wherein the respective switching elements of the booster unit each comprise a P-channel type MOS transistor in which the first electrode is a drain electrode and the second electrode is a source electrode and having a substrate electrode connected to the source electrode.

18. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element and the second electrode of the third switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, and the first electrode of the fourth switching element is connected to an output terminal, wherein the booster unit is receptive of control signals at the gate electrodes of the respective switching elements so as to alternately repeat an operation of turning on the second switching element and the third switching element while the first and fourth switching elements are off and an operation of turning on the first switching element and the fourth switching element while the second and third switching elements are off, and outputs from the output terminal a boosted voltage obtained by boosting further negatively a negative voltage inputted from the input terminal, and wherein each of the first to fourth switching elements of the booster unit comprises a P-channel type MOS transistor in which the first electrode is a source electrode and the second electrode is a drain electrode and having a substrate electrode connected to the GND terminal.

19. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element and the second electrode of the third switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, the first electrode of the fourth switching element is connected to the output terminal, wherein the booster unit is receptive of control signals at the gate electrodes of the respective switching elements so as to alternately repeat an operation of turning on the second switching element and the third switching element while the first and fourth switching elements are off and an operation of turning on the first switching element and the fourth switching element while the second and third switching elements are off, and outputs from the output terminal a boosted voltage obtained by boosting further negatively a negative voltage inputted from the input terminal, and wherein each of the first to third switching elements of the booster unit comprises a P-channel type MOS transistor in which the first electrode is a source electrode and the second electrode is a drain electrode and having a substrate electrode connected to the GND terminal, and the fourth switching element of the booster unit comprises an N-channel type MOS transistor in which the first electrode is a source electrode and the second electrode is a drain electrode and having the substrate electrode connected to the source electrode.

20. An electronic apparatus comprising: an electrode load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element and the second electrode of the third switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, and the first electrode of the fourth switching element is connected to the output terminal, wherein the booster unit is receptive of control signals at the gate electrodes of the respective switching elements so as to alternately repeat an operation of turning on the second switching element and the third switching element while the first and fourth switching elements are off and an operation of turning on the first switching element and the fourth switching element while the second and third switching elements are off, and outputs from the output terminal a boosted voltage obtained by boosting further negatively a negative voltage inputted from the input terminal, and wherein each of the first, third, and fourth switching elements of the booster unit comprise an N-channel type MOS transistor in which the first electrode is a source electrode and the second electrode is a drain electrode and having a substrate electrode connected to the source electrode, and the second switching element of the booster unit comprises a P-channel type MOS transistor in which the first electrode is a source electrode and the second electrode is a drain electrode and having a substrate electrode connected to the GND terminal.

21. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, the first electrode of the fourth switching element is connected to the output terminal, wherein the booster unit is receptive of control signals at the gate electrodes of the respective switching elements so as to alternately repeat an operation of turning on the second switching element and the third switching element while the first switching element is off and an operation of turning on the first switching element while the second and third switching elements are off, and outputs from the output terminal a boosted voltage obtained by boosting further negatively a negative voltage inputted from the input terminal, and wherein each of the first to third switching elements of the booster unit comprises a P-channel type MOS transistor in which the first electrode is a source electrode and the second electrode is a drain electrode and having a substrate electrode connected to the GND terminal.

22. An electronic apparatus comprising: an electric load; a power supply for producing an output voltage; and a booster circuit for boosting the output voltage, the booster circuit including a booster unit comprising an input terminal, an output terminal, a GND terminal, a capacitor, first through fourth switching elements each comprising a MOS transistor having a gate electrode and a first and a second electrode, wherein the input terminal is connected to the first electrode of the first switching element, the second electrode of the first switching element is connected to a second electrode of the capacitor and the second electrode of the second switching element, the first electrode of the second switching element is connected to the GND terminal, a first electrode of the capacitor is connected to the first electrode of the third switching element and the second electrode of the fourth switching element, the first electrode of the fourth switching element is connected to the output terminal, wherein the booster unit is receptive of control signals at the gate electrodes of the respective switching elements so as to alternately repeat an operation of turning on the second switching element and the third switching element while the first switching element is off and an operation of turning on the first switching element while the second and third switching elements are off, and outputs from the output terminal a boosted voltage obtained by boosting further negatively a negative voltage inputted from the input terminal, and wherein the first switching element of the booster unit comprises an N-channel type MOS transistor in which the first electrode is a drain electrode and the second electrode is a source electrode and having a substrate electrode connected to said source electrode, and the second and third switching elements of said booster unit each comprise a P-channel type MOS transistor in which the first electrode is a source electrode and the second electrode is a drain electrode and having the substrate electrode connected to the GND terminal.

23. An electronic apparatus comprising: an electric load; a power supply for producing an output voltage; and a booster circuit for boosting the output voltage, the booster circuit including a booster unit comprising first and second input terminals, an output terminal, a GND terminal, a capacitor, a plurality of switching elements each comprising a MOS transistor having a gate electrode and a first and a second electrode, wherein the first input terminal is connected to the first electrode of a first switching element, the second electrode of the first switching element is connected to a first electrode of the capacitor and the output terminal, a second electrode of the capacitor is connected to the second input terminal, wherein the booster unit is receptive of control signals at the gate electrodes of the respective switching elements so as to alternately repeat an operation of inputting a voltage above a predetermined level to the second input terminal while the switching element is on and an operation of inputting a voltage below the predetermined level while the switching element is off, and outputs from the output terminal a boosted voltage obtained by boosting further negatively a negative voltage inputted from the first input terminal each time a voltage below the predetermined level is inputted to the second input terminal, and wherein the respective switching elements of the booster unit each comprise a P-channel type MOS transistor in which the first electrode is a source electrode and the second electrode is a drain electrode and having a substrate electrode connected to the GND terminal.

24. An electronic apparatus comprising: an electric load; a power supply for producing an output voltage; and a booster circuit for boosting the output voltage, the booster circuit including a booster unit comprising first and second input terminals, an output terminal, a GND terminal, a capacitor, a plurality of switching elements each comprising a MOS transistor having a gate electrode and a first and a second electrode, wherein the first input terminal is connected to the first electrode of a first switching element, the second electrode of the first switching element is connected to a first electrode of the capacitor and the output terminal, a second electrode of the capacitor is connected to the second input terminal, wherein the booster unit is receptive of control signals at the gate electrodes of the respective switching elements so as to alternately repeat an operation of inputting a voltage above a predetermined value to the second input terminal while the switching element is on and an operation of inputting a voltage below the predetermined value while the switching element is off, and outputs from the output terminal a boosted voltage obtained by boosting further negatively a negative voltage inputted from the first input terminal each time a voltage below the predetermined value is inputted to the second input terminal, and wherein the respective switching elements of the booster unit each comprise an N-channel type MOS transistor in which the first electrode is a drain electrode and the second electrode is a source electrode and having a substrate electrode connected to the source electrode.

25. An electronic apparatus comprising a booster circuit according to any one of the claims 11 to 24; wherein the booster circuit includes at least one MOS transistor as a switching element in which a gate and a channel thereof have the same conductivity type.

26. An electronic apparatus according to any one of claims 11 to 24; further comprising a thermoelectric device for generating a thermoelectric power in response to a temperature difference; and an oscillator circuit for generating a pulse signal for driving the booster circuit, wherein an output voltage of the booster circuit is supplied as a driving voltage of the oscillator circuit, and the output voltage of the power supply which is lower than a minimum driving voltage of said oscillator circuit is boosted to the minimum driving voltage of said oscillator circuit or higher.

27. An electronic apparatus according to any one of claims 11 to 24; further comprising a time display unit connected to an output of the booster circuit.

28. A method of boosting an input voltage comprising the steps of:

supplying an output voltage of a power supply to drive an oscillator;

driving a booster circuit with a clock pulse which is generated by the oscillator in response to the output voltage of the power supply; and supplying a boosted output voltage of the booster circuit to the oscillator, so that the oscillator is initially driven by the output voltage of the power supply to start oscillation and is thereafter driven by the boosted output voltage, whereby the output voltage of the power supply need not be maintained at a level at least as great as a minimum operating voltage of the oscillator in order to maintain operation of a device driven by the boosted voltage.

\* \* \* \* \*